US012187588B2

(12) United States Patent
McKinney et al.

(10) Patent No.: US 12,187,588 B2
(45) Date of Patent: Jan. 7, 2025

(54) MODULAR RIB

(71) Applicant: Altec Industries, Inc., Saint Joseph, MO (US)

(72) Inventors: Ryan J. McKinney, Parkville, MO (US); Kyle E. Hoffmann, Saint Joseph, MO (US); Jace Hegg, St. Joseph, MO (US)

(73) Assignee: Altec Industries, Inc., Birmingham, AL (US)

(*) Notice: Subject to any disclaimer, the term of this patent is extended or adjusted under 35 U.S.C. 154(b) by 1150 days.

(21) Appl. No.: 16/935,886

(22) Filed: Jul. 22, 2020

(65) Prior Publication Data

US 2020/0346909 A1 Nov. 5, 2020

Related U.S. Application Data

(63) Continuation-in-part of application No. 15/686,503, filed on Aug. 25, 2017, now Pat. No. 10,822,216, which is a continuation-in-part of application No. 15/619,193, filed on Jun. 9, 2017, now Pat. No. 10,968,090.

(60) Provisional application No. 62/348,542, filed on Jun. 10, 2016.

(51) Int. Cl.
*B66F 11/04* (2006.01)

(52) U.S. Cl.
CPC .................................. *B66F 11/044* (2013.01)

(58) Field of Classification Search
CPC ...... B66F 11/044; B66F 17/006; E04G 5/062; E06C 9/04; A62B 35/068
See application file for complete search history.

(56) References Cited

U.S. PATENT DOCUMENTS

| | | | |
|---|---|---|---|
| 459,844 | A | 9/1891 | Thomas |
| D157,942 | S | 4/1950 | Collin |
| 3,005,512 | A | 10/1961 | Vogan |
| 3,169,602 | A | 2/1965 | Myers |
| 3,295,633 | A | 1/1967 | Milner, Jr. |
| 3,357,719 | A | 12/1967 | Mccrea |
| 3,396,814 | A | 8/1968 | Edward, V |
| 3,399,746 | A | 9/1968 | Lee |
| 3,414,079 | A | 12/1968 | Wacht et al. |
| 3,477,679 | A | 11/1969 | Lovitz |
| 3,561,563 | A | 2/1971 | Harsh |
| 3,590,950 | A | 7/1971 | Wilson |
| 3,625,305 | A | 12/1971 | Mueller et al. |

(Continued)

FOREIGN PATENT DOCUMENTS

CA 3006379 A1 6/2017

OTHER PUBLICATIONS

U.S. Appl. No. 17/081,530 Notice of Allowance issued Jul. 31, 2024.

(Continued)

*Primary Examiner* — Ryan D Kwiecinski
*Assistant Examiner* — Jacob G Sweeney
(74) *Attorney, Agent, or Firm* — Erise IP, P.A.

(57) ABSTRACT

A rib for an elevating platform, the rib designed and configured to insert through a slot in the sidewall of the elevating platform. The rib includes an internal rib component and an external rib component, wherein each of the components include at least an arm and a stem. The rib is operable to support an external load, such as an attached apparatus.

15 Claims, 98 Drawing Sheets

(56) References Cited

U.S. PATENT DOCUMENTS 3,695,390 A 10/1972 Leigh
3,767,007 A 10/1973 Garnett
3,809,180 A 5/1974 Grove
3,825,095 A 7/1974 Clark
3,833,090 A 9/1974 Georgianna
3,902,568 A 9/1975 Erickson
3,917,026 A 11/1975 Hedges
3,937,340 A 2/1976 Grove
3,974,615 A 8/1976 Ditcher
4,044,856 A 8/1977 Stevenson
4,274,614 A 6/1981 Worrallo
4,334,594 A 6/1982 Jost
4,450,936 A 5/1984 Strom
4,524,475 A 6/1985 Valentino
4,534,529 A 8/1985 Dorner
4,537,281 A 8/1985 Endres et al.
4,554,995 A 11/1985 Schlack
4,558,758 A 12/1985 Littman et al.
4,569,533 A 2/1986 Gronert et al.
4,605,098 A 8/1986 Leuty
4,620,609 A 11/1986 Elsten
4,724,924 A 2/1988 Breyer et al.
4,753,447 A 6/1988 Hall
4,754,841 A 7/1988 Koffski
4,763,755 A 8/1988 Murray
4,763,758 A 8/1988 Moody
4,785,910 A 11/1988 Tonkovich
4,838,381 A 6/1989 Michaud et al.
4,858,723 A 8/1989 Holmes et al.
4,883,145 A 11/1989 Deltatto
4,911,264 A 3/1990 McCafferty
4,917,214 A 4/1990 Mlaker et al.
4,947,961 A 8/1990 Dudley
5,201,629 A 4/1993 Simpson et al.
5,269,393 A 12/1993 Luscombe
5,611,410 A 3/1997 Baillargeon
5,688,323 A 11/1997 Kane et al.
5,722,505 A 3/1998 Grabner et al.
5,727,645 A 3/1998 Woodling
5,813,486 A 9/1998 Smith et al.
5,868,218 A 2/1999 Lawson
5,941,045 A 8/1999 Plehanoff et al.
5,944,138 A 8/1999 Vollmer et al.
6,076,937 A 6/2000 Wood et al.
6,145,619 A 11/2000 Risser
6,269,906 B1 8/2001 Dockter et al.
6,361,003 B1 3/2002 Keoun
6,378,822 B1 4/2002 Franks
6,457,558 B1 10/2002 Ehnes
6,464,037 B2 10/2002 Baldas et al.
6,470,999 B1 10/2002 Schanzle
6,471,004 B2 10/2002 Stringer et al.
6,484,982 B1 11/2002 Barry et al.
6,491,272 B1 12/2002 Franks
6,767,023 B1 7/2004 Nicholson
6,811,043 B2 11/2004 Perkins et al.
6,823,964 B2 11/2004 Goode
6,957,719 B2 10/2005 Ehnes
7,004,285 B2 2/2006 Bailey
7,066,298 B1 * 6/2006 Mackinnon .......... A47B 96/061
182/92
7,108,101 B1 9/2006 Westhoff et al.
7,168,523 B1 1/2007 Tafoya et al.
7,210,657 B2 5/2007 Plate et al.
7,258,045 B2 8/2007 Smith
7,306,280 B1 12/2007 Kraimer
7,490,801 B2 2/2009 Plate et al.
7,677,829 B2 3/2010 Westhoff et al.
7,748,496 B2 7/2010 Higgins et al.
D625,484 S 10/2010 Savard
8,016,074 B2 9/2011 Black et al.
8,056,739 B2 11/2011 Hopkins
8,091,907 B1 1/2012 Barnett
D655,597 S 3/2012 Matzek et al.
8,365,484 B2 2/2013 Foley
8,443,936 B1 5/2013 Raymond
8,550,211 B2 10/2013 Higgins et al.
8,550,212 B2 10/2013 Higgins et al.
8,739,928 B2 6/2014 Schneider
8,899,380 B2 12/2014 Chard
9,120,645 B2 9/2015 Penn et al.
9,492,693 B2 11/2016 Byrd
9,776,845 B2 10/2017 Minke
9,782,891 B2 10/2017 Blake et al.
9,851,048 B2 12/2017 Higgins
10,124,999 B2 11/2018 Puszkiewicz et al.
10,532,919 B2 1/2020 Hufnagl et al.
10,549,974 B2 2/2020 Mckinney et al.
10,823,327 B2 11/2020 Mckinney et al.
11,130,663 B2 9/2021 Linsmeier et al.
11,306,867 B2 4/2022 Mckinney et al.
11,725,776 B2 8/2023 Mckinney et al.
2002/0066620 A1 6/2002 Lindsey et al.
2002/0074186 A1 6/2002 Baldas et al.
2002/0153462 A1 10/2002 Donahue
2003/0213644 A1 11/2003 Chard et al.
2004/0026172 A1 2/2004 Ehnes
2004/0055817 A1 3/2004 Chard et al.
2004/0129496 A1 7/2004 Clark
2005/0006174 A1 1/2005 Terzini
2006/0027422 A1 2/2006 Zhang
2006/0175127 A1 8/2006 Higgins
2007/0007073 A1 1/2007 Keller
2007/0187184 A1 8/2007 Nasuti et al.
2008/0011542 A1 1/2008 Dunican
2008/0084044 A1 4/2008 Dietelbach
2008/0308350 A1 12/2008 Chard et al.
2009/0045011 A1 2/2009 Niemela et al.
2009/0101435 A1 * 4/2009 Higgins ................ B66F 11/044
182/2.1
2009/0260920 A1 10/2009 Cummings
2010/0012431 A1 1/2010 Ehnes
2010/0018722 A1 1/2010 Phillips et al.
2010/0133043 A1 6/2010 Black et al.
2010/0193286 A1 8/2010 Higgins et al.
2010/0294592 A1 11/2010 Crook et al.
2011/0138735 A1 6/2011 Foley
2012/0241250 A1 9/2012 Eakin et al.
2013/0048425 A1 2/2013 Thompson
2013/0240297 A1 9/2013 Aquino et al.
2013/0256058 A1 10/2013 Borghi
2013/0292203 A1 11/2013 Cummings
2013/0306404 A1 11/2013 Higgins et al.
2013/0313040 A1 11/2013 Cummings et al.
2013/0319792 A1 12/2013 Christian et al.
2014/0138183 A1 5/2014 Chard
2014/0246270 A1 9/2014 Parot et al.
2014/0353082 A1 12/2014 Cummings
2015/0008073 A1 1/2015 Cummings et al.
2015/0027808 A1 1/2015 Baillargeon et al.
2015/0075906 A1 3/2015 Chard
2015/0144426 A1 5/2015 Hao et al.
2016/0075543 A1 3/2016 Lombardo et al.
2016/0137471 A1 5/2016 Dittus et al.
2016/0161046 A1 6/2016 Miles et al.
2016/0368738 A1 12/2016 Minke
2017/0355579 A1 12/2017 McKinney et al.
2017/0356595 A1 12/2017 McKinney et al.
2017/0369296 A1 12/2017 McKinney et al.
2018/0126627 A1 5/2018 McKinney et al.
2018/0362313 A1 12/2018 Bonnefoy et al.
2019/0031480 A1 1/2019 McKinney et al.
2019/0119090 A1 4/2019 Maisonnette et al.

OTHER PUBLICATIONS

U.S. Appl. No. 18/224,918 Notice of Allowance issued Sep. 11, 2024.
U.S. Appl. No. 17/077,547 Final Office Action issued Oct. 8, 2024.
U.S. Appl. No. 17/217,430 Non-Final Office Action issued Oct. 10, 2024.

* cited by examiner

PRIOR ART

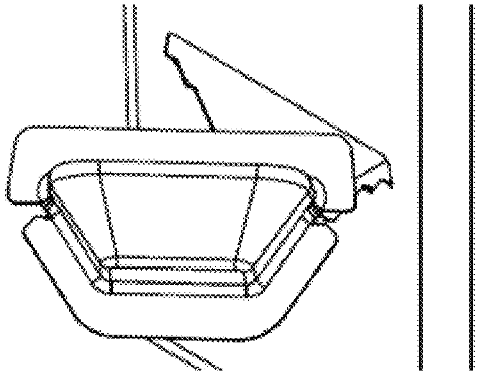
FIG. 9A: Move step into place
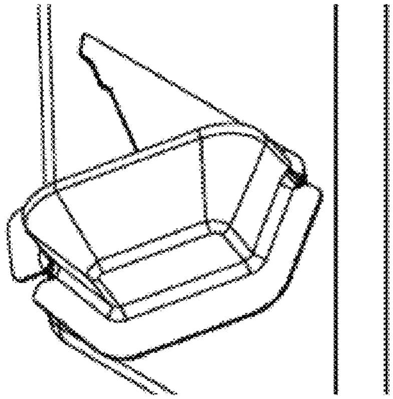
FIG. 9B: Insert step notch into cutout notch
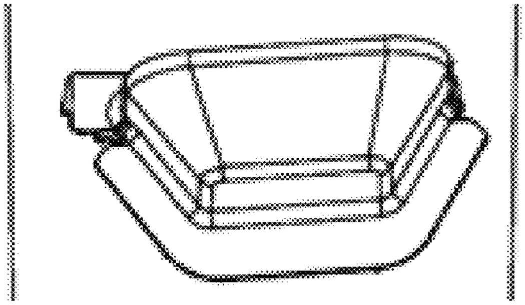
FIG. 9C: Rotate step to insert other half of flange
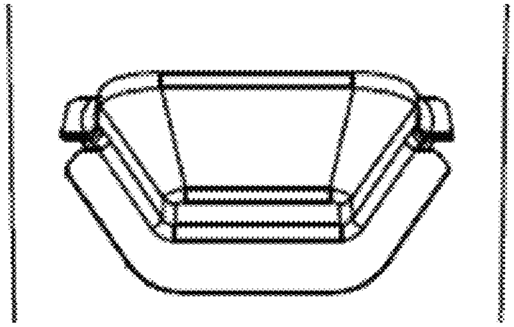
FIG. 9D: Center step in opening
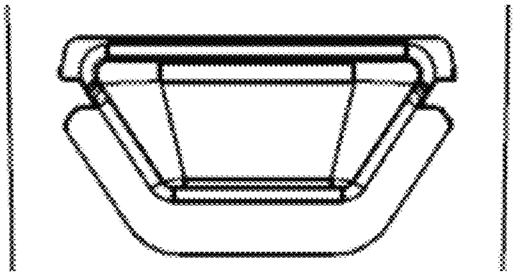
FIG. 9E: Lower step until it locks in place FIG. 23A
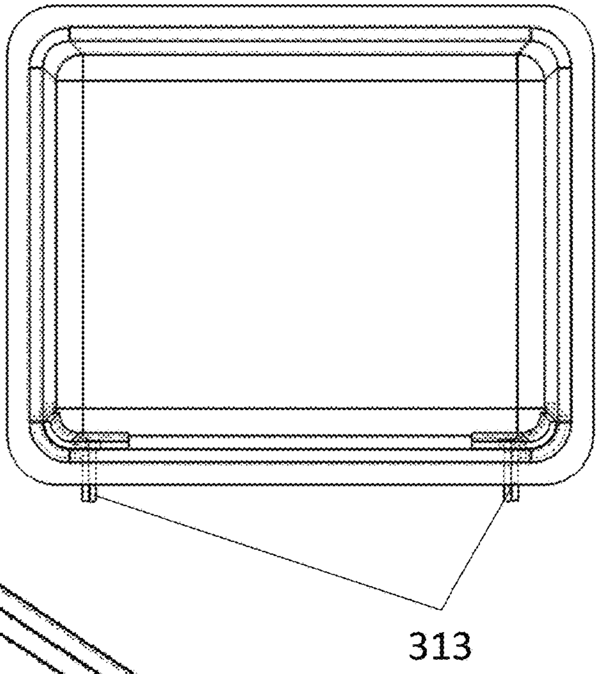
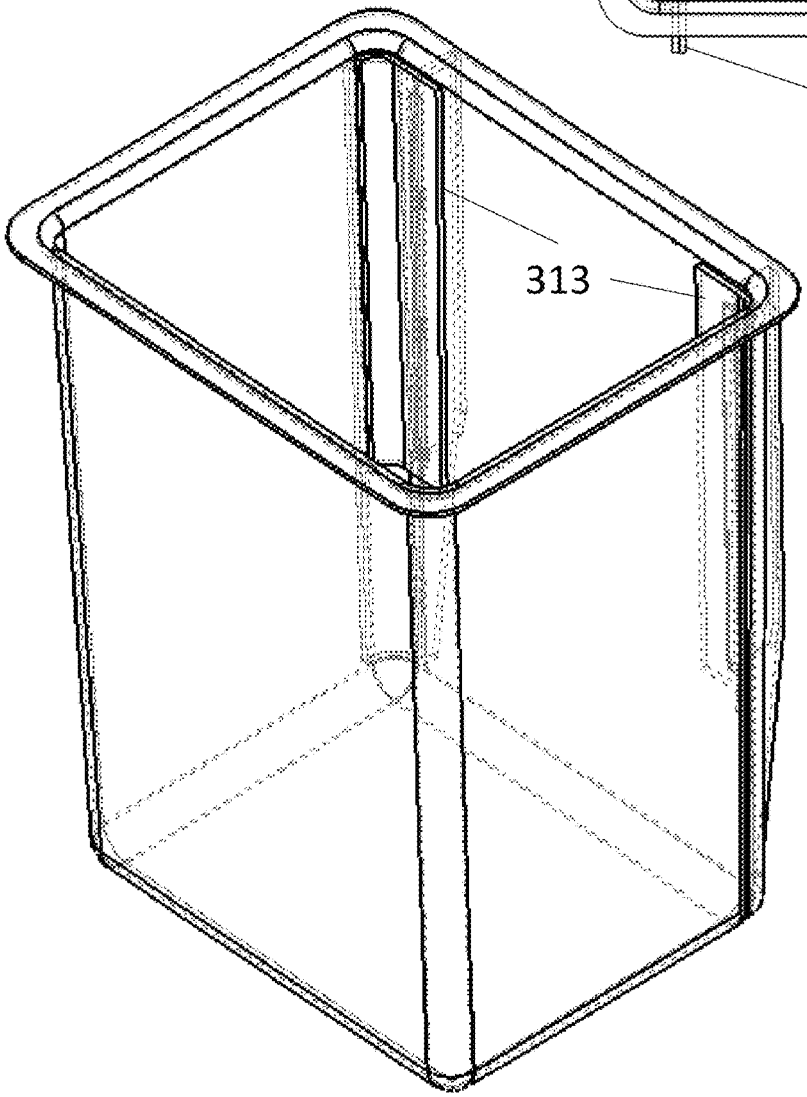
FIG. 23B

Corner Ribs
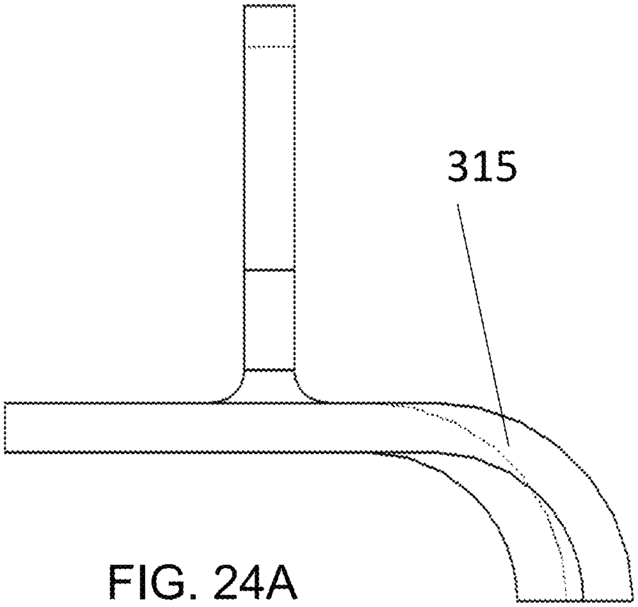
FIG. 24A
FIG. 24B
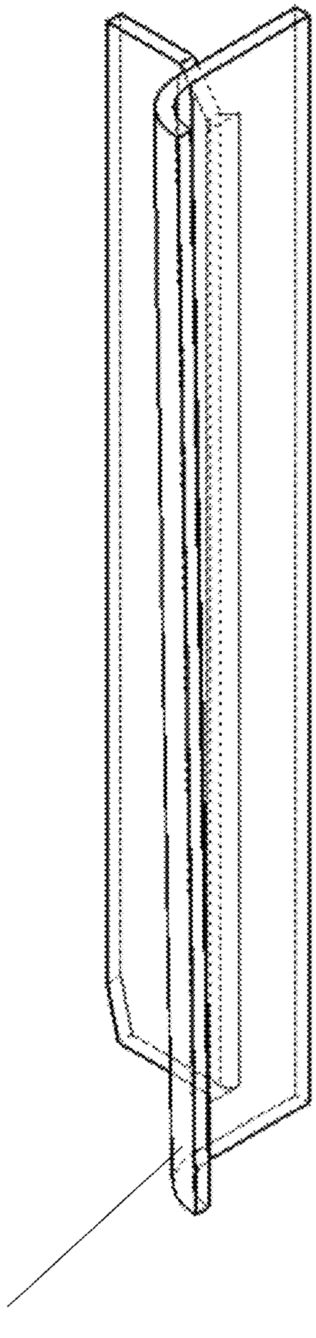

FIG. 27A
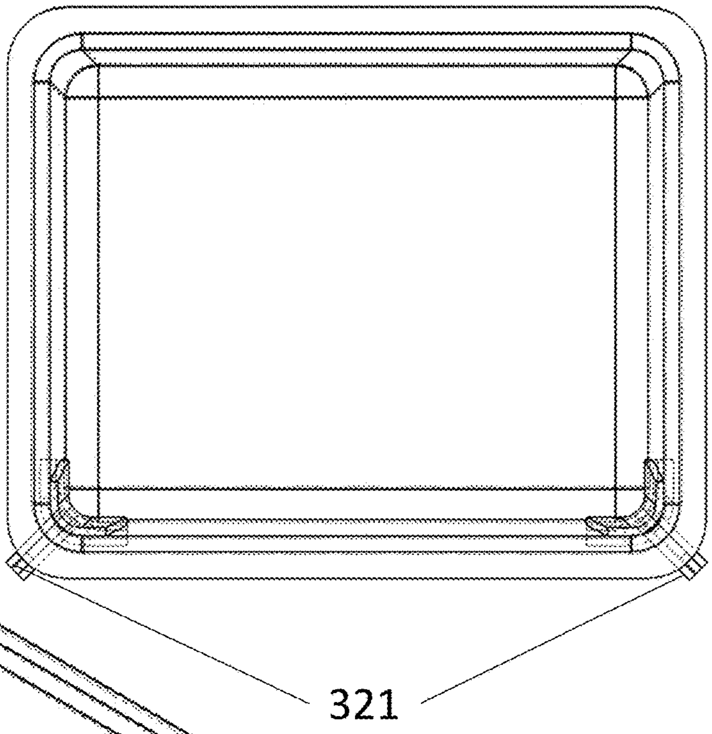
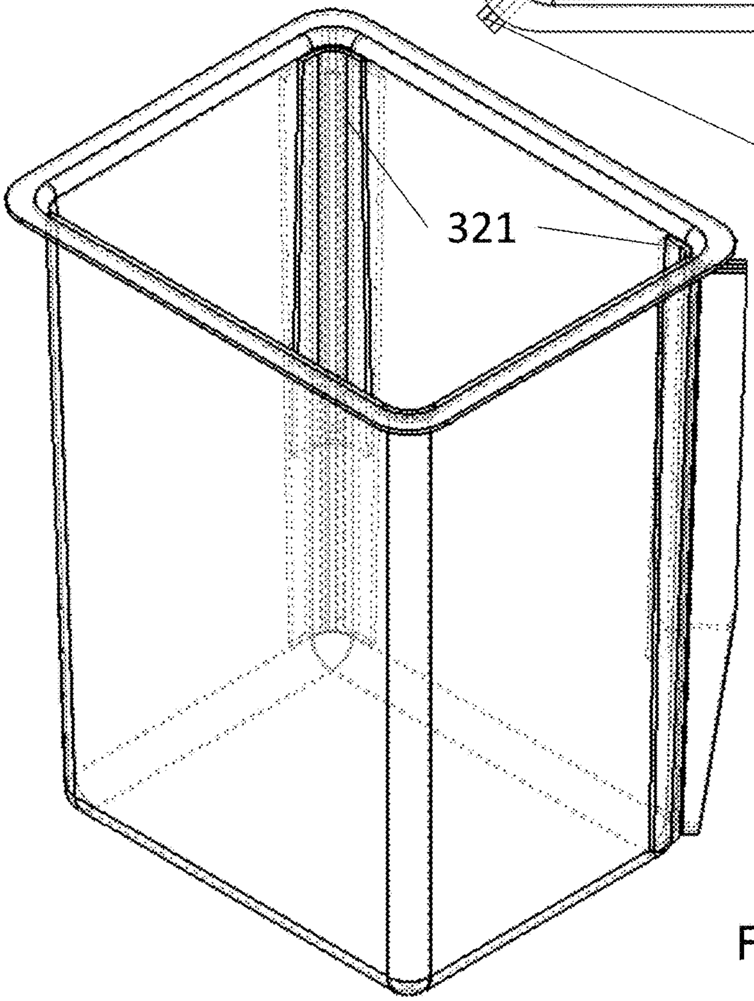
FIG. 27B

FIG. 29A
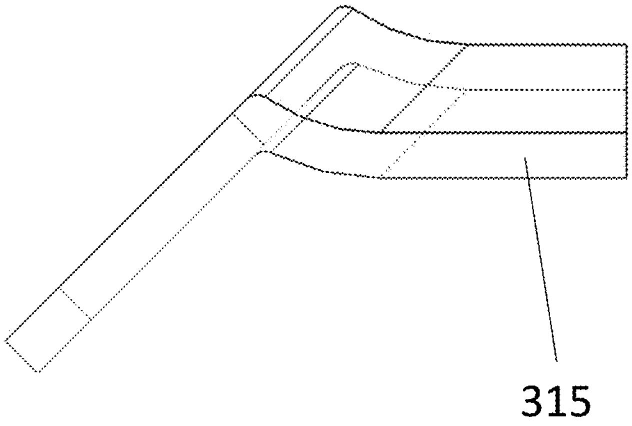
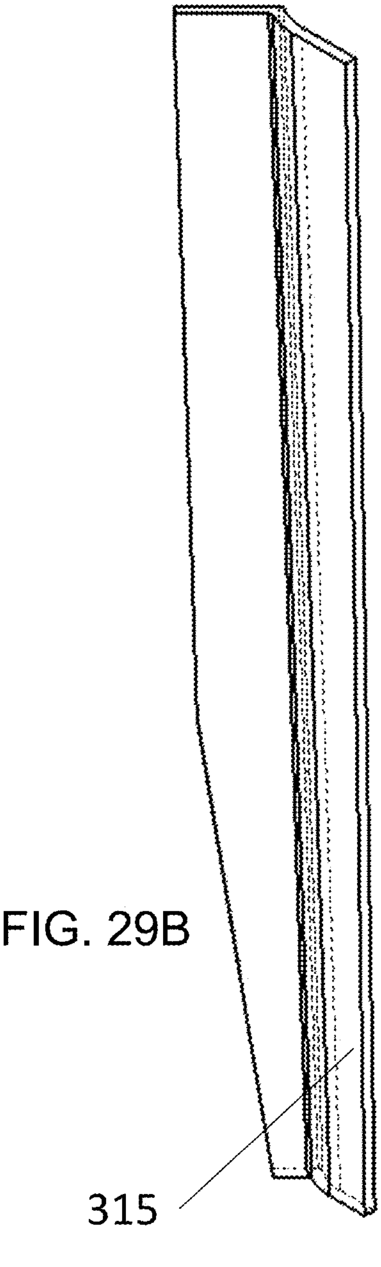
FIG. 29B

FIG. 39B
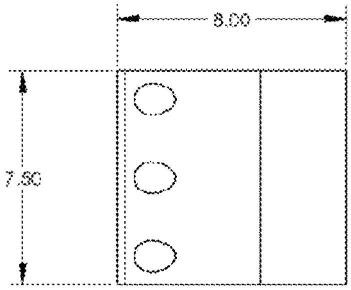
FIG. 39A
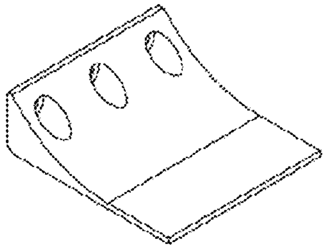
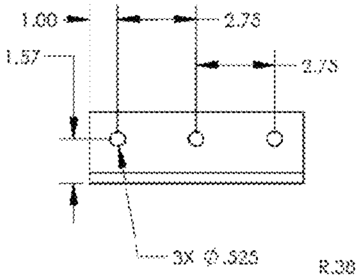
FIG. 39C
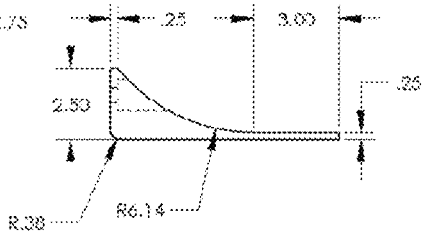
FIG. 39D
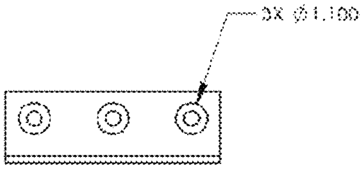
FIG. 39E

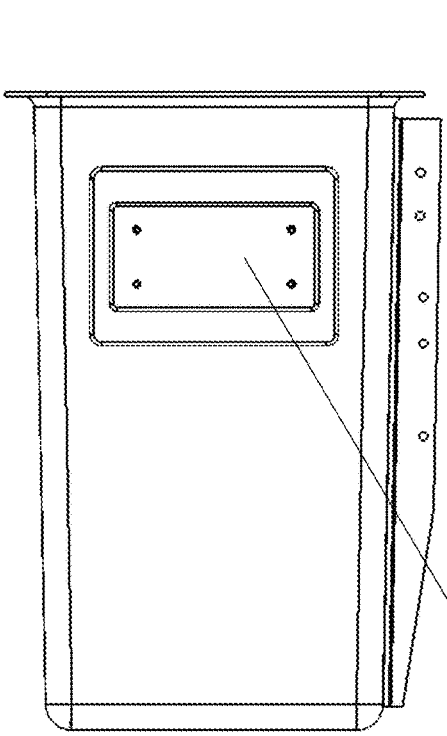
FIG. 41A
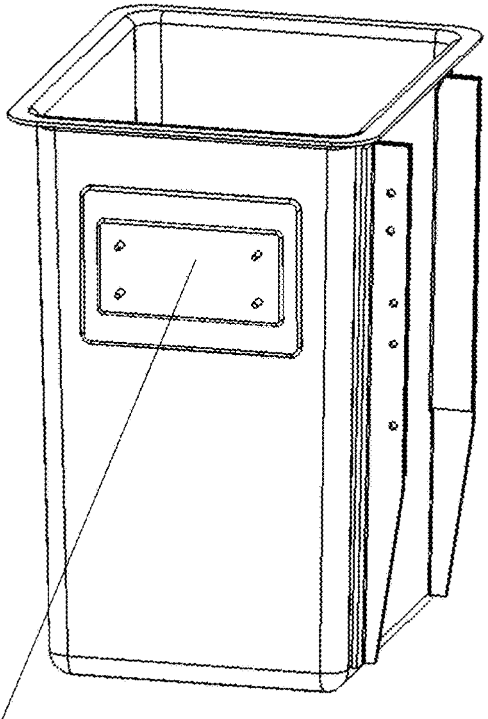
FIG. 41B
FIG. 41C
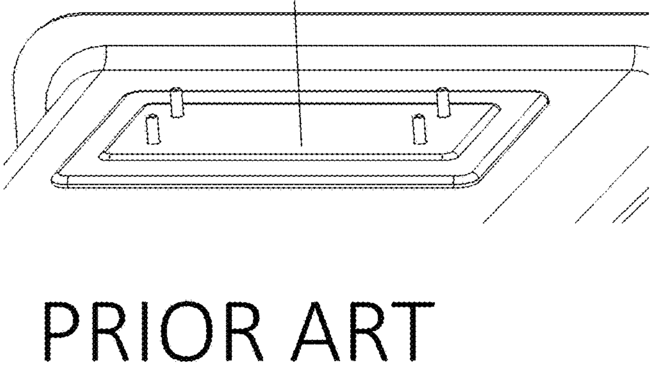
PRIOR ART

FIG. 46A
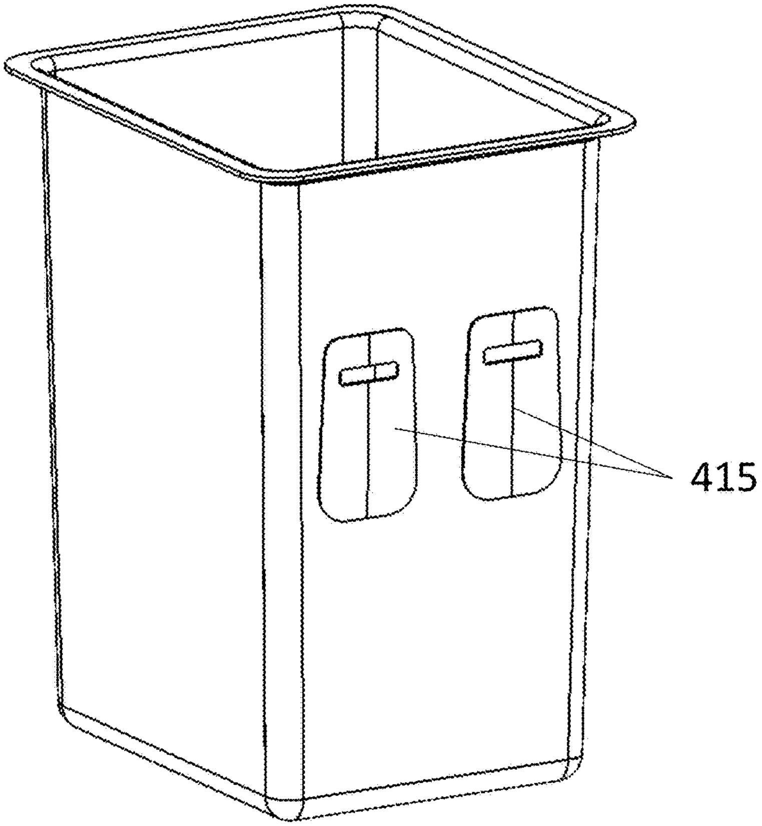
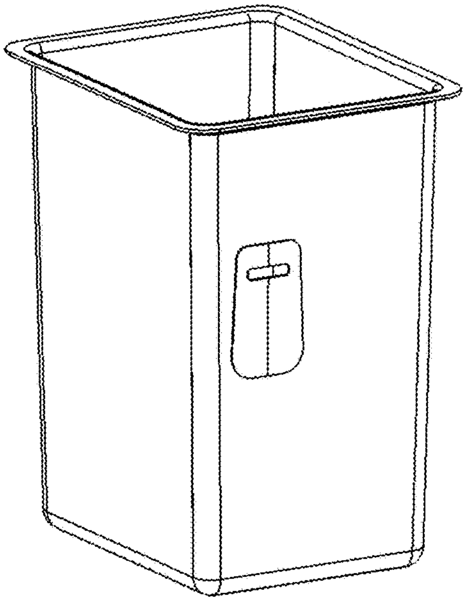
FIG. 46B

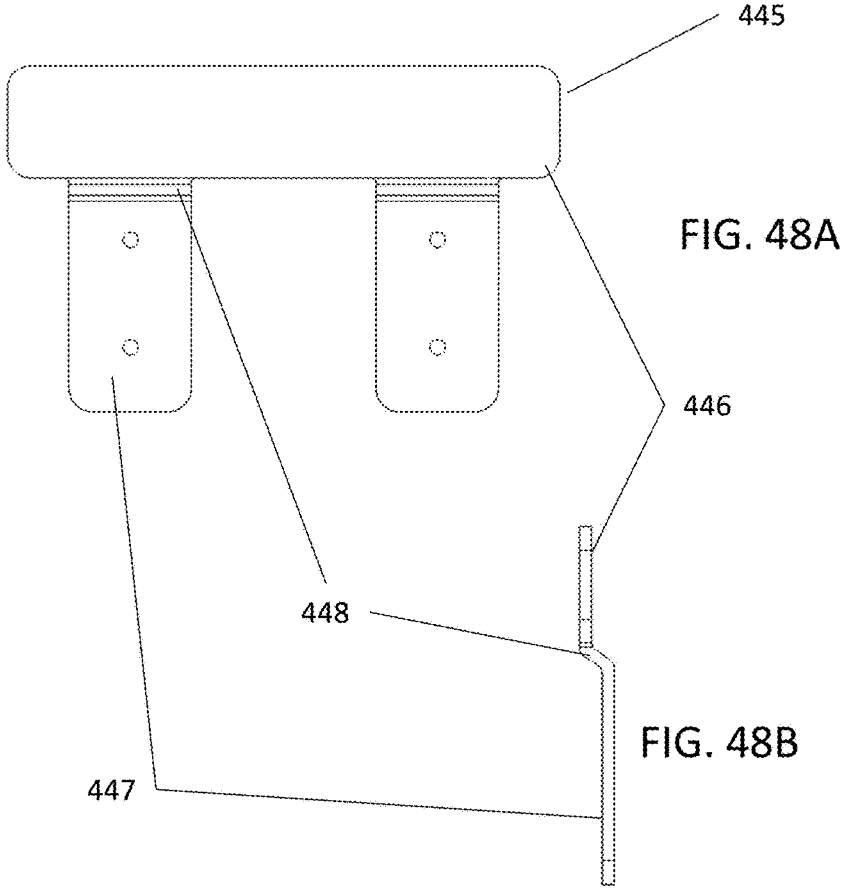
FIG. 48A
FIG. 48B
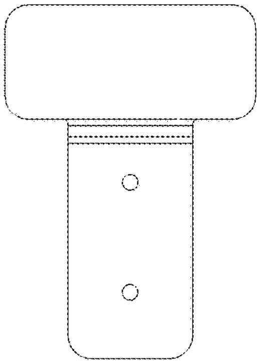
FIG. 48D
FIG. 48C
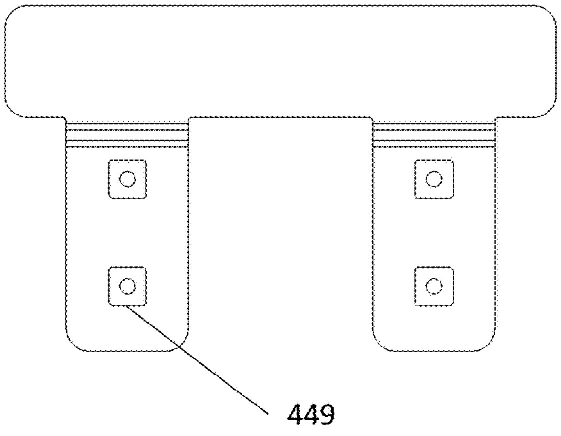
FIG. 48E
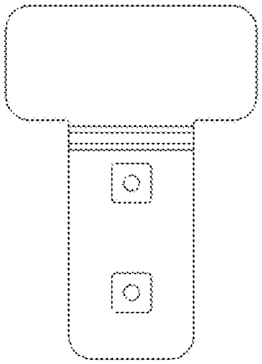

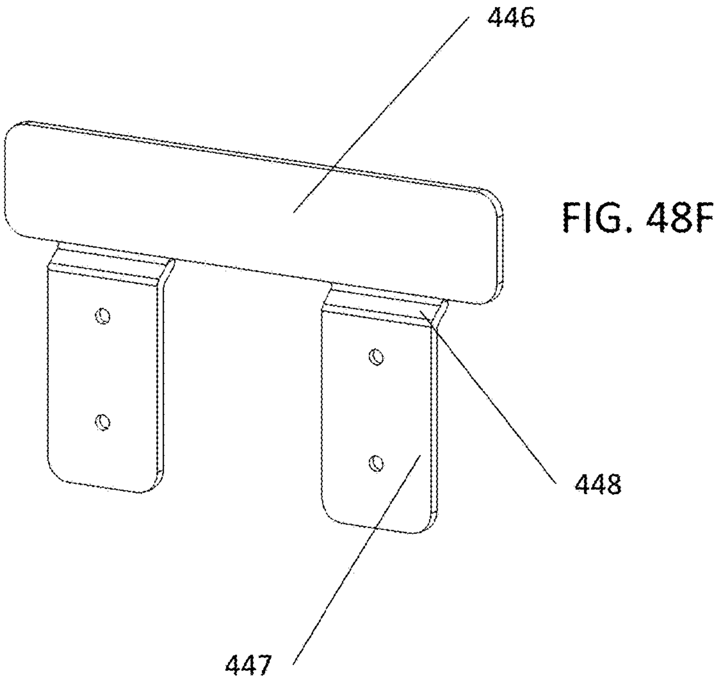
FIG. 48F
FIG. 48H
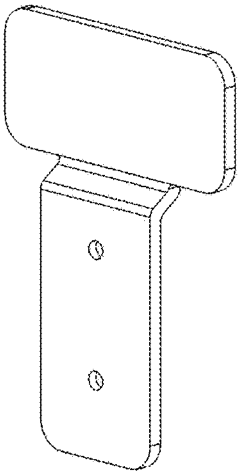
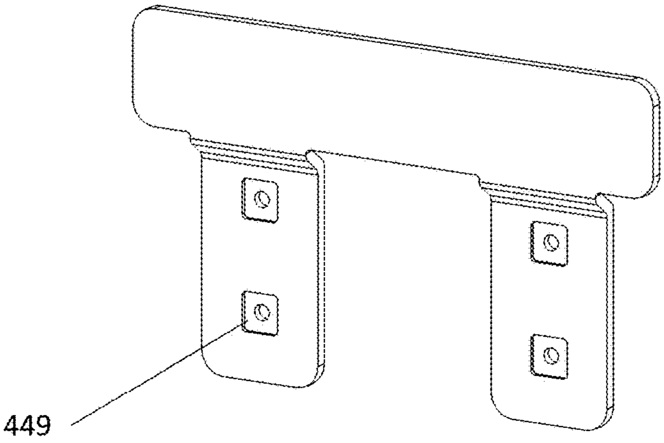
FIG. 48G
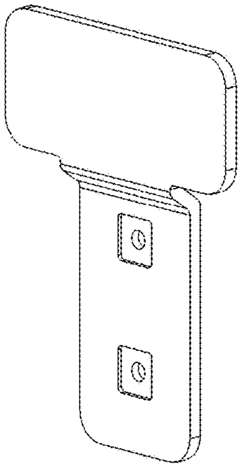
FIG. 48I FIG. 48J
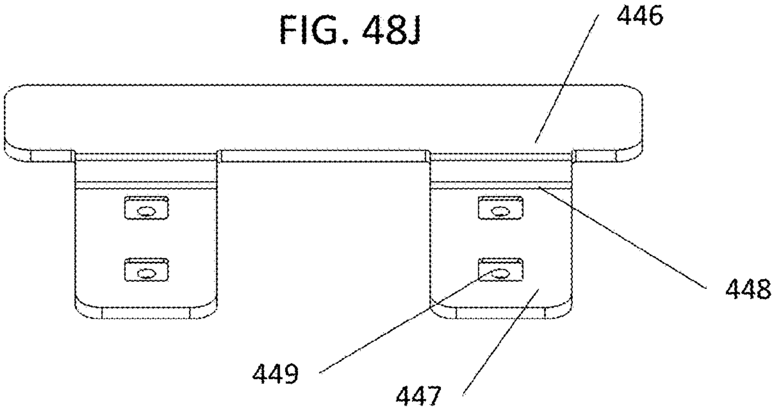
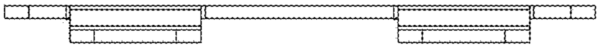
FIG. 48K
FIG. 48L
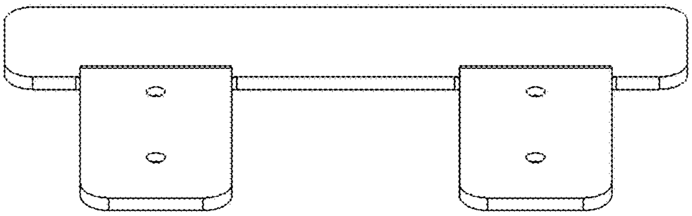
FIG. 48M
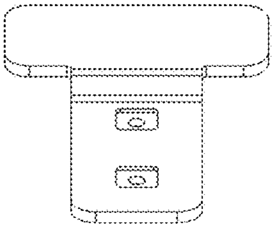
FIG. 48N
FIG. 48O
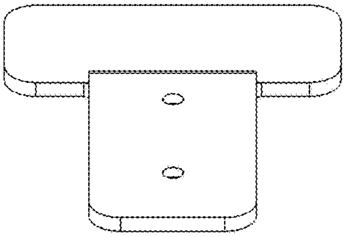

PRIOR ART

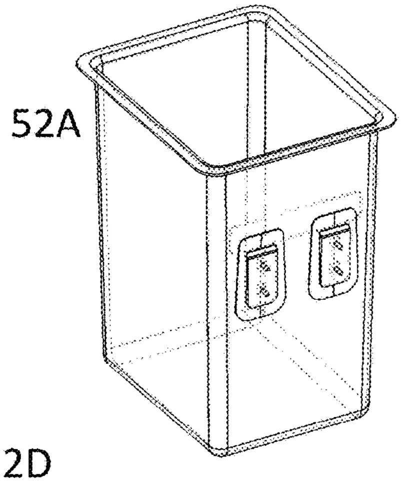
FIG. 52A
FIG. 52B
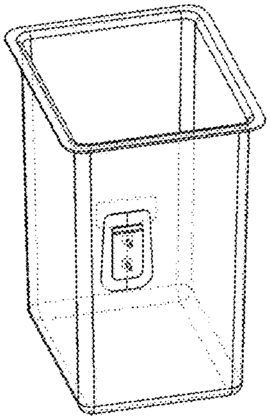
FIG. 52D
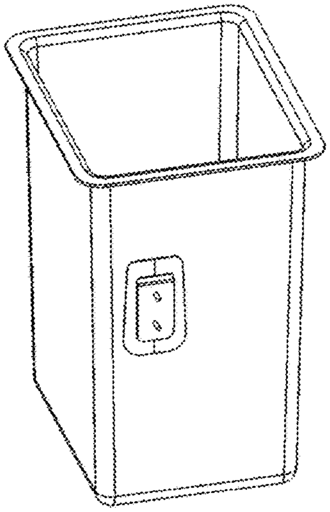
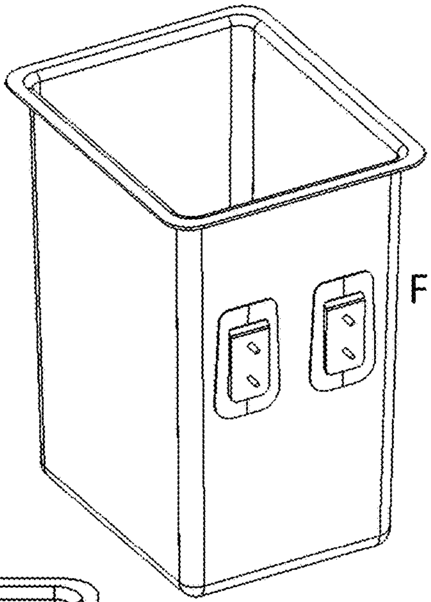
FIG. 52C
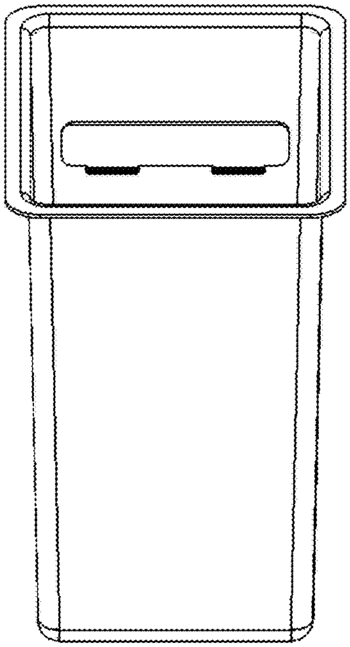
FIG. 52E
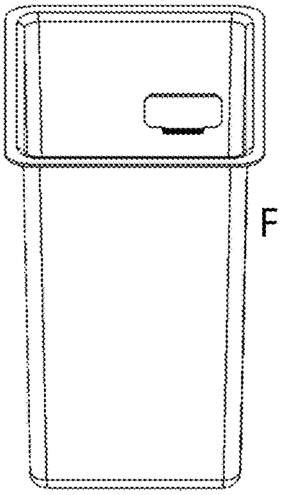
FIG. 52F

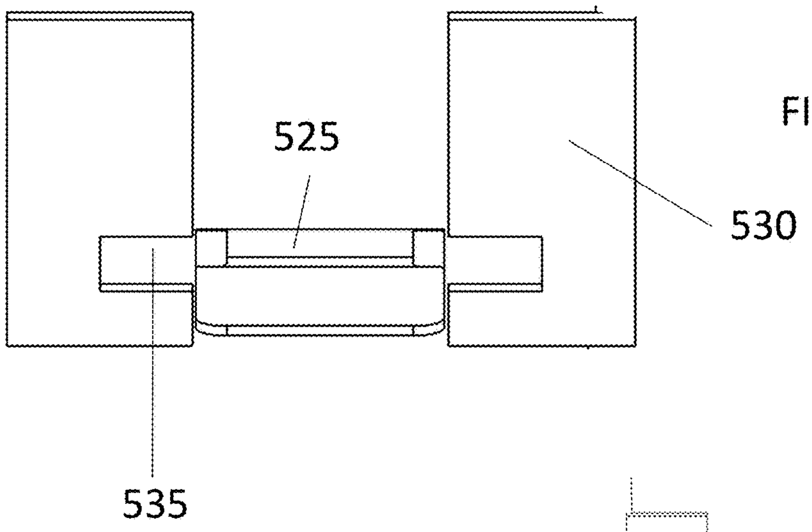
FIG. 56A
FIG. 56B
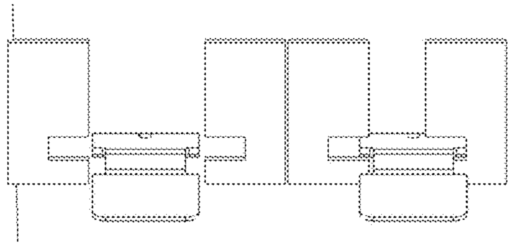
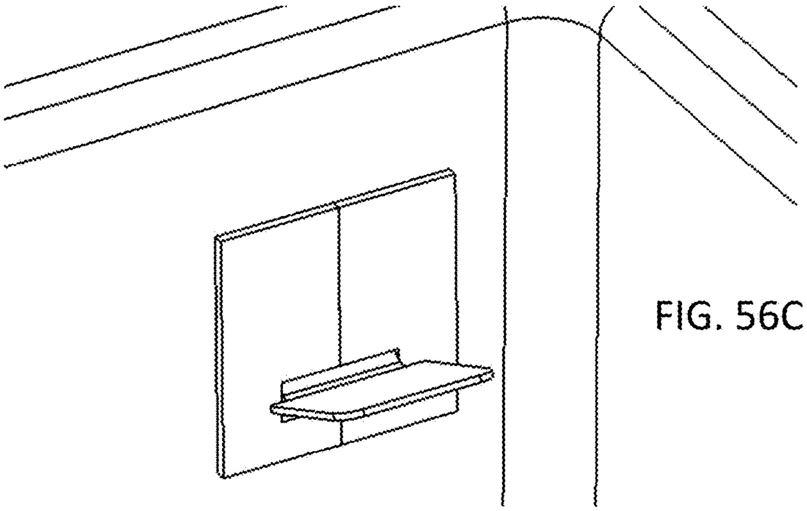
FIG. 56C
FIG. 56D
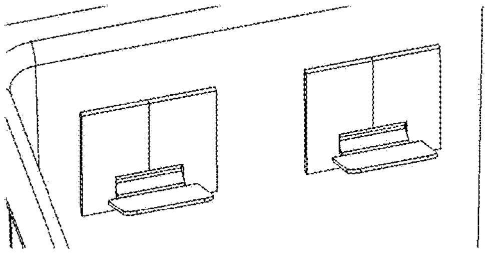

FIG. 58A
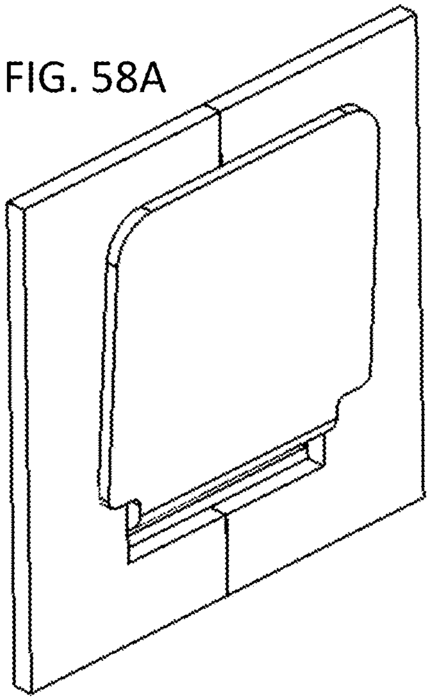
FIG. 58B
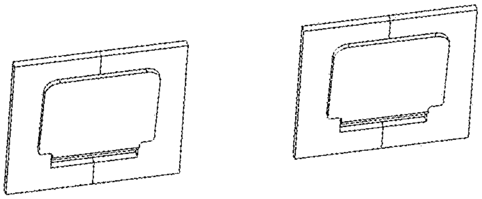
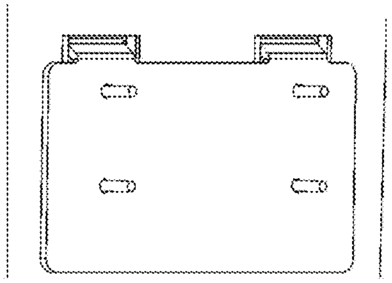
FIG. 58D
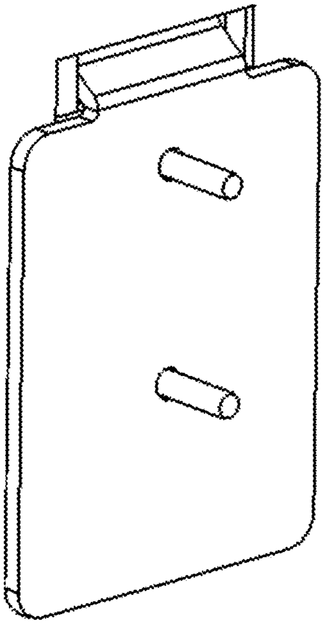
FIG. 58C

MODULAR RIB

CROSS REFERENCES TO RELATED APPLICATIONS

This application is related to and claims priority from the following US patent applications. This application is a continuation-in-part of U.S. application Ser. No. 15/686,503, filed Aug. 25, 2017, which is a continuation-in-part of U.S. application Ser. No. 15/619,193, filed Jun. 9, 2017, which claims priority to and the benefit of U.S. Provisional Patent Application No. 62/348,542, filed Jun. 10, 2016, each of which is incorporated herein by reference in its entirety.

BACKGROUND OF THE INVENTION

1. Field of the Invention

The present invention relates to elevating platforms, and more specifically to elevating platforms used with utility trucks.

2. Description of the Prior Art

It is generally known in the prior art to provide elevating platforms with ribs.

Prior art patent documents include the following:

U.S. Pat. No. 3,917,026, Aerial platform utility enclosure assembly, filed Jan. 16, 1975, allegedly describes a modular three-part preformed lightweight synthetic resin panel assembly comprising an aerial platform utility enclosure designed to be installed upon the outer structural surfaces of the frame members of an otherwise unenclosed aerial platform cage, wherein each respective panel member of the utility enclosure has an outwardly extending integrally molded tool and equipment storage compartment, with one such compartment being further provided with interiorly affixed laterally positioned rib panels to support transparent plastic accessory and parts drawers, wherein also the utility enclosure design is such that, when installed, there is no reduction in the available preexisting aerial platform operator/worker occupancy space.

U.S. Pat. No. 5,611,410, Aerial platform enclosure apparatus, filed Jul. 11, 1995, allegedly describes an aerial platform utility enclosure designed to be easily installed upon an unenclosed aerial platform bucket. The enclosure protects the worker from environmental elements without reducing visibility out of the bucket because a polycarbonate plastic such as LEXAN is used to cover the entire enclosure. Upper and lower structural components of the enclosure are constructed out of a non-conductive material. The lower structural component is firmly attached to the bucket while rotation of the upper structure and the protective cover in a full circle allows the worker to have greater access to his surroundings without having to reposition the bucket.

U.S. Pat. No. 6,470,999, Ergonomic insert for aerial bucket, filed Oct. 2, 2000, allegedly describes an ergonomic insert that reduces the risk of low-back injury to workers in aerial buckets. A combination of an ergonomic insert, an aerial bucket and means for stabilizing said ergonomic insert within the aerial bucket is also disclosed. Finally, a method for using such an ergonomic insert is also disclosed. The ergonomic insert comprises a nominally non-deformable material having foot-receiving surfaces and capable of bearing a worker's weight. Various means for supporting the ergonomic insert in a vertical position are disclosed. The method for using the ergonomic insert comprises placing the ergonomic insert into the aerial bucket from above. The ergonomic insert is positioned between the worker and the work to be performed. The worker then places a foot on one of the foot receiving surfaces prior to or while performing the work.

U.S. Pat. No. 4,883,145, Ergonomic aerial basket, filed Jan. 25, 1989, allegedly describes a simple apparatus that reduces the risk of low-back injury to workers in elevated, partially enclosed, aerial baskets. The preferred embodiment basically comprises a circular well within the floor of the basket that is surrounded by a raised footrest platform adapted to receive on foot of the worker. Between the footrest platform and a base of the well is a cylindrical wall that prohibits forward movement under the footrest platform. In operations, when the worker has to perform manual handling tasks outboard of the basket, one foot is raised out of the well and extended forward onto the footrest platform, while the other foot remains below and behind the raised foot, on the base of the well. The worker has thereby adopted a forward leaning posture instead of a forward bending posture. Consequently, the worker retains the optimal curvature of the spine, while achieving a biomechanical advantage that reduces the work demand on the lower back.

U.S. Pat. No. 4,763,758, Scuff pad with step, filed Dec. 22, 1986, allegedly describes a scuff pad with step which resides interiorly of an aerial lift bucket, or bucket liner if provided, at the bottom thereof and which includes a base portion and an upwardly extending portion extending upwardly of the base portion of a predetermined distance, the base portion has a top surface for being engaged by the shoes of said person upon standing in said bucket or liner to prevent scuffing, and the upwardly extending portion has a top surface providing a step which facilitates climbing out of said bucket or liner by the workman.

U.S. Pat. No. 6,491,272, Step assembly with a removable step for hollow poles and the like, filed Aug. 9, 2001, allegedly describes a pole step assembly with a removable step for hollow poles and the like. The step assembly includes a mounting subassembly with a mounting stud and a mounting plate with inter-engaging flat surfaces that limit relative rotational movement of the mounting stud and mounting plate about the axis of the subassembly. A clamp is provided to limit radial movement of the subassembly relative to the pole. The mounting stud of the subassembly optionally also may include a handle portion that captivates the components of the subassembly and facilitates ease of installation of the subassembly. The handle also may break away and be removed after installation of the subassembly. The step is mounted to the subassembly and may include flat surfaces that inter-engage with further flat surfaces on the mounting plate to limit rotation of the step about its longitudinal axis.

U.S. Pat. No. 3,561,563, Portable post step, filed Aug. 14, 1969, allegedly describes an integral rigid catwalk metal sheet bent along a transverse fold line to provide a post engaging portion and a step portion, the post engaging portion having a laterally inwardly extending notch for engaging the post. The post is engaged by opposing edges of the notch wherein one of the edges is the inner edge portion of the step portion. The step is placed on the post from the side and the weight of the step portion causes the unit to pivot downwardly bringing the opposing edges of the notch into engagement with the post thereby locking it in place. The post engaging portion forms an obtuse angle with the step portion and the step portion is normally positioned in a horizontal plane. A series of vertically spaced apart steps may be placed on a post and extend alternately from the post at angles of 90* to each other. Oppositely facing concave portions may be formed in the opposing edge portions for matingly engaging the rounded peripheral edge of a round post.

U.S. Pat. No. 4,763,755, Bucket release assembly for aerial device, filed Jun. 3, 1987, allegedly describes a release assembly for an aerial device for pivotally releasing a worker's bucket from an upright orientation to a horizontal orientation. The assembly consists of protrusions from the worker's bucket and a rotatable latch plate for selectively engaging and disengaging the protrusions.

U.S. Pat. No. 5,722,505, Man platform for an aerial boom, filed Jun. 8, 1995, allegedly describes a man-lifting platform for mounting on an aerial boom comprising a frame adapted to be pivotally connected to the distal end of the aerial boom. The frame has a pair of sleeves on opposite sides thereof and a pair of rods in the sleeves. The rods are secured to the man-lifting platform and generally parallel fashion. A power cylinder is connected between the frame and the man-lifting platform whereby the man-lifting platform may be moved the length of the rods by actuation of the cylinder.

U.S. Pat. No. 5,944,138, Leveling system for aerial platforms, filed Sep. 3, 1997, allegedly describes a system for leveling a personnel carrying platform mounted on the end of an elongated vehicle mounted boom. A pendulum controlled hydraulic valve controls the application of fluid pressure to a pair of cylinders equipped on their ends with a series of links extending along a drum connected to the platform mounting pin. When the platform deviates from a level position, one of the cylinders is retracted to turn the platform mounting pin in a direction to correct the deviation. An interlock valve disables the platform leveling system unless the boom is being moved. A manual override valve allows the platform to be tilted for storage or other reasons.

U.S. Pat. No. 8,550,211, Aerial work assembly using composite materials, filed Sep. 23, 2008, allegedly describes an aerial work assembly including components having composite materials including a fabric-reinforced resin for providing electrically non-conductive assembly, by insulating and/or isolating conductive components.

U.S. Pat. No. 8,550,212, Aerial work assembly using composite materials, filed Apr. 16, 2010, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

U.S. Pat. No. 4,334,594, Aerial device, filed Sep. 27, 1979, allegedly describes an articulated aerial device which includes a workman's basket suspended from a movable beam. The basket is attached to the movable beam by an attaching means which selectively permits the basket to rotate for permitting easy access to an injured workman therein.

US Publication 20090101435, Aerial work assembly using composite materials, filed Sep. 23, 2008, allegedly describes an aerial work assembly including components having composite materials including a fabric-reinforced resin for providing electrically non-conductive assembly, by insulating and/or isolating conductive components.

US Publication 20100193286, Aerial Work Assembly Using Composite Materials, filed Apr. 16, 2010, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a perform fabric having a conformable three-dimensional weave, and the resin is a dielectric resin selected from either epoxy, epoxy vinyl ester, vinyl ester, polyester, or phenolic.

US Publication 20130306404, Aerial work assembly using composite materials, filed Jul. 24, 2013, allegedly describes an aerial work assembly including components having composite materials including a fabric-reinforced resin for providing electrically non-conductive assembly, by insulating and/or isolating conductive components.

US Publication 20150075906, System for restraining a worker at a utility platform of an aerial device, filed Nov. 25, 2014, allegedly describes a restraint system for restraining a worker to a platform of an aerial device comprises a restraint liner and a platform strap. The restraint liner includes four sidewalls, a floor, a lip, an interior anchor, and an exterior anchor. The floor may be coupled to one end of the four sidewalls, while the lip may be coupled to the opposing end of the four sidewalls and may extend therefrom. The interior anchor may be positioned on an interior surface of a first sidewall and operable to couple to a liner strap coupled to a worker. The exterior anchor may be positioned on an exterior surface of the first sidewall. The platform strap may be coupled to the exterior anchor and operable to couple to the platform.

US Publication 20090045011, Self-powered lift apparatus, filed Aug. 8, 2008, allegedly describes a self-powered lift apparatus includes a support base, a hitch member, a mast, a movable lift boom, and a power unit. Optionally, the lift apparatus may also include at least one movable stabilizer or support leg. The hitch member is coupled to the support base and is adapted to be received by a hitch receiver on a vehicle. The hitch receiver on the vehicle may provide any one of a hitch socket, a three-point hitch, or a universal mount on a skid-steer vehicle. The lift apparatus is powerable solely by the power unit mounted at the lift apparatus and is operable to move the movable lift boom to lift a person or another implement, without reliance on any power supplied from the vehicle. Optionally, the lift apparatus is at least partially supported in a cargo bed of the vehicle.

US Publication 20140138183, System for restraining a worker at a utility platform of an aerial device, filed Nov. 20, 2012, allegedly describes a restraint system for restraining a worker to a platform of an aerial device comprising a restraint liner and a platform strap. The restraint liner includes four sidewalls, a floor, a lip, an interior anchor, and an exterior anchor. The floor may be coupled to one end of the four sidewalls, while the lip may be coupled to the opposing end of the four sidewalls and may extend therefrom. The interior anchor may be positioned on an interior surface of a first sidewall and operable to couple to a liner strap coupled to a worker. The exterior anchor may be positioned on an exterior surface of the first sidewall. The platform strap may be coupled to the exterior anchor and operable to couple to the platform.

US Publication 20120241250, Aerial Work Platforms and Aerial Work Platform Assemblies Comprised of Polymerized Cycloolefin Monomers, filed Mar. 26, 2012, allegedly describes an aerial work platform assembly that includes: a) a platform shaft retaining assembly; b) a mounting bracket connected to the platform shaft retaining assembly; and c) a platform connected to the mounting bracket. The platform shaft retaining assembly includes two concentric apertures for installation of a pivot shaft therein; the mounting bracket having an upper gusset member and a center gusset member that are bonded together and that include horizontal portions to which the pivot shaft is bonded; upper and lower platform pins; a valve bracket; a platform bracket; and upper platform pins that provide for pivoting on a lower platform pin and tilting down of the platform thereby. At least one of the platform shaft retaining assembly, the mounting bracket, the platform, the upper and lower platform pins, and the valve bracket are molded from at least one monomer having at least one norbornene functionality, such as polydicyclopentadiene.

US Publication 20060175127, Aerial work platform assembly using composite materials, filed Feb. 10, 2005, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

SUMMARY OF THE INVENTION

The present invention further relates to a modular reinforcing rib system for elevating platforms. It is an object of this invention to provide a modular reinforcing rib system for an elevating platform, wherein the rib system is designed and configured to support heavy loads and prevent bending of the elevating platform.

Thus, in one embodiment, the present invention is directed to a modular reinforcing rib system wherein the ribs are composed of at least one T-shaped component and at least two L-shaped components and designed and configured to insert through a slot in the sidewall of an elevating platform.

In another embodiment, the present invention is directed to a modular reinforcing rib system wherein the ribs are positioned partially or wholly in the corners of the platform.

In yet another embodiment, the present invention is directed to a mini-rib, which has components and dimensions operable to support an external or internal attached apparatus.

In one embodiment, the present invention is directed to a rib for an elevating platform, comprising: at least two rib components, wherein the at least two rib components include an internal rib component and an external rib component; wherein the internal rib component and the external rib component are both L-shaped and both include an arm and a stem; wherein the external rib component is positioned completely on the external side of a sidewall; wherein the arm of the internal rib component contacts an internal surface of the sidewall, and wherein the arm of the external rib component contacts an external surface of the sidewall; wherein the stem of the internal rib component extends through a sidewall cutout to an external side of the sidewall; wherein the stem of the internal rib component is in contact with the stem of the external rib component; and wherein the mated stems of the internal rib component and the external rib component are configured to attach to and support at least one load.

In another embodiment, the present invention is directed to a rib for an elevating platform, comprising: at least two rib components, wherein the at least two rib components include an internal rib component and an external rib component; wherein the internal rib component and the external rib component each include at least one arm and at least one stem; wherein the at least one arm of the internal rib component contacts an internal surface of a sidewall, and wherein the at least one arm of the external rib component contacts an external surface of the sidewall; wherein the at least one stem of the internal rib component extends through a sidewall cutout in a sidewall to an external side of the sidewall; wherein the at least one stem of the internal rib component and the at least one stem of the external rib component are mated; and wherein the mated at least one stem of the internal rib component and the mated at least one stem of the external rib component are operable to attach to at least one load bearing apparatus.

In yet another embodiment, the present invention is directed to a rib for an elevating platform, comprising: at least two rib components, wherein the at least two rib components include an internal rib component and an external rib component; wherein the internal rib component and the external rib component each include at least one arm and at least one stem; wherein the at least one arm of the internal rib component contacts an internal surface of a sidewall, and wherein the at least one arm of the external rib component contacts an external surface of a sidewall; and wherein the internal rib component and the external rib component each include at least one mounting location.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 9A-E provide various perspective views of a method for assembling a step in the sidewall according to the present invention. FIG. 9A shows the step being moved into place in the cutout. FIG. 9B shows the step notch being inserted into the cutout notch. FIG. 9C shows the step being rotated to insert the other half of the flange. FIG. 9D shows the step being centered in the cutout. FIG. 9E shows the step lowered into place to lock into the cutout.

FIG. 11B is a bottom-front perspective view of the rib. FIG. 11C is a front view. FIG. 11D is a rear perspective view.

FIG. 12A shows a double-L design formed from two individual L-shaped portions. FIG. 12B shows a pultruded double L design with a stem that is double the thickness of the arms. FIG. 12C shows another pultruded double L design with a stem that is the same thickness as the arms. FIG. 12D is a double-L design installed in a platform.

FIG. 14A shows a front perspective view of a first rib. FIG. 14B shows a front perspective view of a second rib that is paired with the first rib. FIG. 14C shows the rib in a transparent platform; the rib on the right is partially installed and the rib on the left is fully installed.

FIG. 17A is an exterior perspective view of a platform with one rib installed in the platform. FIG. 17B is the view of FIG. 17A with a semi-transparent platform. FIG. 17C is an exterior side view of a pair of ribs installed in the platform. FIG. 17D is the view of FIG. 17C with a semi-transparent platform. FIG. 17E is an exterior perspective view of a pair of ribs installed in the platform. FIG. 17F is the view of FIG. 17E with a semi-transparent platform. FIG. 17G is a top perspective view of the platform showing an interior of a pair of ribs installed. FIG. 17H is the view of FIG. 17G with a semi-transparent platform. FIG. 17I is an exterior perspective view of a platform with two different types of ribs.

FIG. 21A is a cross-sectional view of the rib installed in a platform. FIG. 21B is a cross-sectional view of a platform with two ribs installed. FIG. 21C is a front perspective view showing a rib partially installed (left) and fully installed (right). FIG. 21D is a front perspective view showing two ribs installed.

FIG. 23A is a transparent top view of a platform with partial-corner ribs according to the present invention. FIG. 23B is transparent top perspective view of a platform with partial-corner ribs according to the present invention.

FIG. 24A is a transparent top view of a T-rib portion with single curved arm for a partial-corner rib according to the present invention. FIG. 24B is a transparent side perspective view of a T-rib portion with single curved arm according to the present invention.

FIG. 27A is a transparent top view of a platform with full-corner ribs according to the present invention. FIG. 27B is transparent top perspective view of a platform with full-corner ribs according to the present invention.

FIG. 29A is a transparent top view of an L-rib portion with curved arm for a full-corner rib according to the present invention. FIG. 29B is a transparent side perspective view of an L-rib portion with curved arm for a full-corner according to the present invention.

FIG. 36A is a front perspective view of the rib of FIGS. 34-35 installed in a platform with a lanyard bracket attached. FIG. 36B is an opposite front perspective view FIG. 36A. FIG. 36C is a side perspective view of FIG. 36A.

FIG. 37A is a front perspective view of the rib of FIGS. 34-35 installed in a platform with a lanyard bracket attached. FIG. 37B is a partial top perspective view of the rib of FIGS. 34-35 installed in a platform with a lanyard bracket attached.

FIGS. 39A-E show different views of the lanyard bracket support of FIG. 38. FIG. 39A is a bottom front perspective view. FIG. 39B is a left side view. FIG. 39C is a rear view. FIG. 39D is a bottom view. FIG. 39E is a front view.

FIG. 41A-C show different views of a PRIOR ART mounting plate. FIG. 41A is a front view. FIG. 41B is a front perspective view. FIG. 41C is a bottom front perspective view.

FIG. 46A shows a platform with one slot with reinforcing pads for mounting a mounting plate according to the present invention. FIG. 46B shows a platform with one slot for mounting a mounting plate according to the present invention.

FIG. 47A shows the double mounting plate partially inserted in a semi-transparent platform.

FIG. 47C shows the single mounting plate partially inserted in a semi-transparent platform.

FIG. 48A is a front view of the plate of FIGS. 47A and B.

FIG. 48B is a side view of the plate of FIGS. 47A and B.

FIG. 48C is a rear view of the plate of FIGS. 47A and B.

FIG. 48D is a front view of the plate of FIGS. 47C and D.

FIG. 48E is a rear view of the plate of FIGS. 47C and D.

FIG. 48F is a front perspective view of the plate of FIGS. 47A and B.

FIG. 48G is a rear perspective view of the plate of FIGS. 47A and B.

FIG. 48H is a front perspective view of the plate of FIGS. 47C and D.

FIG. 48I is a rear perspective view of the plate of FIGS. 47C and D.

FIG. 48J is a rear bottom perspective view of the plate of FIGS. 47A and B.

FIG. 48K is a bottom view of the plate of FIGS. 47A and B.

FIG. 48L is a front bottom perspective view of the plate of FIGS. 47A and B.

FIG. 48M is a rear bottom perspective view of the plate of FIGS. 47C and D.

FIG. 48N is a bottom view of the plate of FIGS. 47C and D.

FIG. 48O is a front bottom perspective view of the plate of FIGS. 47C and D.

FIG. 50A is a top perspective view. FIG. 50B is a side view. FIG. 50C is a bottom perspective view.

FIG. 52A is a perspective exterior view of the mounting plate of FIGS. 47A and B installed in a transparent platform.

FIG. 52B is a perspective exterior view of the mounting plate of FIGS. 47C and D installed in a transparent platform.

FIG. 52C is a perspective exterior view of the mounting plate of FIGS. 47A and B installed in an opaque platform.

FIG. 52D is a perspective exterior view of the mounting plate of FIGS. 47C and D installed in an opaque platform.

FIG. 52E is a perspective interior view of the mounting plate of FIGS. 47A and B installed in an opaque platform.

FIG. 52F is a perspective interior view of the mounting plate of FIGS. 47C and D installed in an opaque platform.

FIG. 53A is a front view of the plate installed in a platform. FIG. 53B is a front view of the plate installed in a semi-transparent platform. FIG. 53C is a front perspective view of the plate installed in a semi-transparent platform. FIG. 53D is a rear perspective view of the plate installed in a semi-transparent platform. FIG. 53E is a rear perspective view of the plate installed in a platform. FIG. 53F is a top perspective view of the plate installed in a semi-transparent platform. FIG. 53G is another top perspective view of the plate installed in a platform. FIG. 53H is a side view of the plate installed in a semi-transparent platform. FIG. 53I is a cross-sectional side view of the plate installed in a semi-transparent platform. FIG. 53J is a close-up view of the cross-section side view of FIG. 53I. FIG. 53K is another close-up view of the cross-section side view of FIG. 53I.

FIG. 56A is an interior view of a single-upper-section mounting plate with interior reinforcement components positioned for installment.

FIG. 56B is an interior view of a double-upper-section mounting plate with interior reinforcement components positioned for installment.

FIG. 56C is an interior view of a single-upper-section mounting plate with interior reinforcement components installed.

FIG. 56D is an interior view of a double-upper-section mounting plate with interior reinforcement components installed.

FIG. 58A is a perspective interior view of the single-upper-section mounting plate of FIGS. 55A, 56A, 56C and 57A installed in an opaque platform.

FIG. 58B is a perspective interior view of the double-upper-section mounting plate of FIGS. 55B, 56B, 56D and 57B installed in an opaque platform.

FIG. 58C is a perspective exterior view of the single-upper-section mounting plate of FIGS. 55A, 56A, 56C and 57A installed in an opaque platform.

FIG. 58D is a perspective exterior view of the double-upper-section mounting plate of FIGS. 55B, 56B, 56D and 57B installed in an opaque platform.

FIG. 60A is a rear view. FIG. 60B is a cross-sectional side view. FIG. 60C is a close-up view of the head of a stud inserted in a plate. FIG. 60D is a close-up, cross-sectional side view of a stud and surrounding plate.

FIG. 61A is a front view; FIG. 61B is a side view, FIG. 61C is a top perspective view, and FIG. 61D is a bottom perspective view.

FIG. 62A is a side perspective view. FIG. 62B is a front view. FIG. 62C is a side view. FIG. 62D is a rear view. FIG. 62E is a cross-sectional side view. FIG. 62F is a close-up rear view of a stud inserted in the plate.

FIG. 63A is a front view. FIG. 63B is a side view. FIG. 63C is a bottom perspective view.

FIG. 72A illustrates a hooking mechanism for inserting an internal rib component into a sidewall cutout according to one embodiment of the present invention.

FIG. 72B illustrates a front perspective view of an internal rib component inserted into a sidewall cutout according to one embodiment of the present invention.

FIG. 72C illustrates a rear perspective view of an internal rib component inserted into a sidewall cutout according to one embodiment of the present invention.

FIG. 73A illustrates a front perspective view of two ribs inserted in a platform according to one embodiment of the present invention.

FIG. 73B illustrates a front perspective view of two ribs inserted in a translucent platform according to one embodiment of the present invention.

FIG. 73C illustrates a front perspective view of two ribs inserted in a platform with a front panel according to one embodiment of the present invention.

FIG. 73D illustrates a front perspective view of two ribs inserted in a translucent platform with a front panel according to one embodiment of the present invention.

FIG. 73E illustrates a mini-rib in a central area of a sidewall according to one embodiment of the present invention.

FIG. 74A illustrates a rear perspective view of two ribs inserted in a platform according to one embodiment of the present invention.

FIG. 74B illustrates a rear perspective view of two ribs inserted in a translucent platform according to one embodiment of the present invention.

FIG. 75A illustrates a left perspective view of an external rib component according to one embodiment of the present invention.

FIG. 75B illustrates a right perspective view of an external rib component according to one embodiment of the present invention.

Figure 75A:
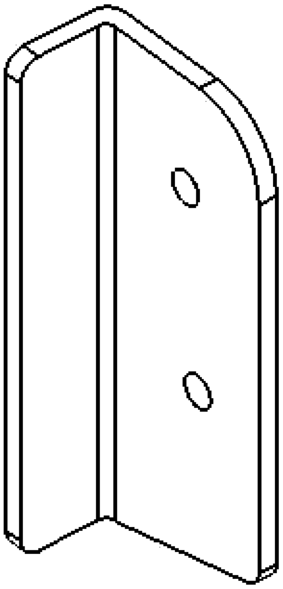
Figure 75B:
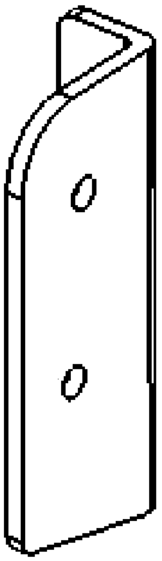
Figure 75C:
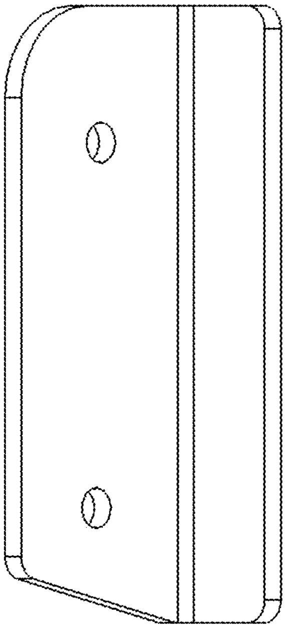

FIG. 75C illustrates a right perspective view of an external rib component according to one embodiment of the present invention.

Figure 76A:
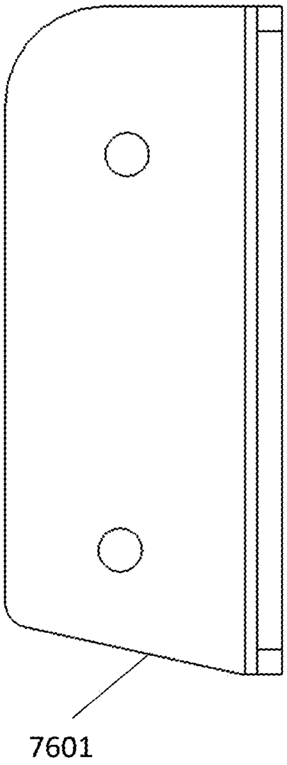

FIG. 76A illustrates a right side view of an external rib component according to one embodiment of the present invention.

Figure 76B:
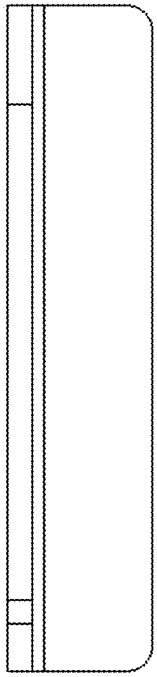

FIG. 76B illustrates a front side perspective view of an external rib component according to one embodiment of the present invention.

Figure 76C:
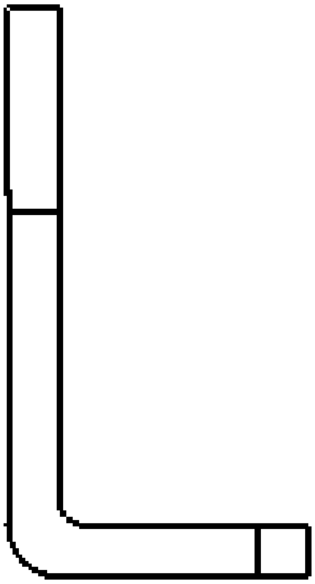

FIG. 76C illustrates a top view of an external rib component according to one embodiment of the present invention.

Figure 77A:
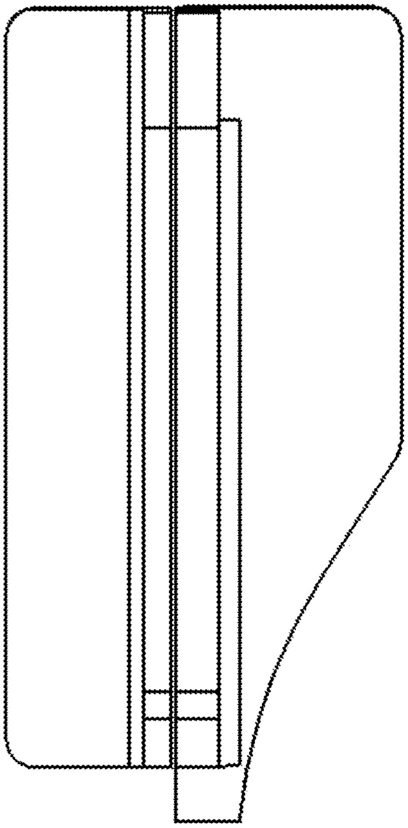

FIG. 77A illustrates a front view of a mini-rib according to one embodiment of the present invention.

Figure 77B:
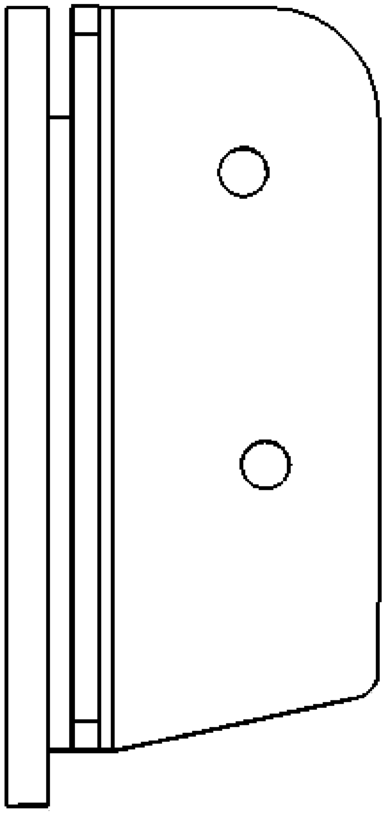

FIG. 77B illustrates left side view of a mini-rib according to one embodiment of the present invention.

Figure 78A:
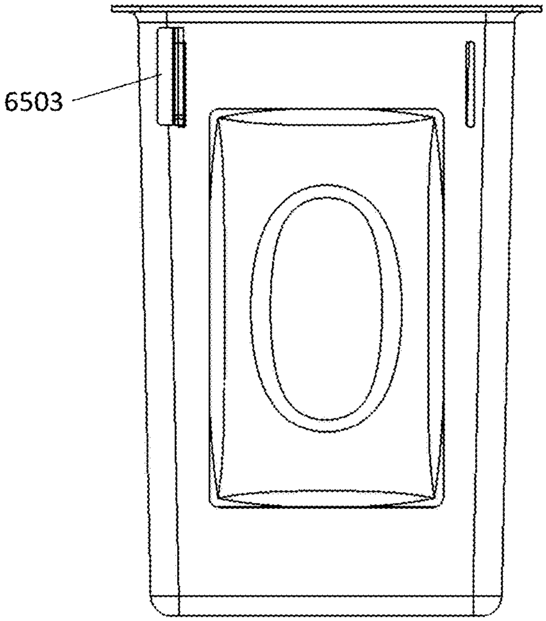

FIG. 78A illustrates a front view of a platform with a mini-rib according to one embodiment of the present invention.

Figure 78B:
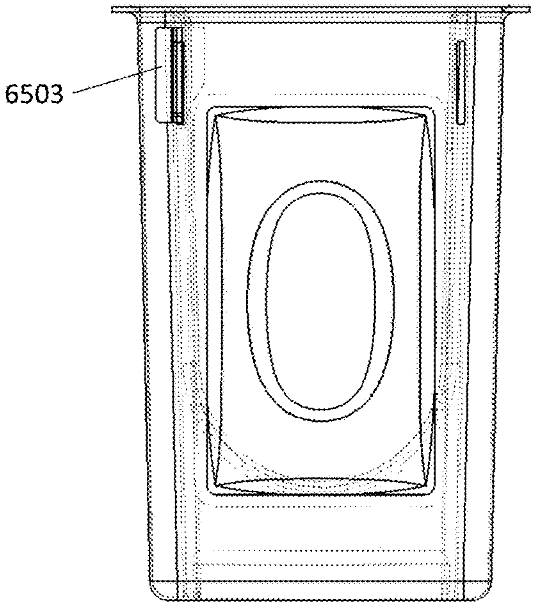

FIG. 78B illustrates a front view of a translucent platform with a mini-rib according to one embodiment of the present invention.

Figure 78C:
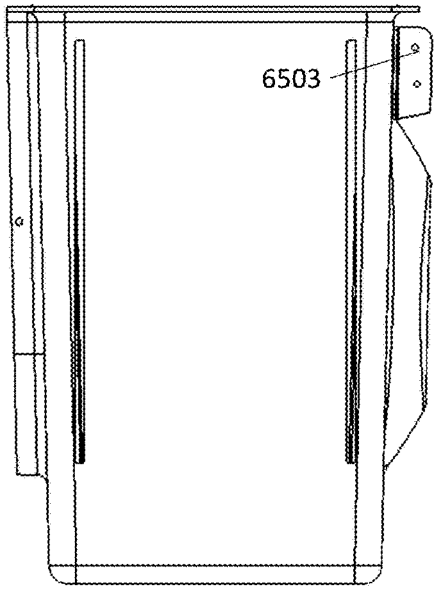

FIG. 78C illustrates a side view of a platform with a mini-rib according to one embodiment of the present invention.

Figure 78D:
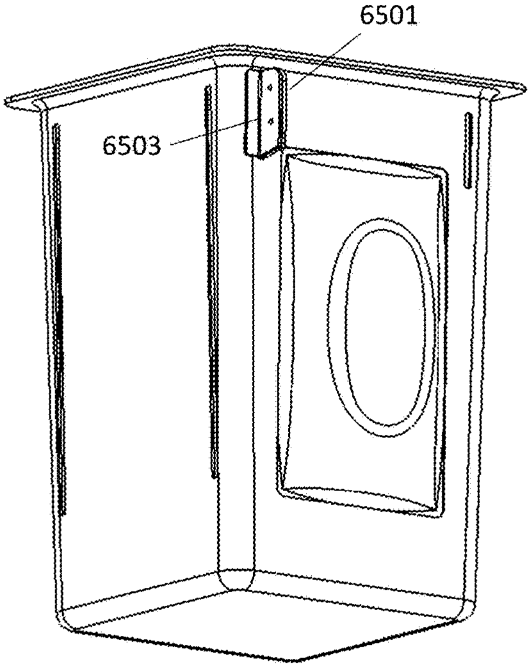

FIG. 78D illustrates a bottom perspective view of a platform with a mini-rib according to one embodiment of the present invention.

Figure 79A:
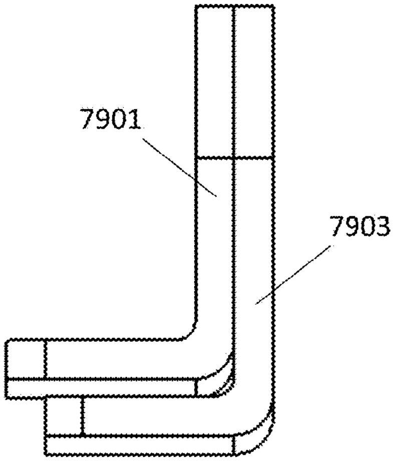

FIG. 79A illustrates a top view of a mini-rib with left L-shaped internal and external components according to one embodiment of the present invention.

Figure 79B:
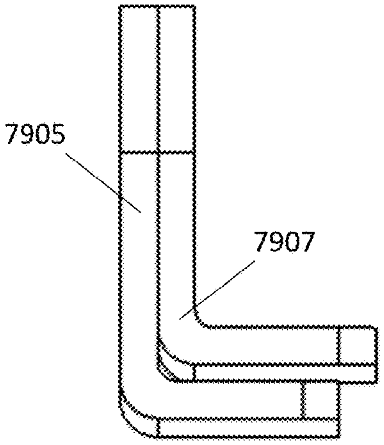

FIG. 79B illustrates a top view of a mini-rib with right L-shaped internal and external components according to one embodiment of the present invention.

Figure 79C:
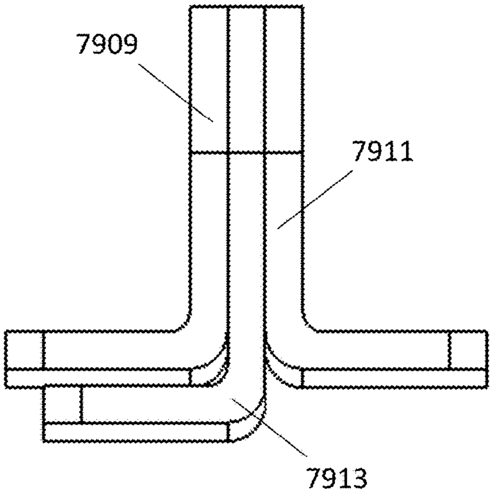

FIG. 79C illustrates a top view of a mini-rib with L-shaped external components and a left L-shaped internal component according to one embodiment of the present invention.

Figure 79D:
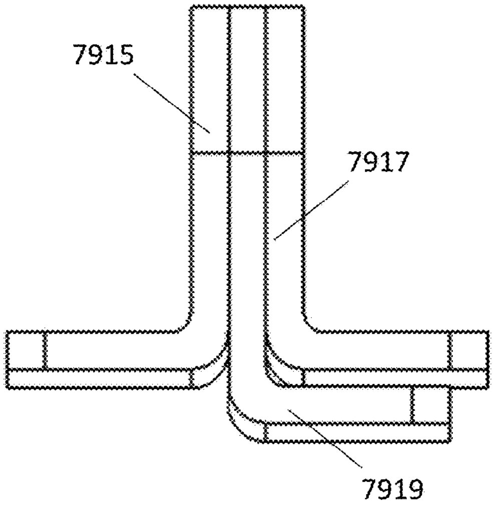

FIG. 79D illustrates a top view of a mini-rib with L-shaped external components and a right L-shaped internal component according to one embodiment of the present invention.

Figure 80A:
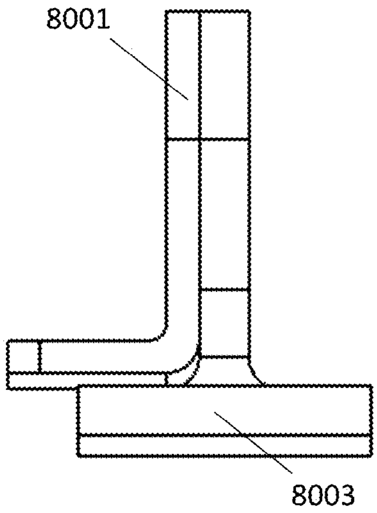

FIG. 80A illustrates a top view of a mini-rib with a left L-shaped external component and a T-shaped internal component according to one embodiment of the present invention.

Figure 80B:
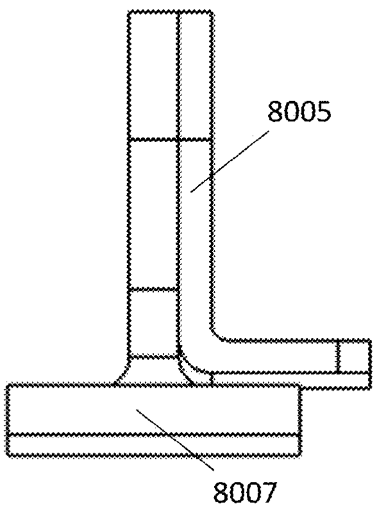

FIG. 80B illustrates a top view of a mini-rib with a right L-shaped external component and a T-shaped internal component according to one embodiment of the present invention.

Figure 80C:
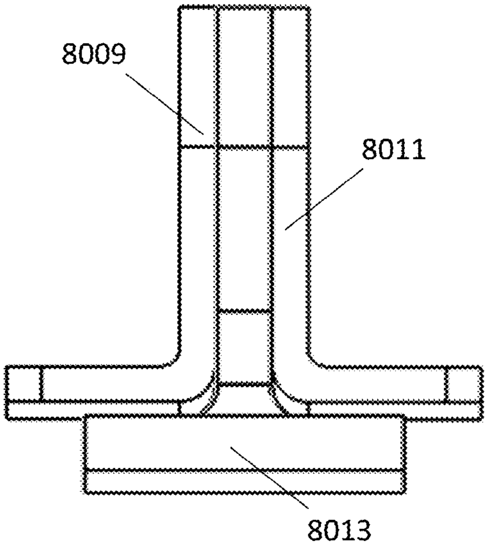

FIG. 80C illustrates a top view of a mini-rib with left and right L-shaped external components and a T-shaped internal component according to one embodiment of the present invention.

Figure 81A:
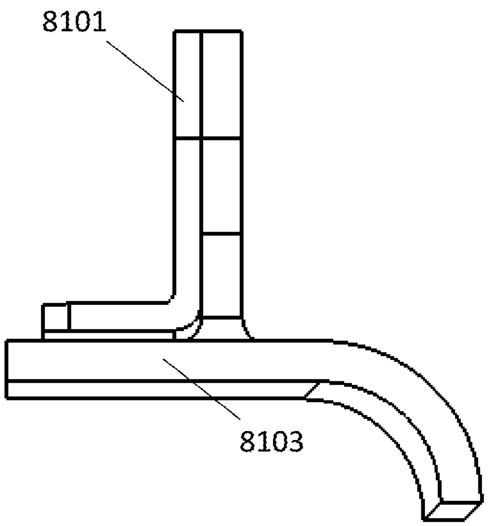

FIG. 81A illustrates a top view of a mini-rib with a left L-shaped external component and a Y-shaped internal component according to one embodiment of the present invention.

Figure 81B:
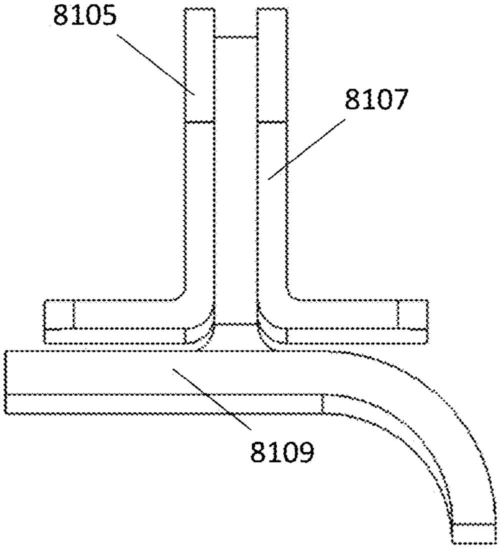

FIG. 81B illustrates a top view of a mini-rib with left and right L-shaped external components and a Y-shaped internal component according to one embodiment of the present invention.

Figure 81C:
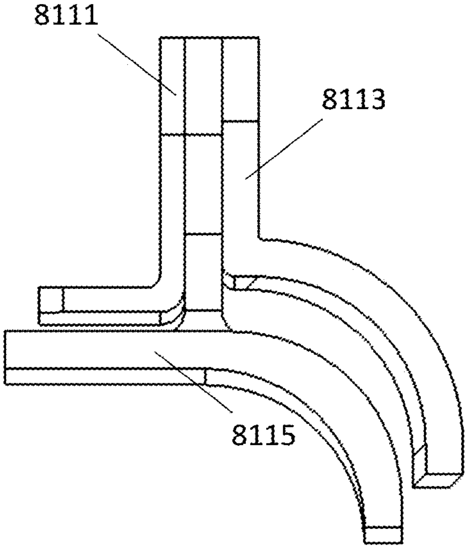

FIG. 81C illustrates a top view of a mini-rib with a left L-shaped external component, an external curved corner component, and a Y-shaped internal component according to one embodiment of the present invention.

Figure 81D:
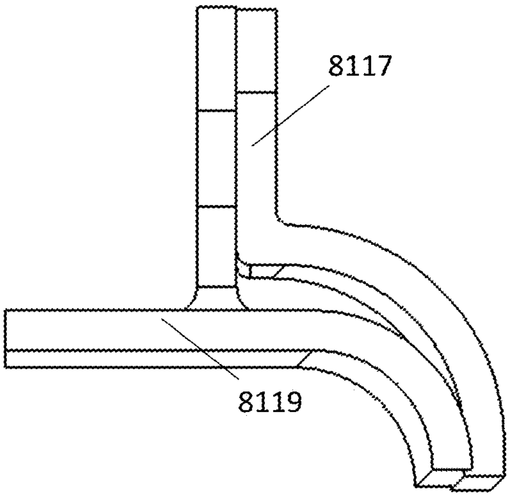

FIG. 81D illustrates a top view of a mini-rib with an external curved corner component and a Y-shaped internal component according to one embodiment of the present invention.

Figure 82A:
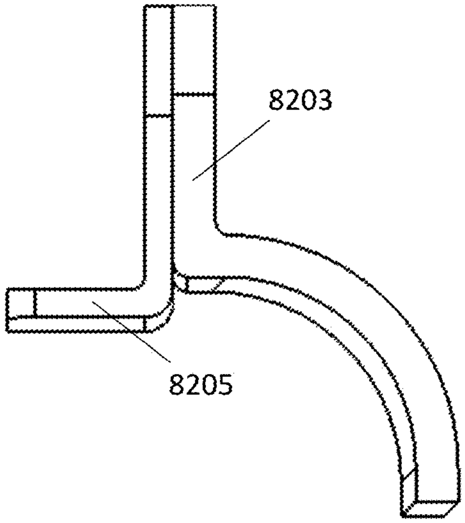

FIG. 82A illustrates a top view of a mini-rib with a left L-shaped internal component and an external curved corner component according to one embodiment of the present invention.

Figure 82B:
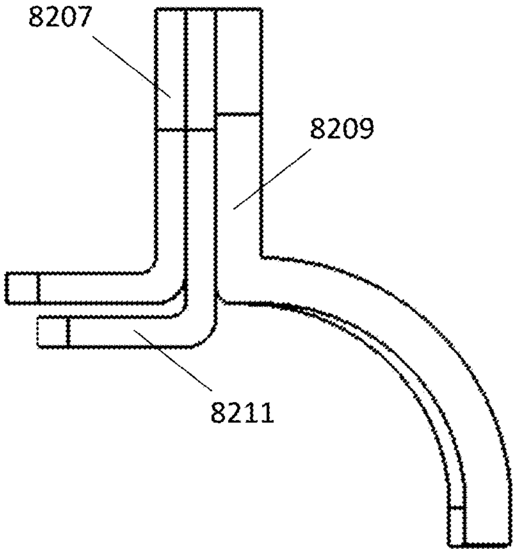

FIG. 82B illustrates a top view of a mini-rib with a left L-shaped internal component, a left L-shaped external component, and an external curved corner component according to one embodiment of the present invention.

Figure 83A:
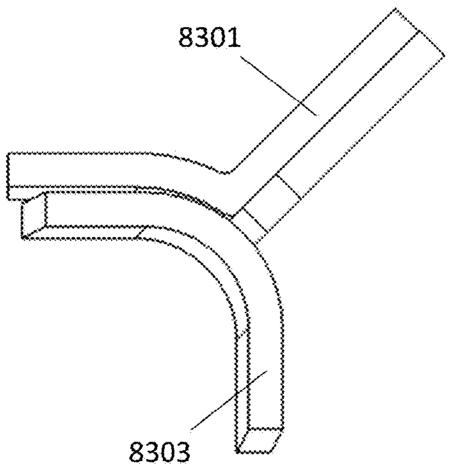

FIG. 83A illustrates a top view of a mini-rib with a left external curved corner component and a Y-shaped internal component, wherein the Y-shaped internal component includes two curved arms, according to one embodiment of the present invention.

Figure 83B:
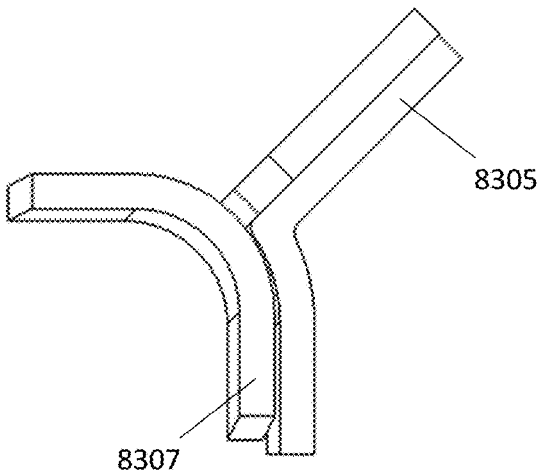

FIG. 83B illustrates a top view of a mini-rib with a right external curved corner component and a Y-shaped internal component, wherein the Y-shaped internal component includes two curved arms, according to one embodiment of the present invention.

Figure 83C:
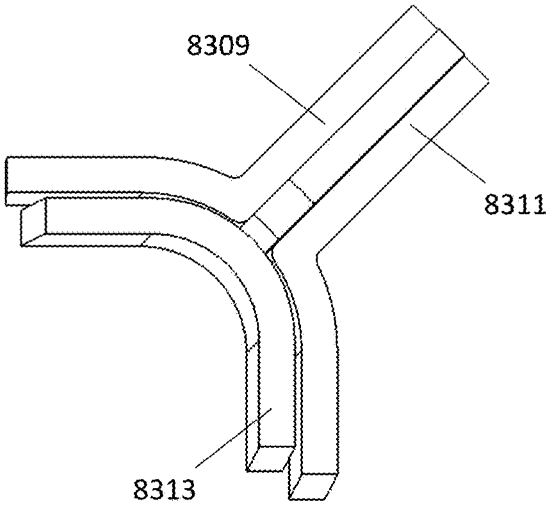

FIG. 83C illustrates a top view of a mini-rib with left and right external curved corner components and a Y-shaped internal component, wherein the Y-shaped internal component includes two curved arms, according to one embodiment of the present invention.

Figure 84A:
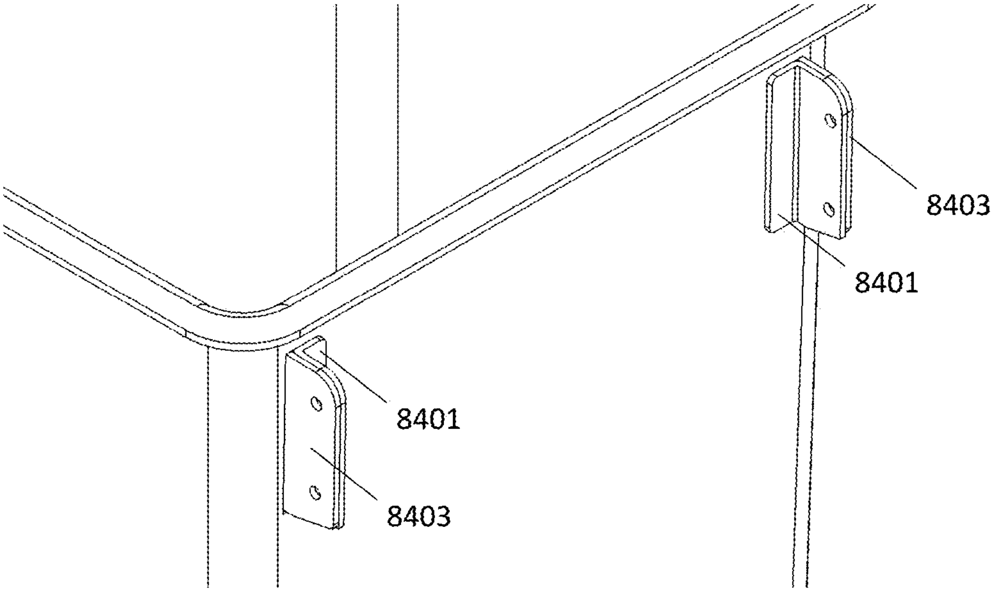

FIG. 84A illustrates a perspective view of one L-shaped external component per slot according to one embodiment of the present invention.

Figure 84B:
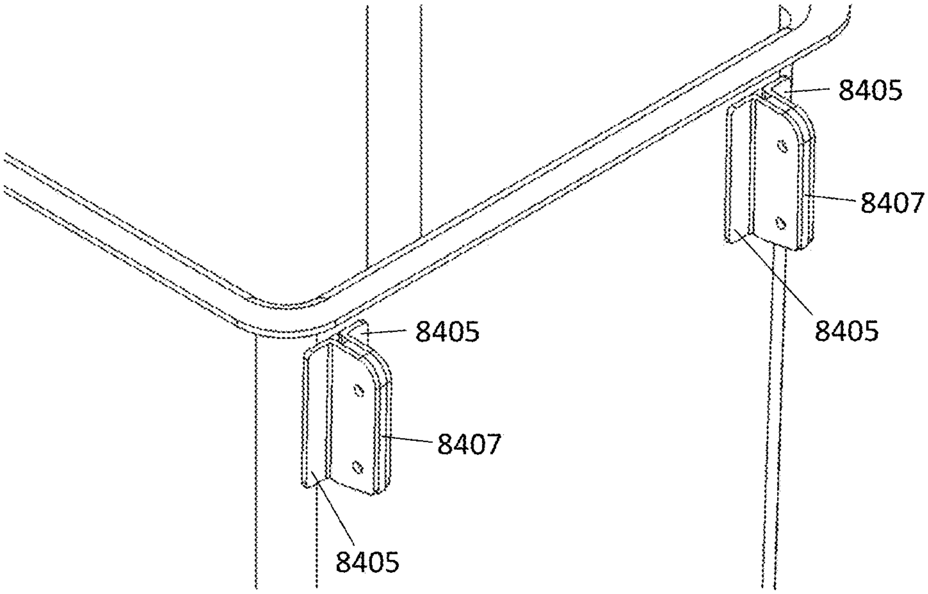

FIG. 84B illustrates a perspective view of two L-shaped external components per slot according to one embodiment of the present invention.

Figure 85A:
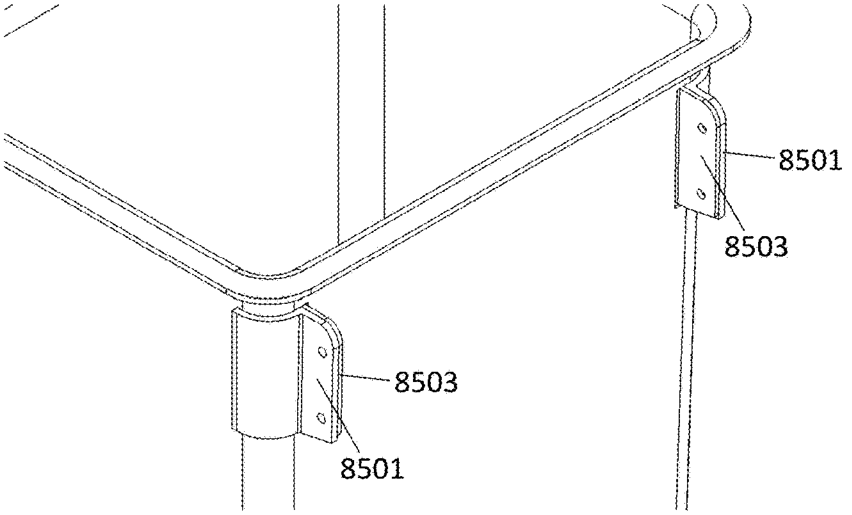

FIG. 85A illustrates a perspective view of one external curved corner component per slot according to one embodiment of the present invention.

Figure 85B:
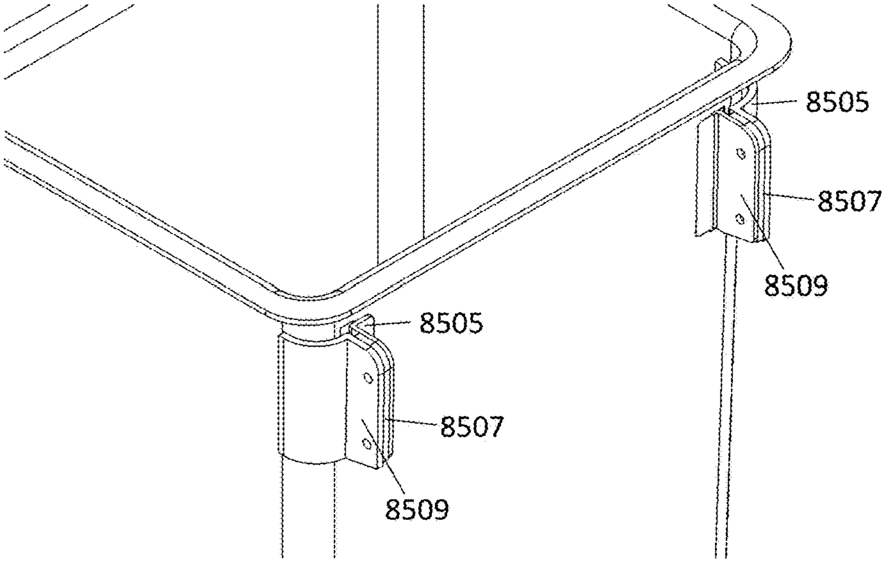

FIG. 85B illustrates a perspective view of one external curved corner component and one L-shaped external component per slot according to one embodiment of the present invention.

Figure 85C:
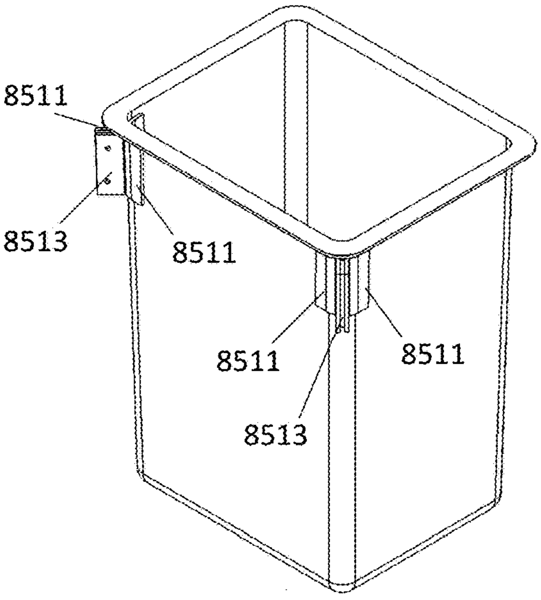

FIG. 85C illustrates a perspective view of two external curved corner components per slot according to one embodiment of the present invention.

Figure 86A:
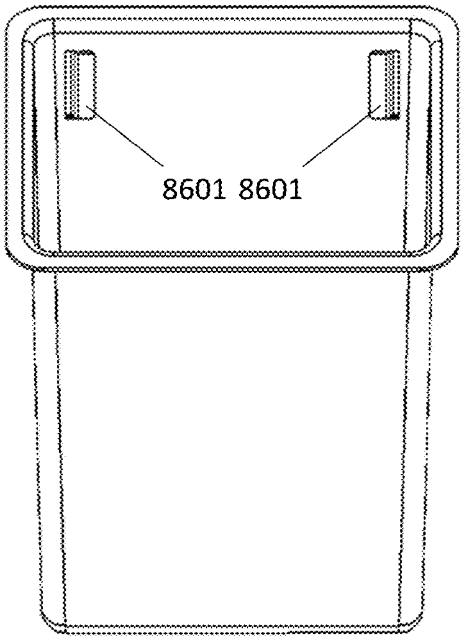

FIG. 86A illustrates a rear view of one L-shaped internal component per slot according to one embodiment of the present invention.

Figure 86B:
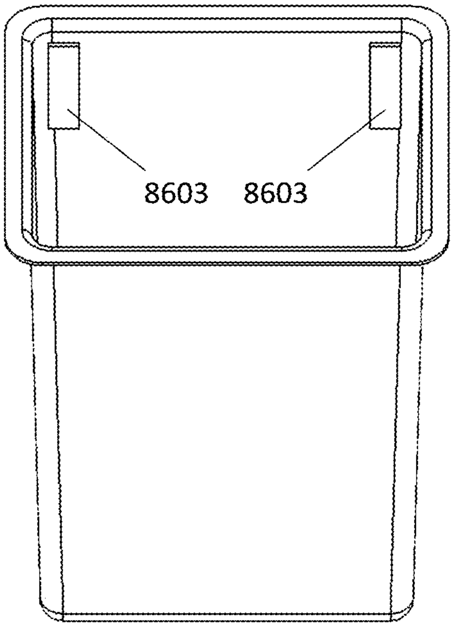

FIG. 86B illustrates a rear view of one T-shaped internal component per slot according to one embodiment of the present invention.

Figure 86C:
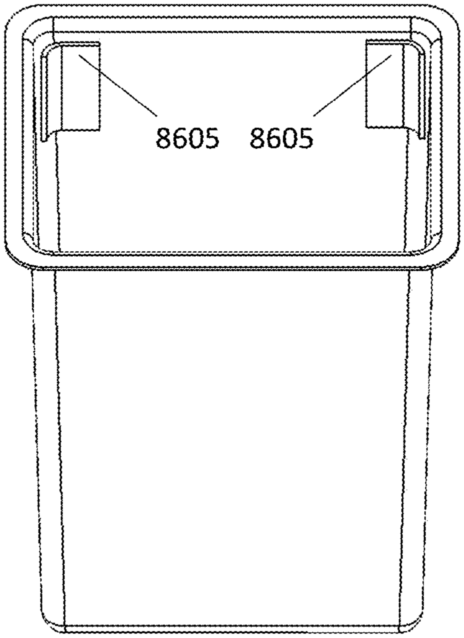

FIG. 86C illustrates a rear view of one Y-shaped internal component per slot, wherein the stem of the Y-shaped component extends through a flat portion of a wall, according to one embodiment of the present invention.

Figure 86D:
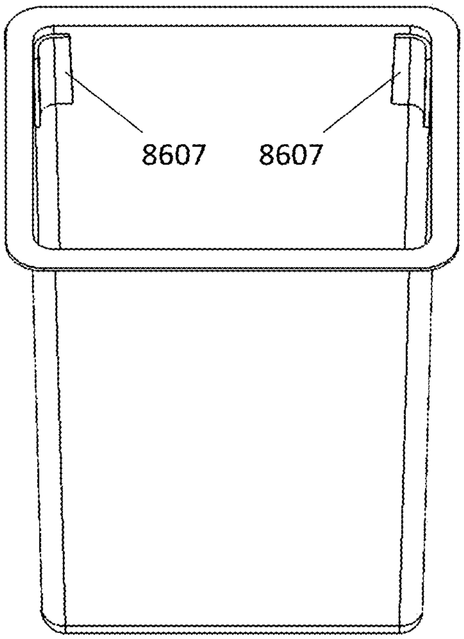

FIG. 86D a rear view of illustrates one Y-shaped internal component per slot, wherein the stem of the Y-shaped component extends through a curved portion of a wall, according to one embodiment of the present invention.

Figure 87A:
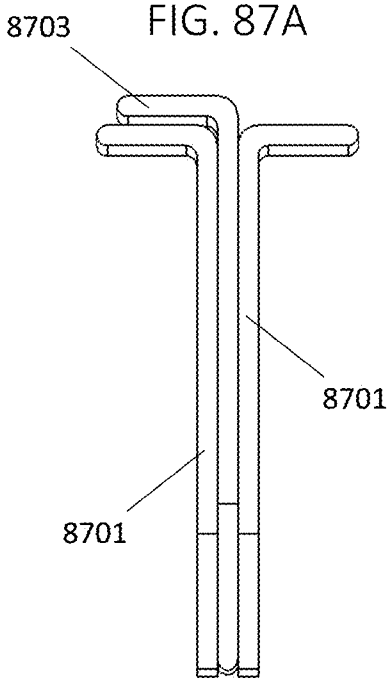

FIG. 87A illustrates a top view of an internal mini-rib with two L-shaped internal components and a left L-shaped external component according to one embodiment of the present invention.

Figure 87B:
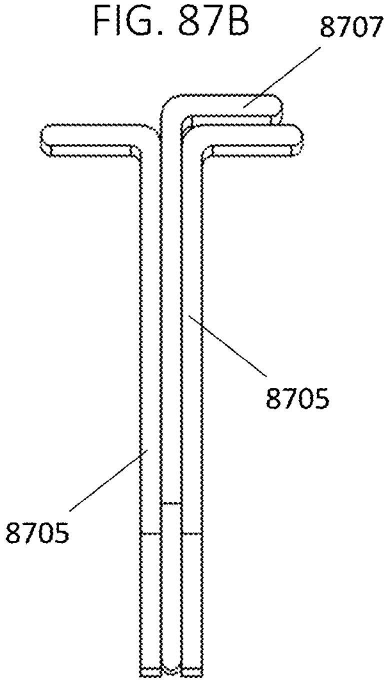

FIG. 87B illustrates a top view of an internal mini-rib with two L-shaped internal components and a right L-shaped external component according to one embodiment of the present invention.

Figure 87C:
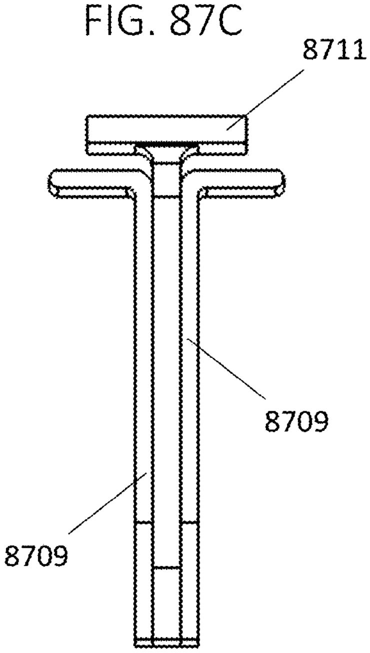

FIG. 87C illustrates a top view of an internal mini-rib with two L-shaped internal components and a T-shaped external component according to one embodiment of the present invention.

Figure 88A:
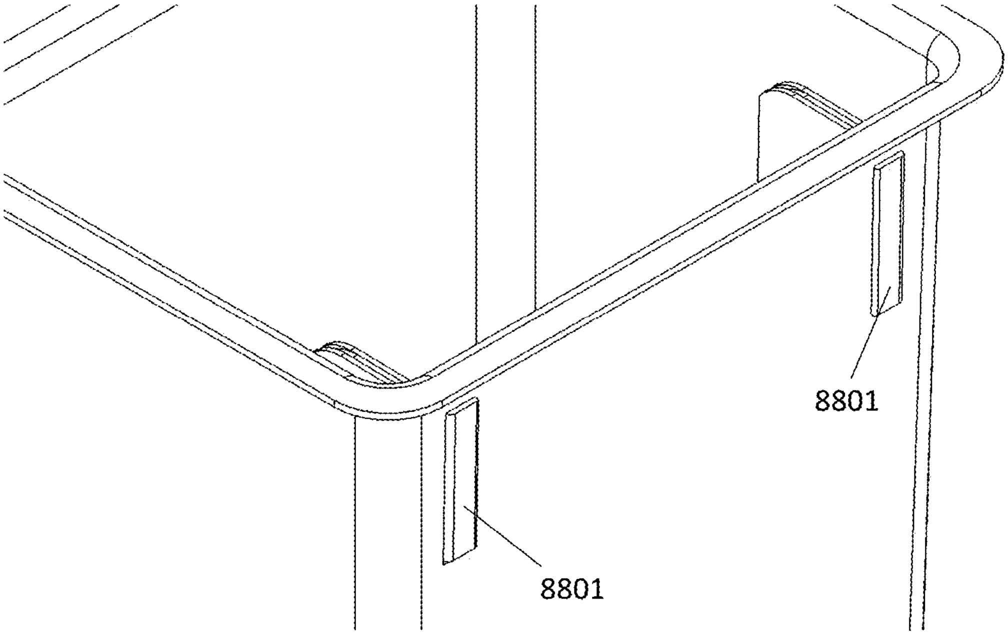

FIG. 88A illustrates a perspective view of an internal mini-rib with one L-shaped external component per slot according to one embodiment of the present invention.

Figure 88B:
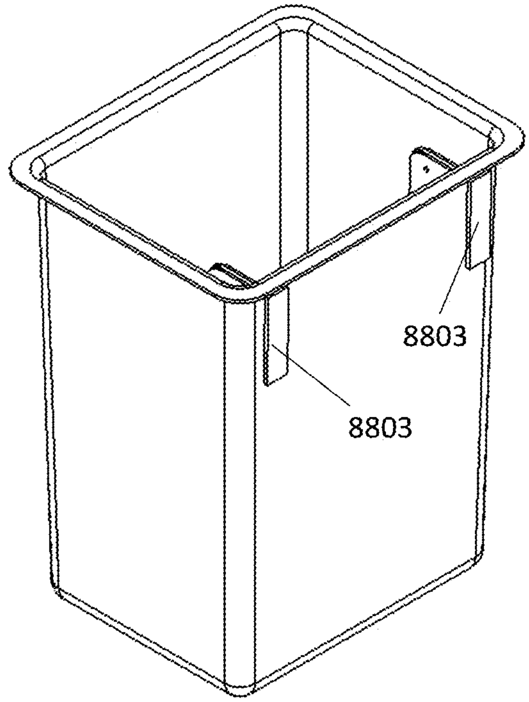

FIG. 88B illustrates a perspective view of an internal mini-rib with one T-shaped external component per slot according to one embodiment of the present invention.

Figure 89:
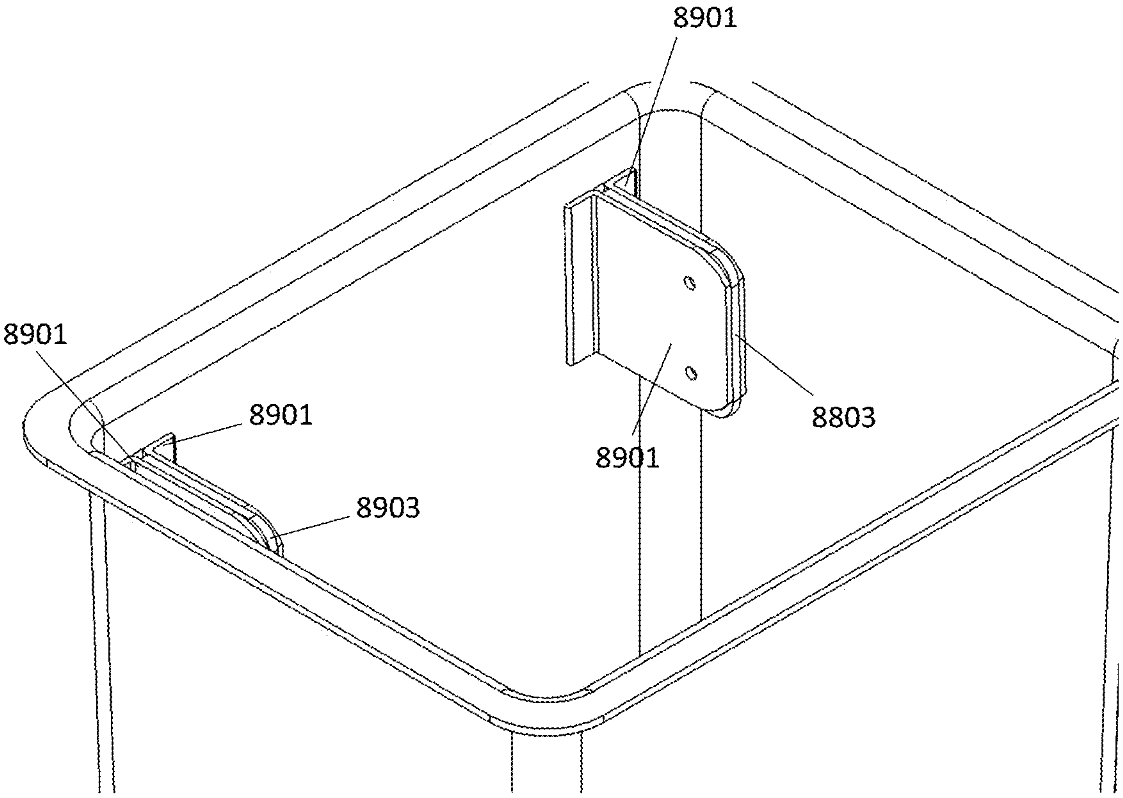

FIG. 89 illustrates an interior perspective view of an internal mini-rib with two L-shaped internal components per slot according to one embodiment of the present invention.

Figure 90A:
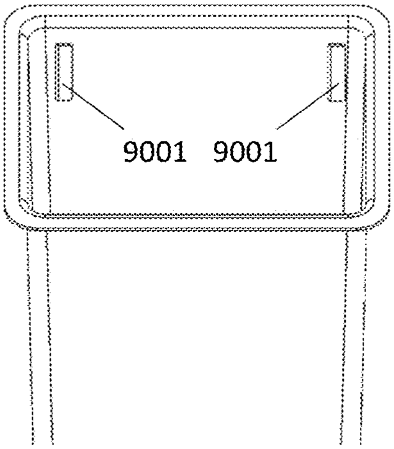

FIG. 90A illustrates a rear view of L-shaped internal components with arms extending in the same direction according to one embodiment of the present invention.

Figure 90B:
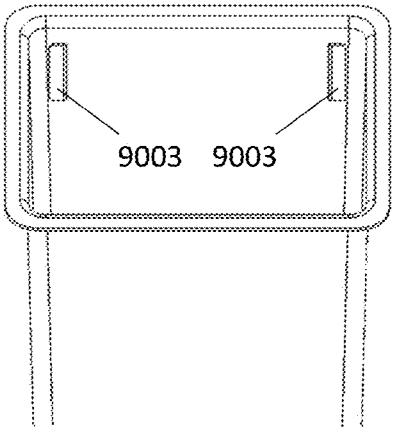

FIG. 90B illustrates a rear view of L-shaped internal components with arms extending in opposite directions away from the ribs according to one embodiment of the present invention.

Figure 90C:
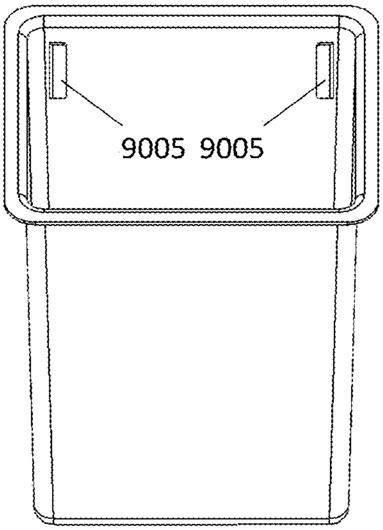

FIG. 90C illustrates a rear view of L-shaped internal components with arms extending in opposite directions toward an area between the ribs according to one embodiment of the present invention.

Figure 90D:
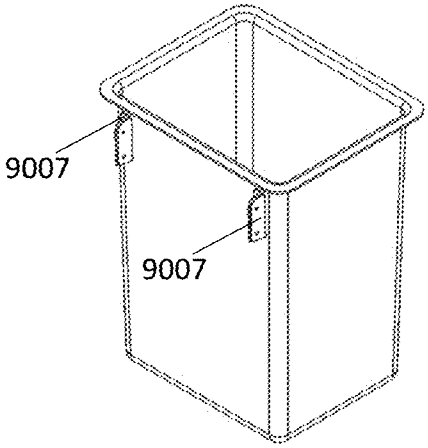

FIG. 90D illustrates a perspective view of L-shaped external components with arms extending in the same direction according to one embodiment of the present invention.

Figure 90E:
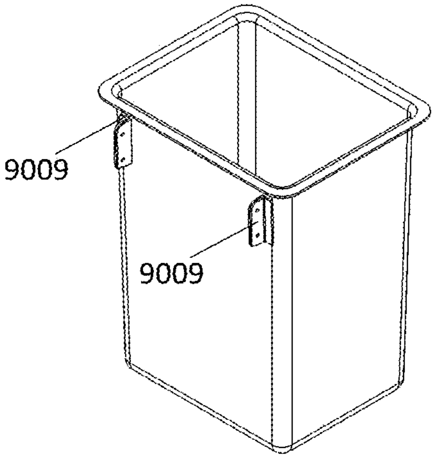

FIG. 90E illustrates a perspective view of L-shaped external components with arms extending in opposite directions away from the ribs according to one embodiment of the present invention.

Figure 90F:
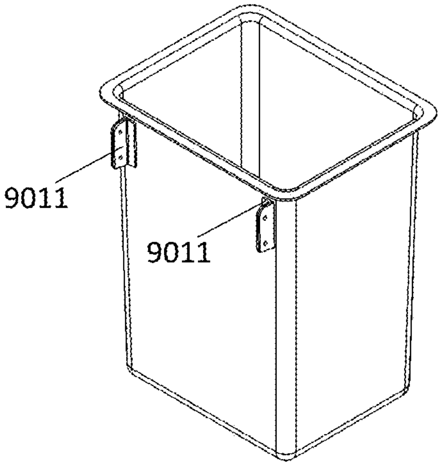

FIG. 90F illustrates a perspective view of L-shaped external components with arms extending in opposite directions toward an area between the ribs according to one embodiment of the present invention.

Figure 91A:
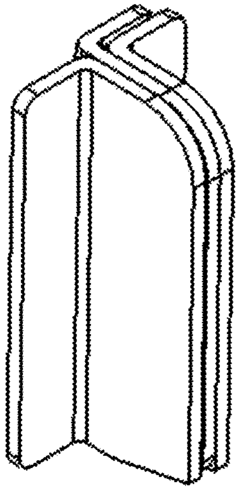

FIG. 91A illustrates a mini-rib without mounting locations according to one embodiment of the present invention.

Figure 91B:
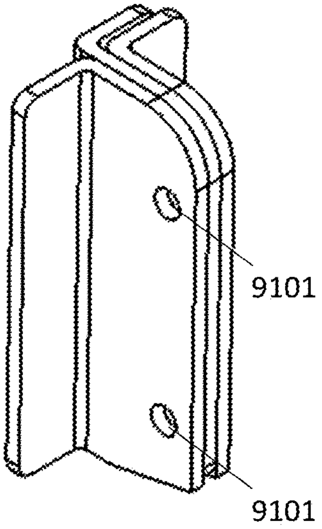

FIG. 91B illustrates a mini-rib with two mounting location points according to one embodiment of the present invention.

DETAILED DESCRIPTION

In one embodiment, the present invention is directed to a rib for an elevating platform, comprising: at least two rib components, wherein the at least two rib components include an internal rib component and an external rib component; wherein the internal rib component and the external rib component are both L-shaped and both include an arm and a stem; wherein the external rib component is positioned completely on the external side of a sidewall; wherein the arm of the internal rib component contacts an internal surface of the sidewall, and wherein the arm of the external rib component contacts an external surface of the sidewall; wherein the stem of the internal rib component extends through a sidewall cutout to an external side of the sidewall; wherein the stem of the internal rib component is in contact with the stem of the external rib component; and wherein the mated stems of the internal rib component and the external rib component are configured to attach to and support at least one load.

In another embodiment, the present invention is directed to a rib for an elevating platform, comprising: at least two rib components, wherein the at least two rib components include an internal rib component and an external rib component; wherein the internal rib component and the external rib component each include at least one arm and at least one stem; wherein the at least one arm of the internal rib component contacts an internal surface of a sidewall, and wherein the at least one arm of the external rib component contacts an external surface of the sidewall; wherein the at least one stem of the internal rib component extends through a sidewall cutout in a sidewall to an external side of the sidewall; wherein the at least one stem of the internal rib component and the at least one stem of the external rib component are mated; and wherein the mated at least one stem of the internal rib component and the mated at least one stem of the external rib component are operable to attach to at least one load bearing apparatus.

In yet another embodiment, the present invention is directed to a rib for an elevating platform, comprising: at least two rib components, wherein the at least two rib components include an internal rib component and an external rib component; wherein the internal rib component and the external rib component each include at least one arm and at least one stem; wherein the at least one arm of the internal rib component contacts an internal surface of a sidewall, and wherein the at least one arm of the external rib component contacts an external surface of a sidewall; and wherein the internal rib component and the external rib component each include at least one mounting location.

Clear Platform

Typical prior art platforms are opaque and an operator cannot see through them. If the platform is being used in a tight space or the operator needs to see what is just outside the platform, the clear platform increases the operator's visibility of his surroundings. When a platform is opaque there is an increased probability of the operator striking an object with the platform because of reduced visibility.

Referring now to the drawings in general, the illustrations are for the purpose of describing a preferred embodiment of the invention and are not intended to limit the invention thereto.

The invention is directed to elevating platforms with walls, panels, knee spaces, floors, doors and combinations thereof made of clear or transparent and/or translucent materials to provide high visibility to the operator. The platform is constructed using optically clear or translucent materials, either in strategic locations or having an entirely clear platform, thereby giving the operator enhanced visibility around the platform, resulting in better performance. The present invention also increases operator safety and extends the life of platforms by making it easier for the operator to avoid running the platform into objects.

Figure 1:
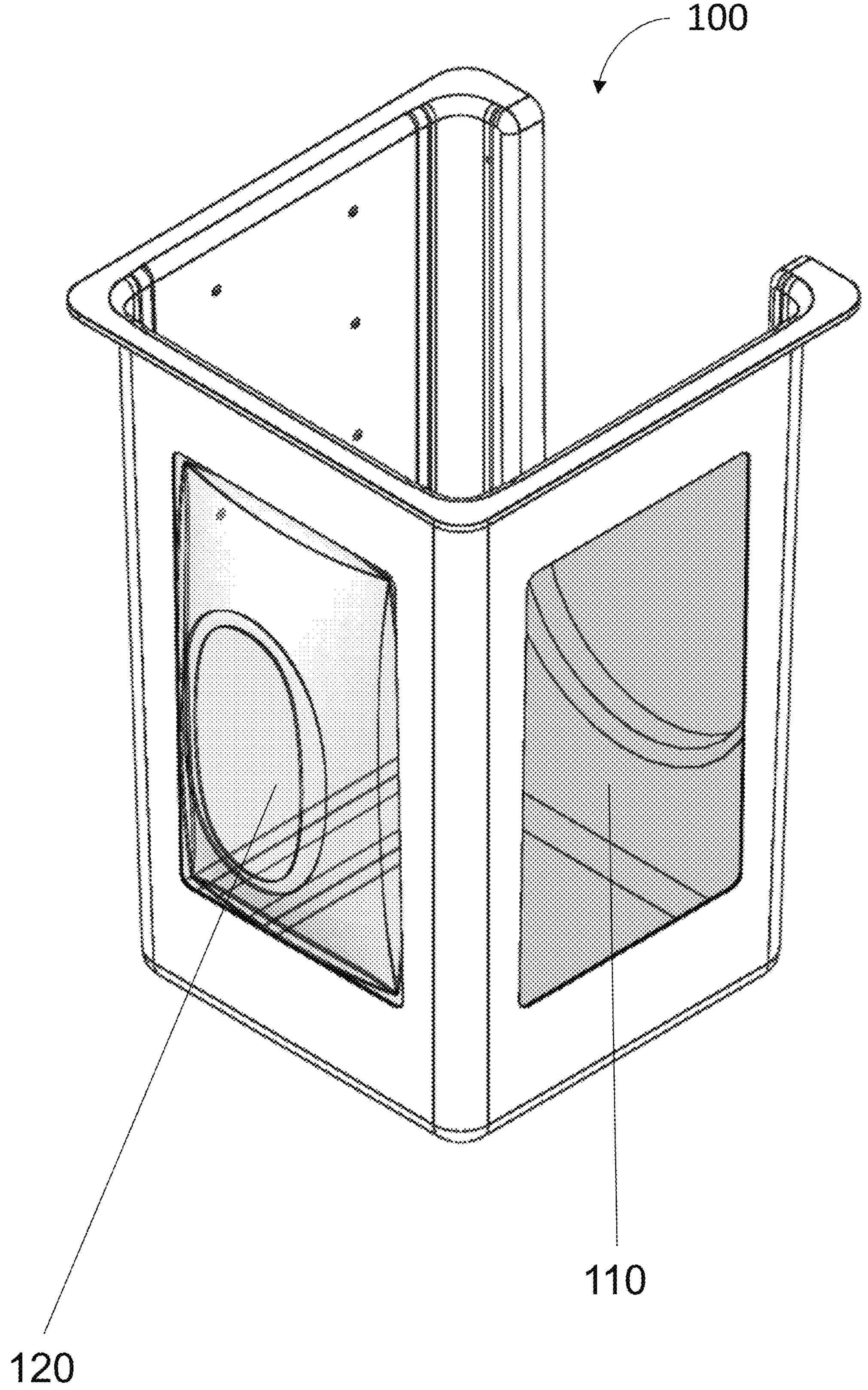
FIG. 1 provides a perspective view of an elevating platform with transparent sidewalls according to the present invention.
Figure 2:
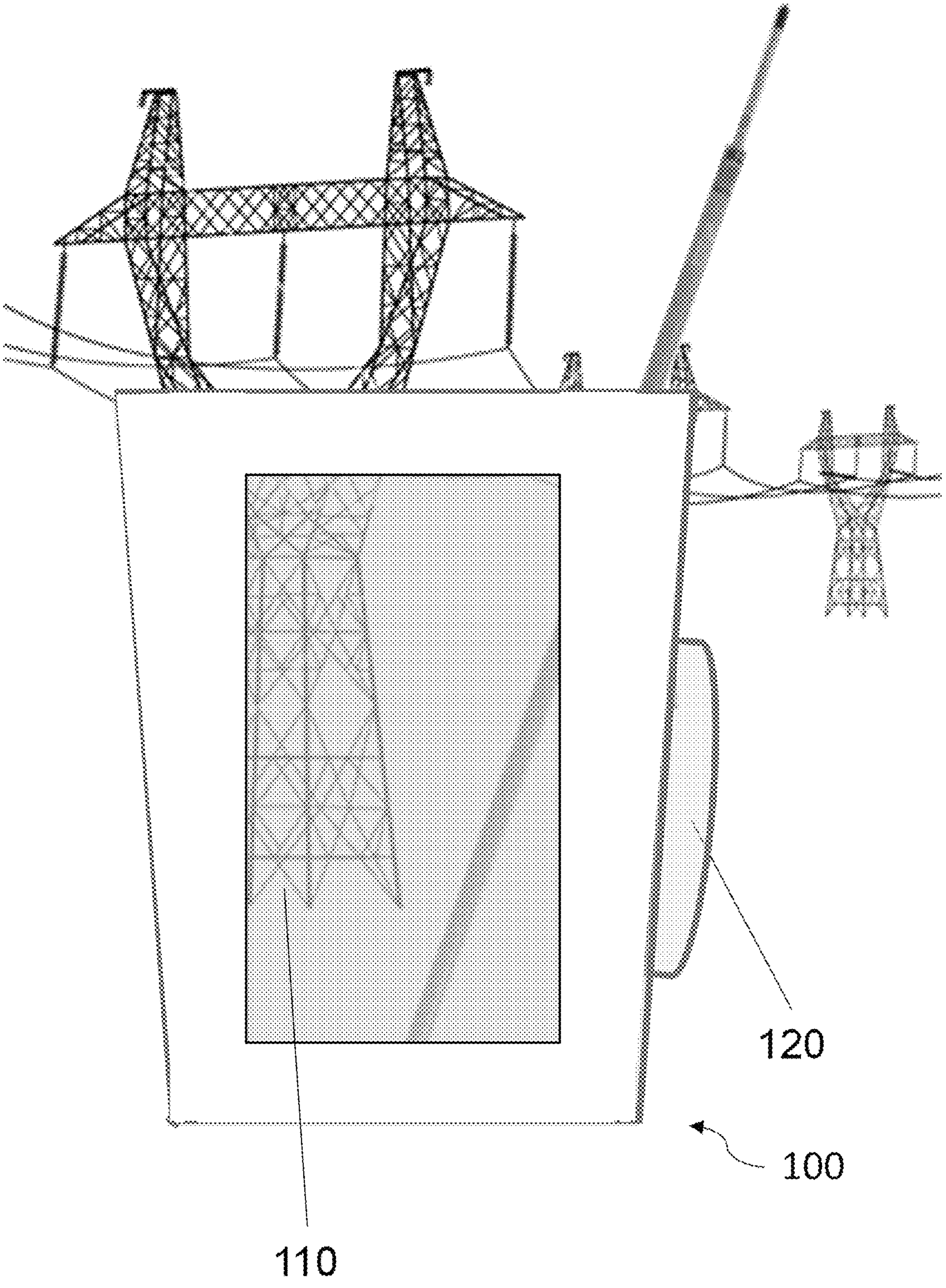
FIG. 2 provides a side view of an elevating platform made of transparent materials according to the present invention.

The present invention provides for different combinations of materials to achieve the enhanced visibility. Some example configurations are as follows: Using a standard, opaque fiberglass platform, generally described as 100 in FIG. 1, sections of one or more walls are cut out and a clear, transparent panel 110 or panels are attached. The clear replacement section is a planar shape or an outwardly bulbous shape 120 which provides space for the knees of a squatting operator. In another configuration, the platform door is constructed of clear material. In yet another configuration, the platform is constructed in the typical fashion, but a resin system with a reflectance and refractive index similar to glass is used, yielding an entirely clear platform with similar image displacement as glass (FIG. 2).

The clear materials are attached to a typical fiberglass platform by adhesive bonding, mechanical fastening, and combinations thereof. If the fiberglass platform is made to be clear, a resin is chosen to match the reflectance and refractive index of the glass, resulting in a composite laminate that is optically clear and with similar image displacement as glass. The clear material has a refractive index of between about 1.3 and 1.7, a reflectance between about 70 and 100, negligible scattering and negligible absorbance.

For translucent designs, the translucent material is preferably between about 30% and about 70% light transmission. More preferably, the % light transmission is about 40-60%. In another embodiment, the % light transmission is about 50%. An example preferred embodiment is white polycarbonate with a % light transmission of between about 30% and about 70%. The make and model of an example preferred white translucent polycarbonate is Sabic Lexan XL102UV.

Alternatively, a fiber reinforced thermoset resin with a clear gel coat may be used to produce an entirely translucent platform structure. Translucent components such as panels, knee spaces, and doors could then be attached to the translucent platform structure. These translucent components may be made from Polycarbonate, Acrylic, Nylon, Polypropylene, fiber reinforced thermosets, and unreinforced thermosets.

Alternatively, polycarbonate, acrylic, nylon, polypropylene, fiber-reinforced thermosets, and unreinforced thermosets may be used to produce an entirely translucent platform.

In another alternative embodiment, a platform structure is made with fiberglass, an optically clear thermoset resin, and a translucent gel coat to allow light transmission but maintain privacy.

Alternatively, a reinforced thermoplastic such as Vectorply EPP-W 1500 or Vectorply EPP-W 2200 may be used to create an entire platform or platform components such as a panel, knee space, door, rib, mini-rib, or any other component recited in the present specification. The Vectorply products are a fiberglass reinforced polypropylene and they become translucent after they are processed during manufacturing of platforms and platform components.

In a preferred embodiment, the resins are acrylic-modified resins such as POLYLITE 32030-00 and 32030-10, manufactured by REICHHOLD, Research Triangle Park, NC, USA. In one embodiment, the acrylic-modified resins include polyester resins. Preferably, the acrylic-modified resins are low-viscosity resins, low-reactivity resins, and UV-stabilized resins. Any clear or translucent thermoplastic or thermoset, impact-resistant polymer, such as polycarbonate, can be used without departing from the scope of the invention.

The invention is thus directed to an elevating platform with at least one wall; and further including at least one panel, at least one knee space, and/or at least one door. The at least one wall, the at least one panel, the at least one knee space, and/or the at least one door is formed of a clear or translucent material, thereby providing an elevating platform which provides for greater visibility to an operator. In another embodiment, the elevating platform includes at least one clear or translucent section in the at least one wall, wherein the remainder of the at least one wall is constructed out of a different material than the at least one clear or translucent section. The at least one clear or translucent section is attached to the elevating platform by adhesive bonding and/or mechanical fastening. The at least one clear or translucent section is a planar shape or a knee space formed by an outwardly bulbous shape using clear or translucent material. The knee space provides space for at least one knee of a squatting operator. In another embodiment, the entire elevating platform is constructed using fiberglass and a clear or translucent resin system such that the elevating platform is entirely clear or translucent. The clear resin system has a refractive index between about 1.3 and about 1.7. The translucent resin system has a % light transmission of between about 30% and about 70%. The clear or translucent material is fiber-reinforced thermosets, unreinforced thermosets, fiber-reinforced thermoplastics, and/or unreinforced thermoplastics. The translucent resin system is preferably white polycarbonate. In general, the platform is preferably formed with fiber-reinforced thermosets, unreinforced thermosets, fiber-reinforced thermoplastics, and/or unreinforced thermoplastics.

Platform Step

Figure 3A:
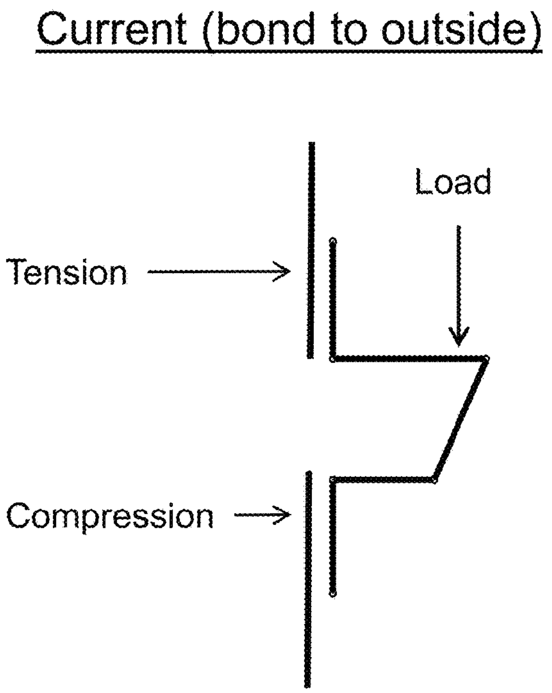
FIG. 3A is a side cross-sectional view of a prior art platform step design.

The present invention is further directed to a step for use in elevating platforms. Steps are located on the sidewall of a platform, and the operator uses them as an aid to get into and out of the platform. Typical prior art steps have a flange all around the step that is bonded to the outside of the platform wall (FIG. 3A). When a load is applied to the step (e.g. an operator stands on it), the bondline on the upper portion of the step flange is in tension (step is trying to pull away from the platform wall). The bondline on the lower portion of the step flange is in compression (trying to push into the platform wall). Failures typically initiate on the portion of the bondline that is in tension, and not on the portion of the bondline in compression.

Figure 3B:
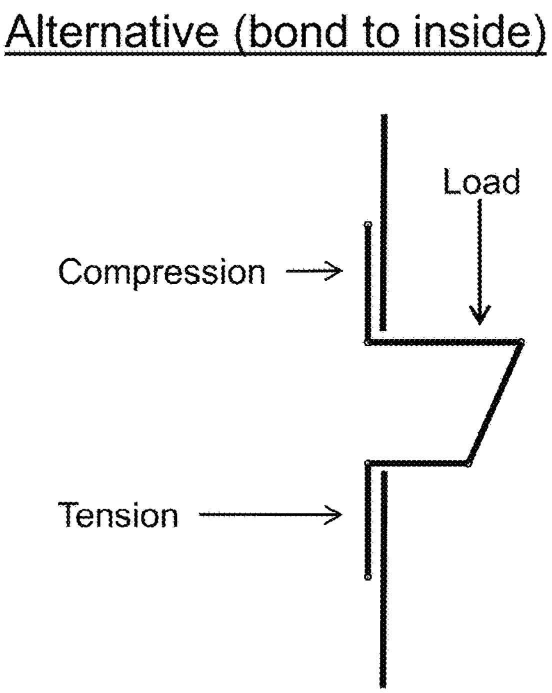
FIG. 3B is a side cross-sectional view of another prior art platform step.

In an alternative prior art embodiment (FIG. 3B), a cutout is made in the platform wall, and a step is inserted through it from the inside. The flange of the step is bonded to the inside of the platform wall. In this embodiment, the top bondline is in compression and the bottom bondline is in tension (the step is being pushed into the platform).

Both of these embodiments rely on the strength of the adhesive, rather than on the structural strength of the components.

Figure 4:
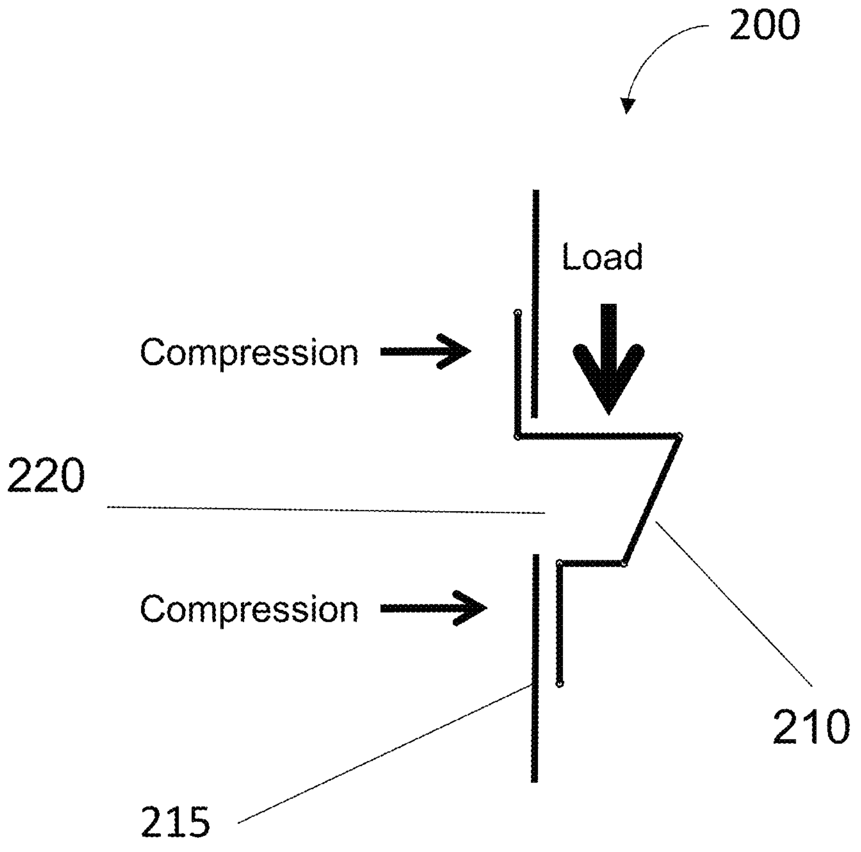
FIG. 4 provides a side cross-sectional view of a platform step design according to the present invention.
Figure 5:
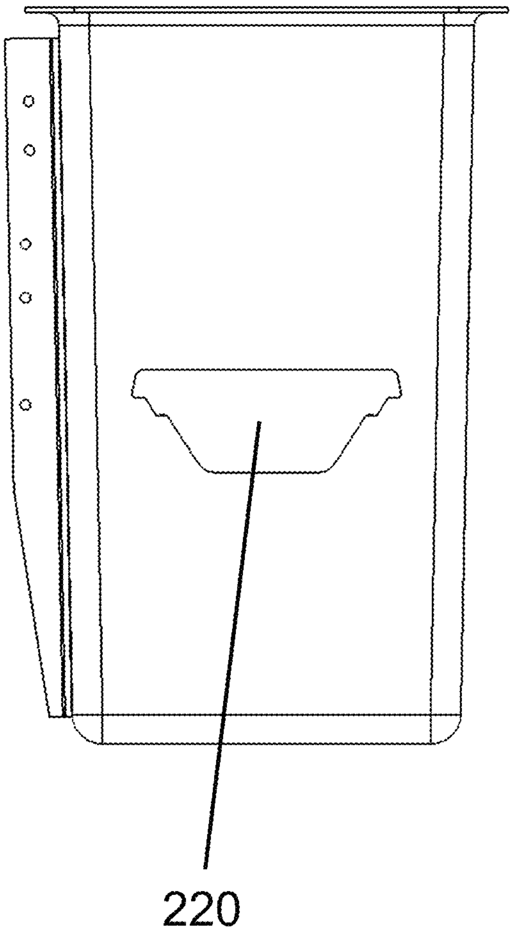
FIG. 5 provides a side view of a platform with a step cut-out according to the present invention.
Figure 6:
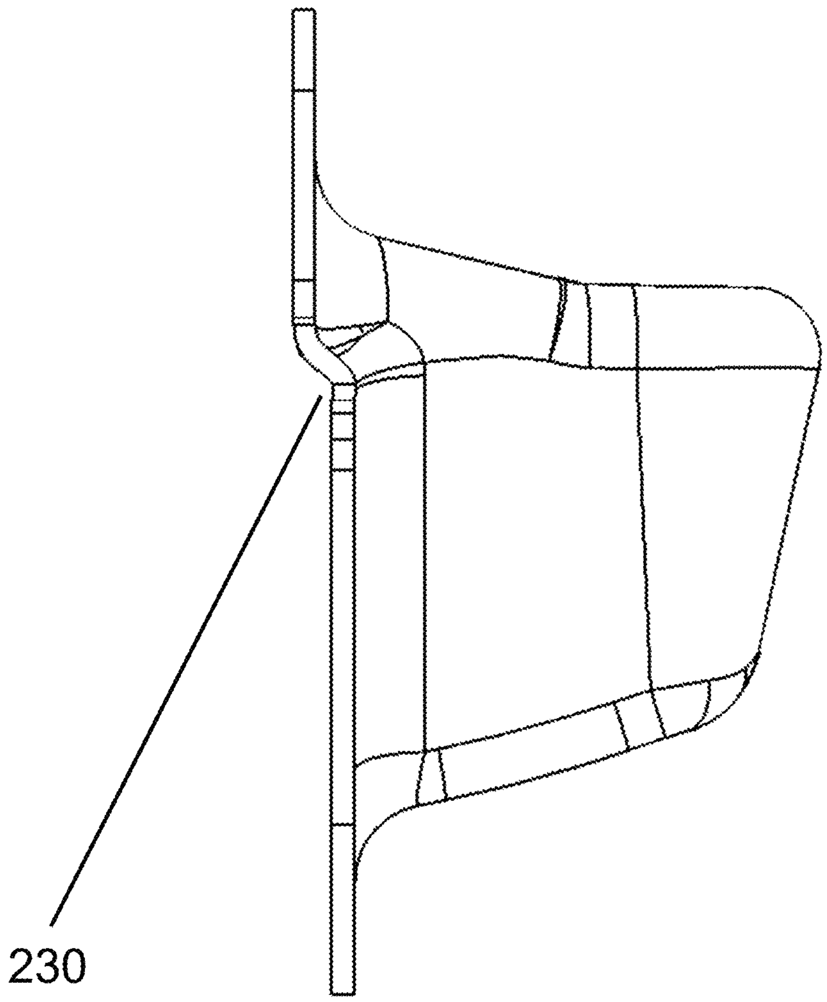
FIG. 6 provides a side view of a step according to the present invention.
Figure 7:
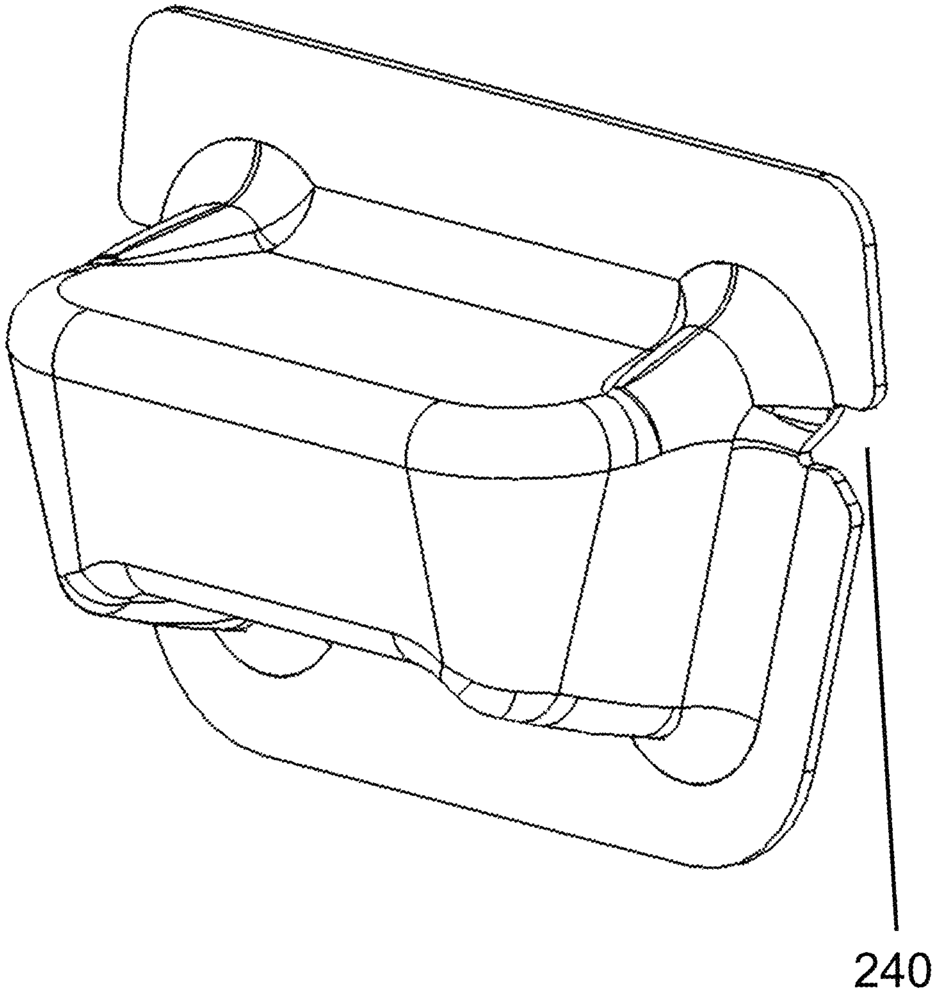
FIG. 7 provides a front perspective view of a step according to the present invention.
Figure 8:
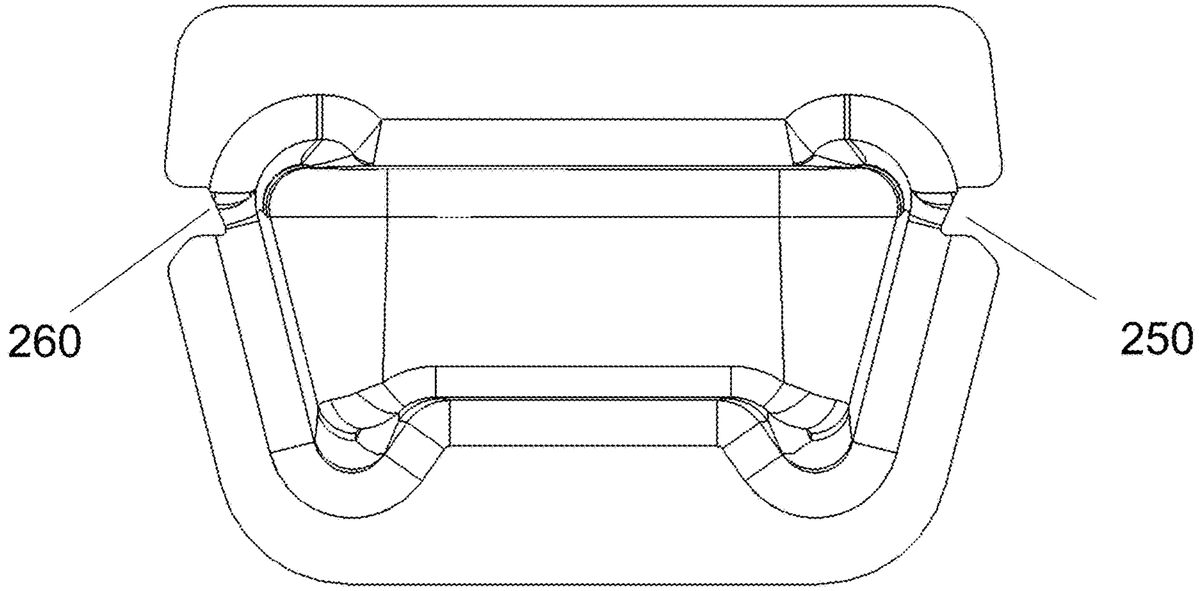
FIG. 8 provides a front view of a step according to the present invention.

The present invention eliminates the weakness of the prior art by having both the top and bottom bondlines in compression. As shown in FIG. 4, the present invention provides for a specifically designed platform cutout 220 in the sidewall 215 of the platform that the step fits into. The system, generally shown as 200 in FIG. 4, includes a step 210 that is specifically designed and configured to lock into the cutout 220 (FIG. 5). The step includes at least one transition 230 (FIG. 6) and at least one notch 240 (FIG. 7). The notch and opposite margin are designed such that when the step is inserted into the cutout with the bottom of the notch touching the sidewall, the opposite top flange 250 (FIG. 8) clears the cutout and is moved into the platform by pivoting the step around the notch. The step transition 230 is designed and configured such that the top and bottom flanges fully contact the inner and outer sidewall, respectively. This contact serves to provide more surface contact area between the step and the sidewall. This design provides that the upper portion of the flange compresses against the inside of the platform wall and the lower portion of the flange compresses against the outside of the platform wall, thus causing both portions to be under compression, rather than tension. Thus, all loads on the step are compressive loads.

Preferably, a second notch 260 is provided on the margin opposite the first notch, such that when the step is centered, a portion of the second side margin extends over the sidewall, covering it. This coverage provides for a seal of the cutout. Some platform assemblies that include a platform step are used with insulating liners and other platform assemblies that include a platform step are not used with insulating liners. According to ANSI A92.2-2015 Section 4.9.5.1, platforms for use with insulating liners shall not have drain holes or access openings. Therefore the platform step cutout must be sealed if the platform is going to be used with an insulating liner. The platform step is fixed to platforms the same way if the platform is or is not going to be used with an insulating liner, therefore the step cutout must always be sealed.

To mount the step in the cutout (FIGS. 9A-E), the step is first moved into place (FIG. 9A). A step notch is inserted into the cutout notch (FIG. 9B). The step is then rotated to completely insert the top flange into the cutout (FIG. 9C). The step is centered in the cutout opening (FIG. 9D). The step is then lowered until it locks into place (FIG. 9E).

Different designs and configurations can be used without departing from the scope of the invention.

In another embodiment, the invention is thus directed to a step for an elevating platform with a sidewall, the step includes a top flange, a bottom flange, and a transition. The top flange and the bottom flange are joined by the transition; and the step is configured to insert into a cutout in the platform sidewall. The bottom flange is configured to contact an outer surface of the platform sidewall when the top flange contacts an inner surface of the sidewall. In one embodiment, the step includes a first step notch in a first side of the transition, configured such that when the first step notch is inserted into a first cutout notch of the cutout in the platform sidewall, the top flange of the platform step is operable to be inserted into the cutout of the sidewall and the platform step is operable to be pivoted via the first step notch in the first cutout notch such that the top flange contacts the inner surface of the sidewall. Another embodiment includes a second step notch in a second side of the transition; the platform step operable to lock into the elevating platform by positioning the top flange such that the top flange contacts the inner surface of the sidewall, positioning the first step notch in the first cutout notch, and positioning the second step notch in a second cutout notch. The top flange is configured such that when the platform step is locked into the platform sidewall and adhered to the elevating platform with adhesive, the top flange of the platform step covers the cutout, thereby sealing it. The platform step is also configured such that when the platform step is locked into the platform sidewall, the top flange of the platform step compresses the inner surface of the sidewall and the bottom flange of the platform step compresses the outer surface of the sidewall, thus providing compressive bonds between the platform step and the sidewall.

In yet another embodiment, the invention is also directed to an elevating platform with a cutout to receive the top flange of the step as previously described. The elevating platform includes a first cutout notch configured such that when the first step notch is inserted into a first cutout notch of the cutout, the top flange of the platform step is operable to be inserted into the cutout of the sidewall and the platform step is operable to be pivoted via the first step notch in the cutout notch such that the top flange contacts an inner surface of the sidewall. The elevating platform and step are operable to lock together by positioning the top flange such that the top flange contacts the inner surface of the sidewall, positioning the step notch in the cutout notch, and positioning a second step notch in a second cutout notch. The top flange and the cutout are configured such that when the platform step is locked into the elevating platform and adhered to the elevating platform with adhesive, the top flange of the platform covers the cutout, thereby sealing it. The platform cutout and platform step are configured such that when the platform step is locked into the elevating platform, the top flange of the platform step compresses the inner surface of the sidewall and the bottom flange of the platform step compresses an outer surface of the sidewall, thus providing compressive bonds between the platform step and the sidewall. In one embodiment, the cutout includes a top cutout portion and a bottom cutout portion, wherein the top cutout portion is wider than the bottom cutout portion; and the platform step includes a first side notch and a second side notch. The top flange and the cutout are configured such that when the first side notch is in contact with the first sidewall at the bottom cutout portion, the top cutout portion is operable to receive the top flange. Then, the first side notch and the second side notch are operable to lock into the bottom cutout portion of the cutout, thereby locking the platform step into the elevating platform. The top flange and the cutout are configured such that when the platform step is locked into the elevating platform and adhered to the elevating platform with adhesive, the top flange of the platform step covers the cutout, thereby sealing it.

The step is preferably formed with fiber-reinforced thermosets, unreinforced thermosets, fiber-reinforced thermoplastics, and/or unreinforced thermoplastics.

Platform Rib

Currently multiple platform sizes and shapes are manufactured via Light Resin Transfer Molding (LRTM) with molded-in ribs or via hand layup with molded-in ribs. There are several disadvantages associated with this construction. The molded-in ribs necessary to provide structural support are thick, which adds unnecessary weight to the platform. Quality issues related to molded-in ribs occur because this design is difficult to manufacture. For example, it is difficult to spray gel coat in a uniform thickness in the mold rib cavity. It is also difficult to consistently place fiberglass in the mold rib cavity. Some molded-in ribs have foam cores, and gel coat cracking can occur more easily in ribs with foam cores when compressive forces are applied such as when platform mounting studs are tightened.

Furthermore, platforms can't be stacked during shipping due to the molded-in ribs. The rib cavities in the platform mold suffer damage faster than other areas of the mold. The molded-in ribs are also required to have a slight draft so the platform can be de-molded. It is preferable if the ribs don't have a draft for mounting purposes.

A minimum of three large objects; plug, master tool, and tool are required to manufacture a platform with a single style of molded-in ribs. For example, the five different styles of 1-man platforms currently offered by Altec, Inc. require eight different plugs, master tools, and tools for a total of 24 large objects. These items take up a lot of storage space. They are also more likely to be neglected because there are so many of them to keep track of. If the 1-man platform was made with pultruded ribs according to the present invention and if it were consolidated to one platform height then it would only require 1 plug, 1 master tool, and 1 tool to produce all of the platform rib styles currently offered.

The present invention provides for a new elevating platform support system that does not use molded-in ribs, but rather uses externally-applied reinforcement ribs that address the problems described previously. The support system is inherently safer than existing external rib designs because it uses a mechanical interlock that prevents the ribs from separating from the platform if the adhesive between the platform and ribs fails. A critical feature of the mechanical interlock is that part of the rib is inside of the platform and part of the rib is outside of the platform, thus locking the rib into the platform.

Figure 10:
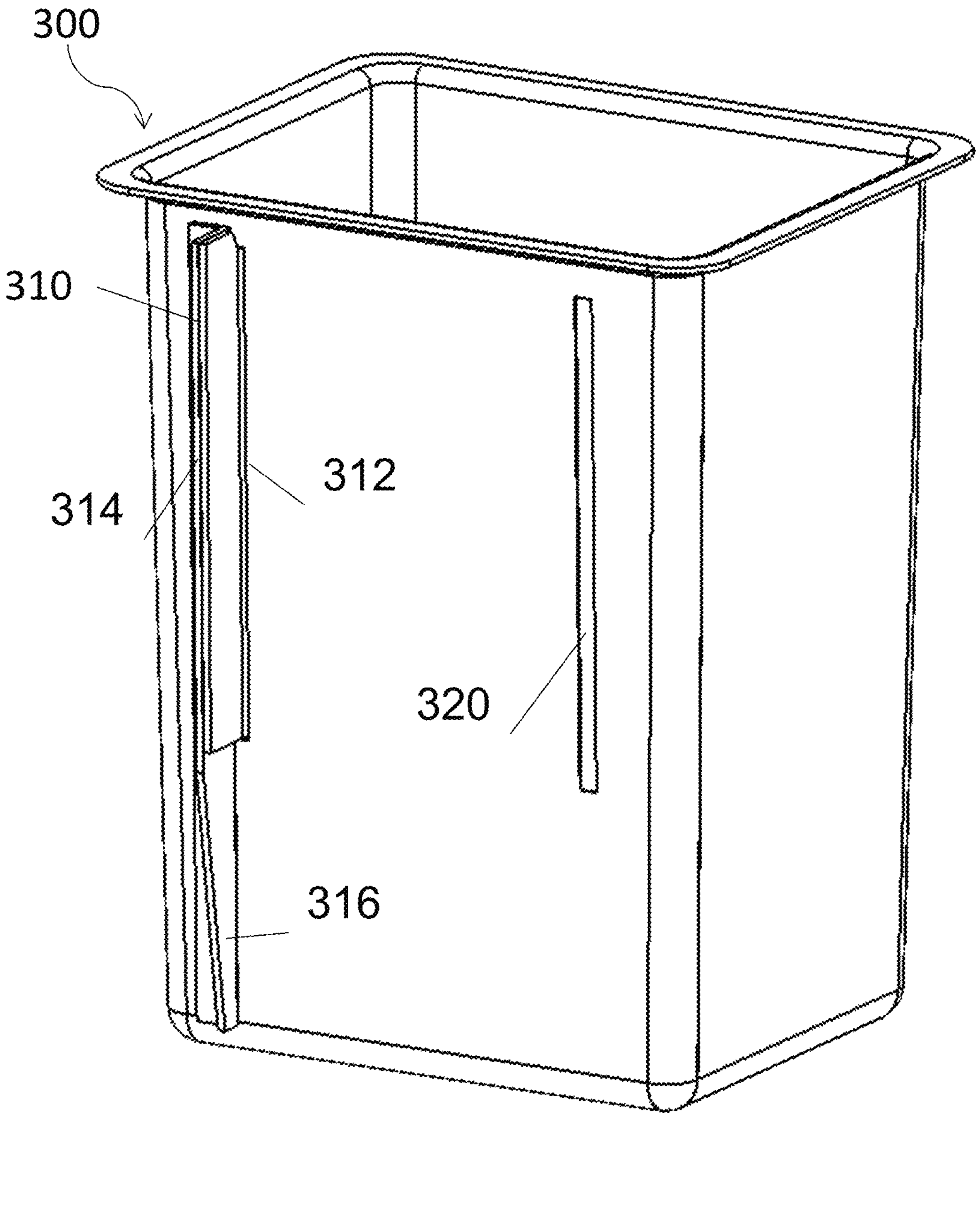
FIG. 10 shows a platform with a reinforcing rib according to the present invention.
Figure 11A:
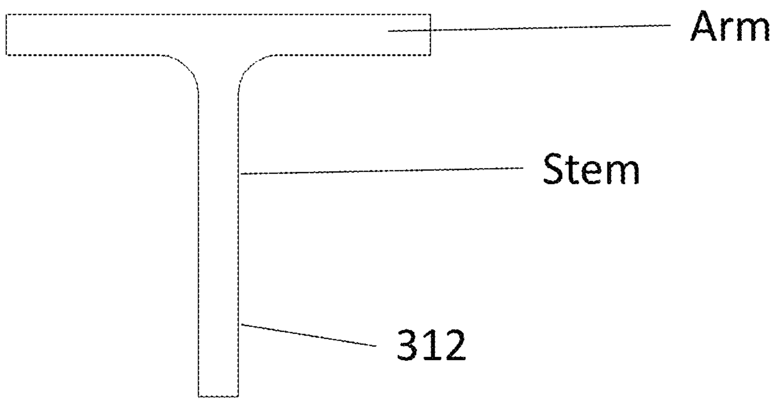
FIG. 11A shows a cross-sectional view of a T-shaped reinforcing rib design according to the present invention.
Figure 11B:
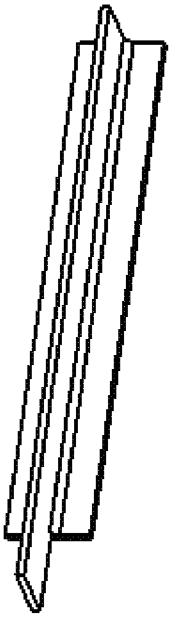
FIGS. 11B-D show various perspective views of the reinforcing rib of FIG. 11A.
Figure 11C:
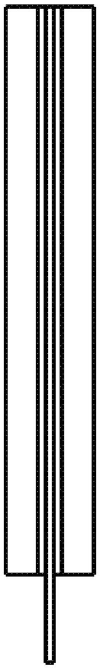
Figure 11D:
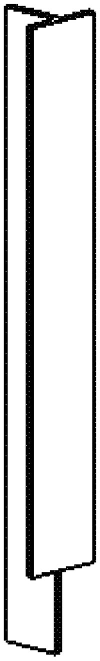

The platform support system, generally described as 300 in FIG. 10, includes reinforcement ribs 310 that are fitted into slots 320 in the platform basket sidewall 215. In a preferred embodiment, the ribs are T-shaped and include a T-shaped component 312 (FIGS. 11A-D). FIG. 11A shows a cross-sectional view of a T-shaped rib according to the present invention.

The example embodiment shown in FIGS. 11A-D was constructed as follows: A 8"×4"×3/8" Series 500 I-beam manufactured by Strongwell (Bristol, Virginia, USA) was cut in half so two "T" shapes existed. The portion of the rib on the interior of the platform was approximately 26" long. The rib was cut so about 4" near the bottom of the rib would "hook" onto the outside of the platform. Two 0.75" wide slots about 26" long were cut in the platform sidewall and the T-shapes were bonded to the inside of the platform. The rib portion on the exterior of the platform was approximately 30" long.

Figure 12A:
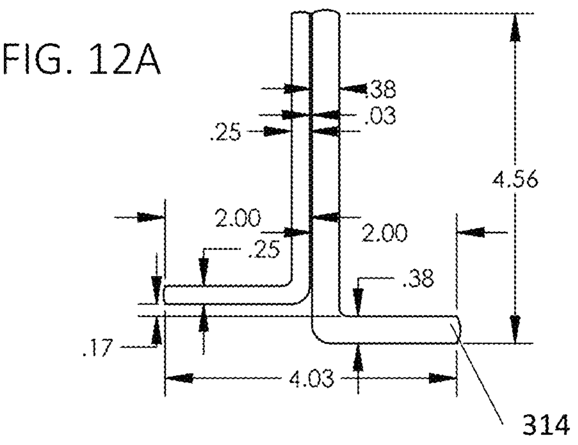
FIGS. 12A-D shows cross-sectional diagrams of another reinforcing rib design according to the present invention.
Figure 12B:
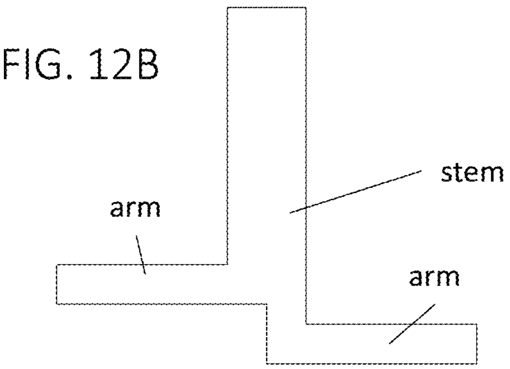
Figure 12C:
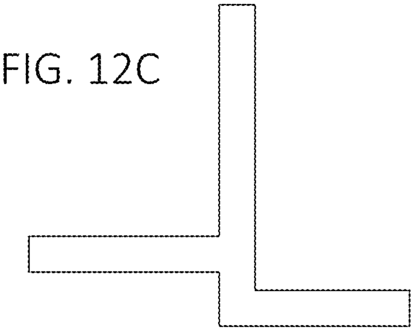
Figure 12D:
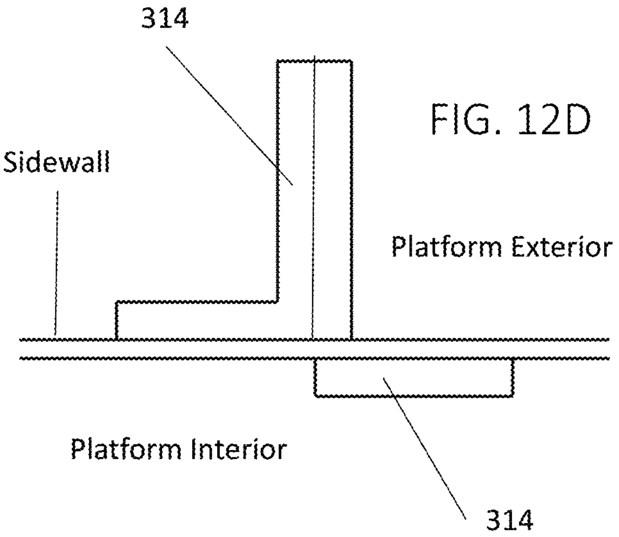
Figure 13A:
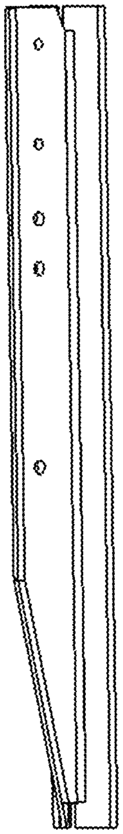
FIG. 13A shows a front side perspective view of the reinforcing rib of FIGS. 12A-D.
Figure 13B:
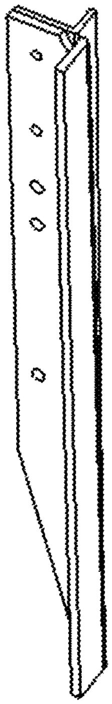
FIG. 13B shows a rear side perspective view of the reinforcing rib of FIG. 12A-D.

In another preferred embodiment, the ribs are an off-set double-L configuration that include L-shaped components 314, shown in cross-sectional view in FIGS. 12A-D. This latter configuration is formed by bonding two L-shaped components 314 (FIG. 12A, units in inches), or by pultrusion or a similar method (FIGS. 12B and C), whereby the thickness of each of the rib sections is varied to give a lighter rib with adequate strength. FIG. 12D shows a double-L rib installed in a platform. Perspective views of the ribs of FIG. 12A-D are shown in FIGS. 13A and B.

Figure 14A:
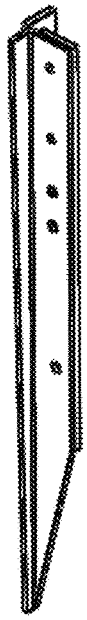
FIGS. 14A-C show another double-L design rib according to the present invention.
Figure 14B:
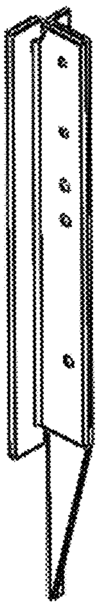
Figure 14C:
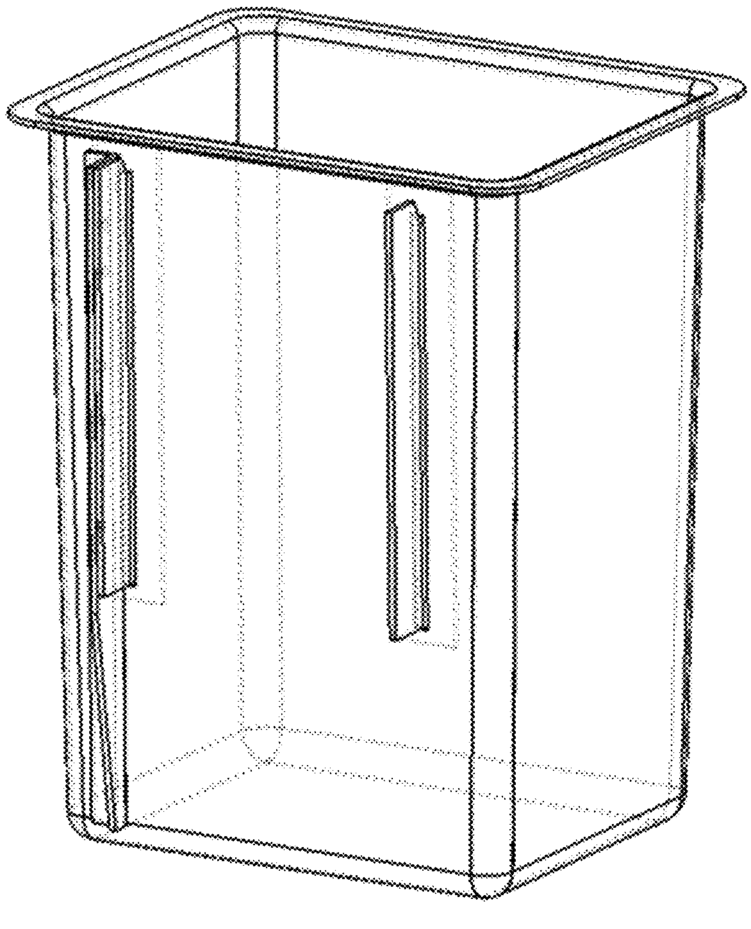

FIGS. 14A-C show another double-L design rib according to the present invention. FIGS. 14A and B show perspective views of the rib only. FIG. 14C shows the rib in a transparent platform; the rib on the right is partially installed and the rib on the left is fully installed. The exterior "L" shape preferably extends between about 1 and about 13 inches beyond the bottom of the slot to provide extra support.

Figure 15:
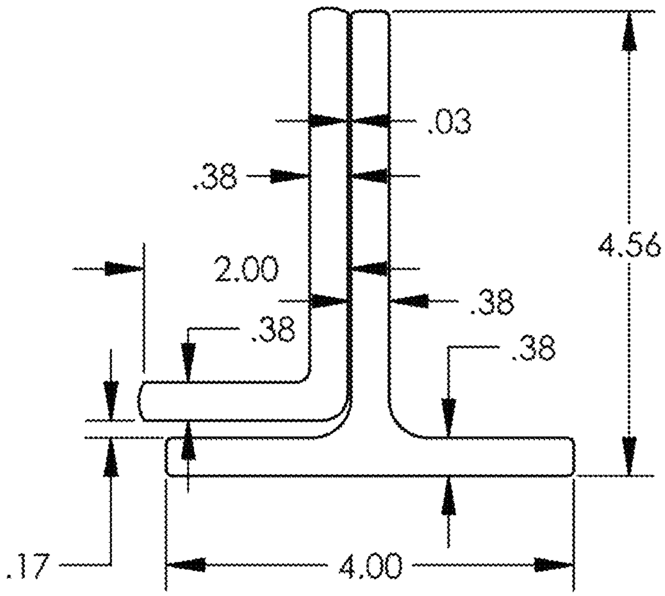
FIG. 15 shows a cross-sectional view of yet another reinforcing rib design according to the present invention.
Figure 16:
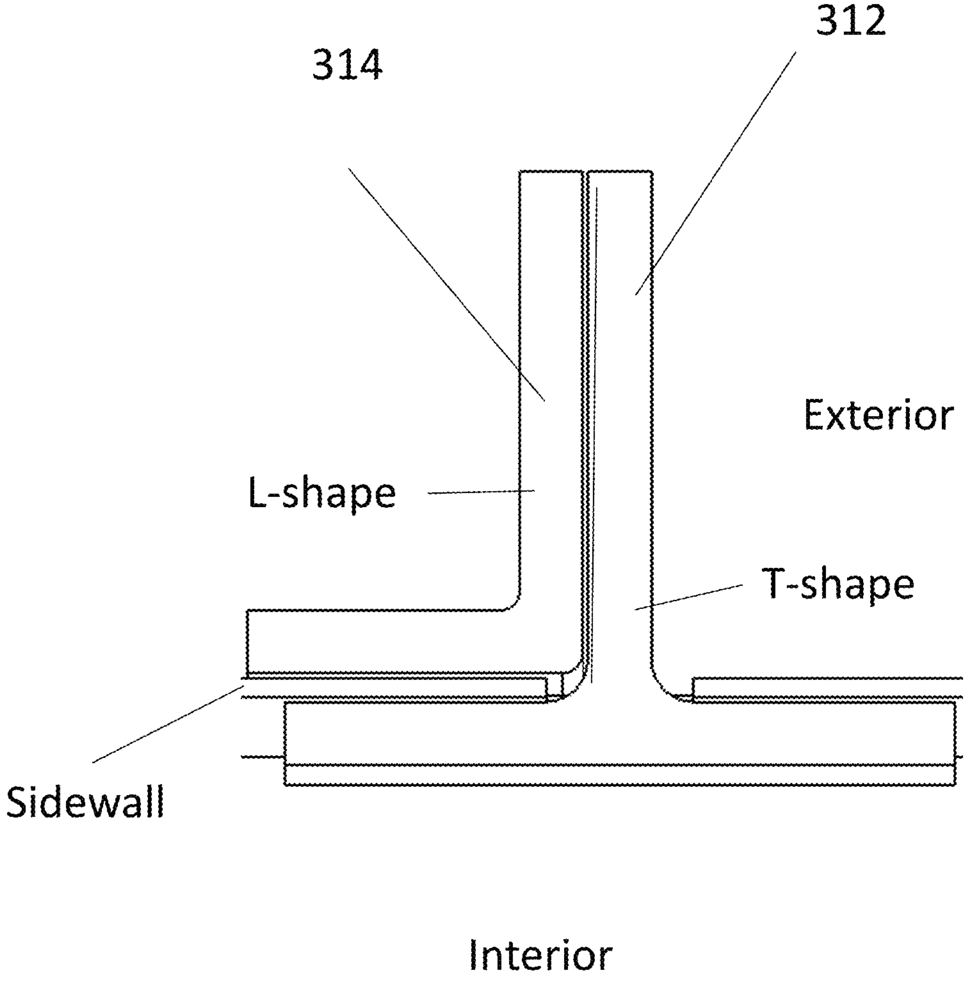
FIG. 16 shows a cross-sectional view of the reinforcing rib design of FIG. 15 installed in a platform sidewall.

In a preferred embodiment (FIGS. 15 and 16), a rib is formed from a T-shaped component 312 combined with an L-shaped component 314. T-shape and L-shape cross-sections are described as each having an arm and a stem. Herein an arm of a letter is defined as a horizontal stroke not connected on one or both ends and a stem is defined as a primary vertical stroke (see http://typedia.com/learn/only/anatomy-of-a-typeface/for a description of typeface anatomy).

The T-shaped component 312 is inserted through a slot in the platform wall from the interior of the platform, such that it is extending outward, whereupon the stem of the L-shaped component 314 is bonded to it on the exterior of the platform.

Figure 17A:
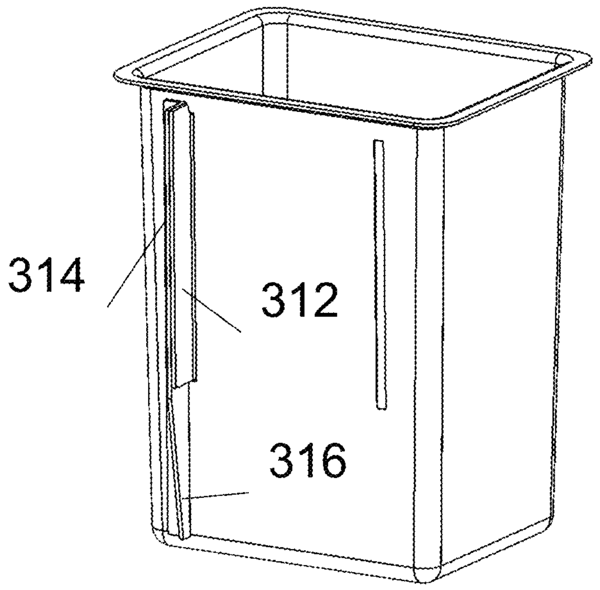
FIGS. 17A-I are various views of reinforcing ribs installed in a platform according to the present invention.
Figure 17B:
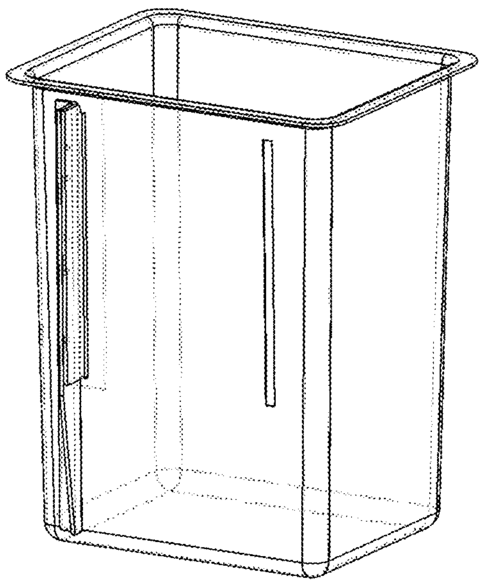
Figure 17C:
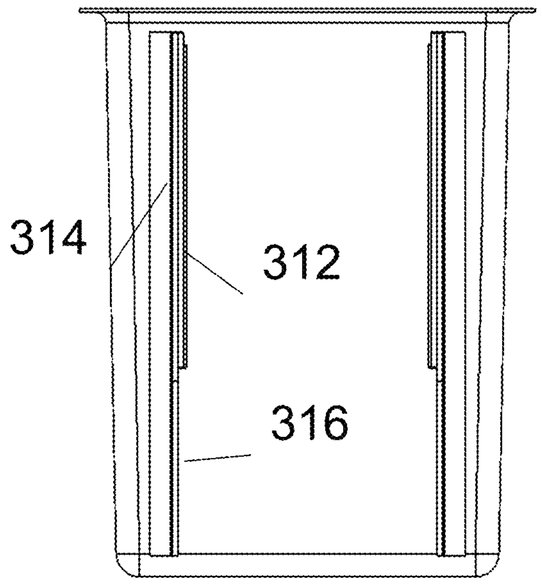
Figure 17D:
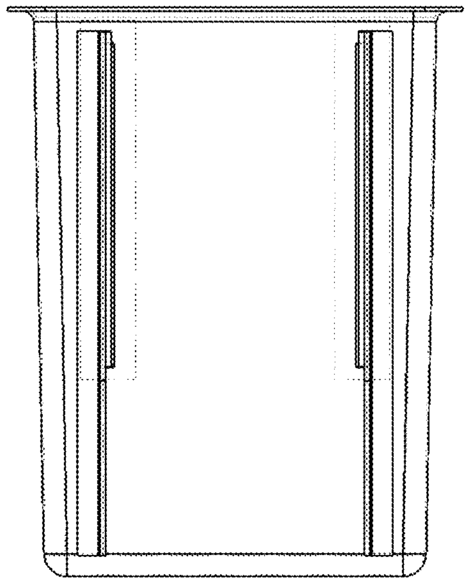
Figure 17E:
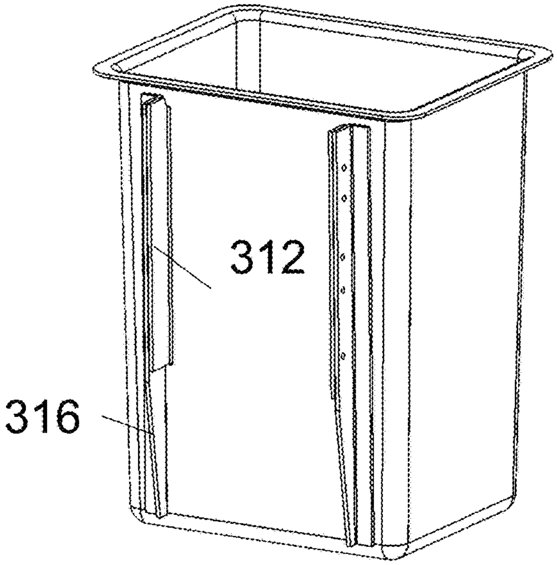
Figure 17F:
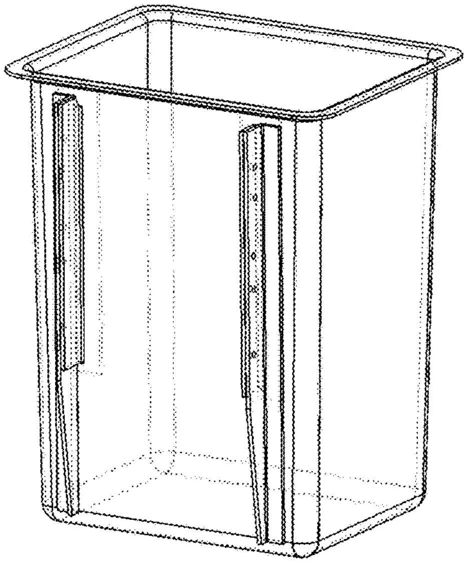
Figure 17G:
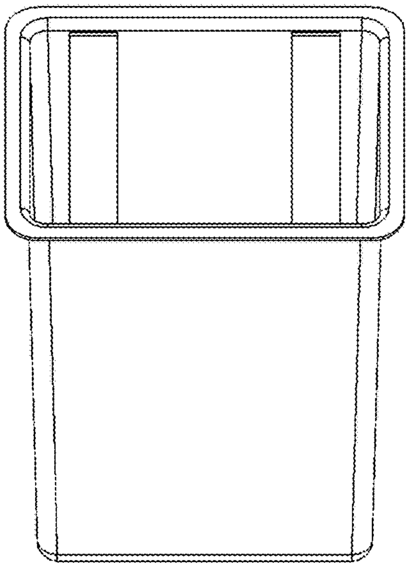
Figure 17H:
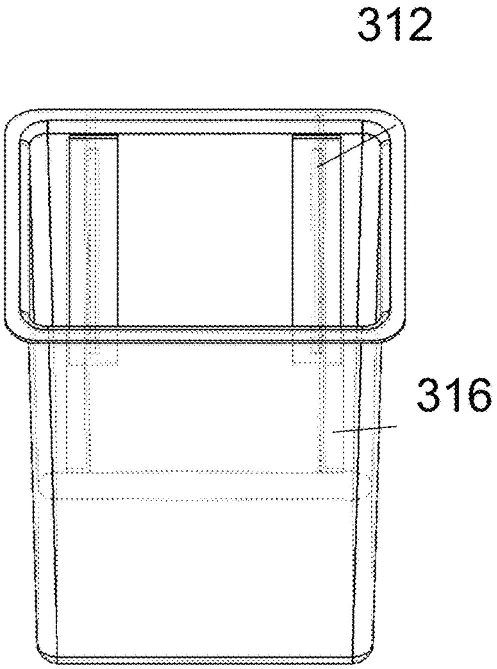
Figure 17I:
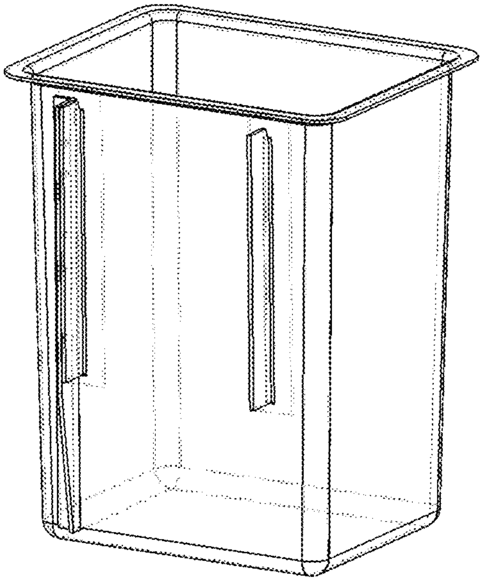

In another embodiment (FIGS. 17A-I), the L-shaped component 314 bonded on the exterior of the platform extends below the cutout in the platform wall that accepts the T-shaped component 312 from the inside of the platform. This extension 316 allows the platform to more effectively transfer compressive stress to the L-shaped component near the outside bottom of the platform. FIGS. 17A-I show various stages of construction of the embodiment. FIGS. 17A, C, E and G show views wherein the platform is solid. FIGS. 17B, D, F, H and I show views wherein the platform is transparent.

The example embodiment shown in FIGS. 17A-I, 18A-C and 19A-C is constructed as follows:

An 8"×4"×3/8" Series 1500 SuperStructural I-beam manufactured by Creative Pultrusions (Alum Bank, Pennsylvania, USA) is cut in half so two "T" shapes existed. Two 0.88" wide slots are cut in the platform sidewall and the T shapes are bonded to the inside of the platform with a portion of the "T" protruding through the slots in the platform wall. The T-shaped component is 28" long and the portion that protrudes through the platform wall is 26.25" long. This design allows the top and bottom of the "T" to completely cover the slot cut in the platform wall to ensure a seal of the cutout. A 3"×3"×0.375" Series 1500 SuperStructural equal leg angle manufactured by Creative Pultrusions (Alum Bank, Pennsylvania, USA) is bonded to the exterior of the platform and to a portion of the T-shaped component that protrudes through the platform wall. The "L" shape is initially 36.5" long and is cut to taper near the bottom of the platform. The "L" shape preferably extends between about 1 and about 13 inches beyond the bottom of the slot. The "L" is further trimmed so that the portion in contact with the platform is only 2" wide instead of 3" wide as it is manufactured. In one embodiment, the portion of the "L" that contacts the platform is trimmed even further when required, such as when the rib is close to the side of the platform and there isn't enough area to bond a 2" wide portion. The reduced width provides adequate strength while reducing weight and the amount of adhesive required for bonding it to the platform wall. Additionally, a notch 317 is cut into the top of the stem of the T at the top of the T-shaped rib component for the following reasons:

Whenever material is removed from a component, for example by cutting a slot in it, the physical strength of that component is decreased by some amount. In an effort to minimize the strength reduction caused by the slots in the platform wall there was a desire to maintain as large of a distance as possible between the top of the slot and the platform flange.

It is desirable for the top of the "T" inside of the platform to completely cover the slot cut in the platform wall. In order to achieve this, the portion of the "T" inside of the platform must extend up past the slot cut in the platform wall. It is important that the upper portion of the "T" inside of the platform, that covers the top of the slot, doesn't extend up past the beginning of the radius where the platform wall transitions to the platform flange. This is important to minimize the interference of the portion of the rib inside of the platform with a platform liner that is inserted into the platform. Some platforms have mounting holes drilled in their ribs near the top of the rib only a few inches below the platform flange. Therefore, it is necessary for the top of the "T" rib on the outside of the platform to be no more than approximately 1.5" from the bottom of the platform flange.

Figure 18A:
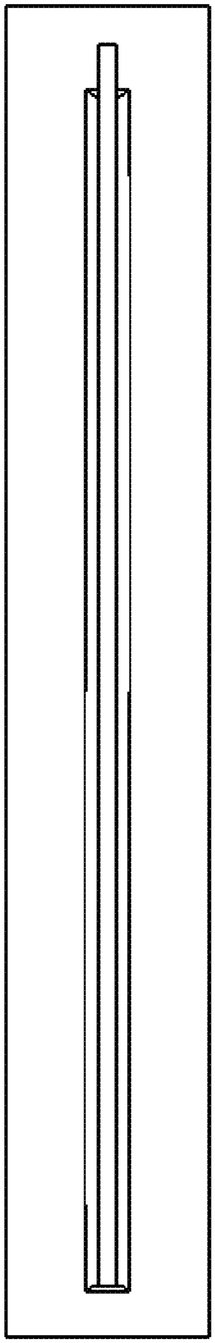
FIG. 18A is a front view of a T-shaped rib according to the present invention.
Figure 18B:
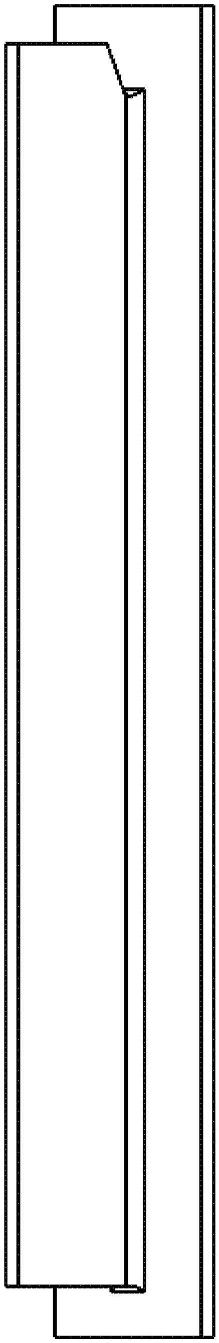
FIG. 18B is a front perspective view of the rib of FIG. 18A.
Figure 18C:
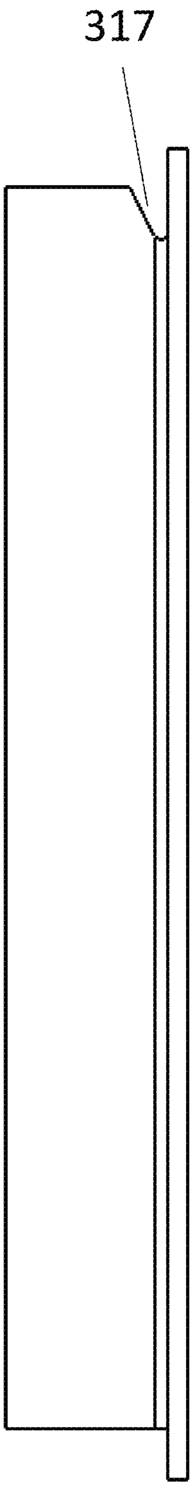
FIG. 18C is a side view of the rib of FIG. 18A.
Figure 19A:
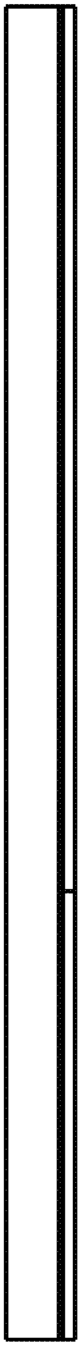
FIG. 19A is a front view of an L-shaped rib according to the present invention.
Figure 19B:
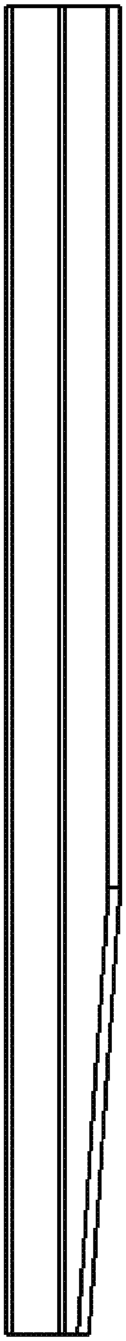
FIG. 19B is a front perspective view of the rib of FIG. 19A.
Figure 19C:
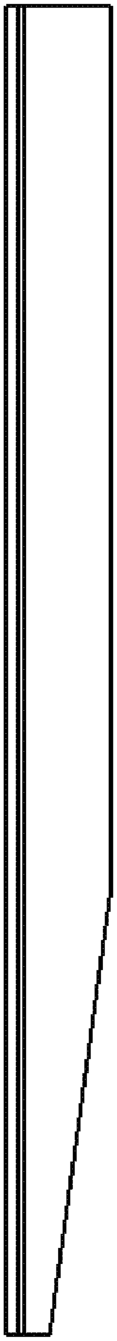
FIG. 19C is a side view of the rib of FIG. 19A.

FIGS. 18A-C show the "T" shape utilized in FIG. 17. In a preferred embodiment, the thickness of the various flat parts of the "T" shape are 3/8 inch. FIGS. 19A-C show the "L" shape utilized in FIG. 17. In a preferred embodiment, the "L" shape flat parts are 3/8 inch thick.

Figure 20A:
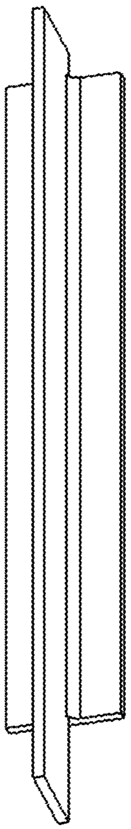
FIG. 20A is a front perspective view of another T-shaped rib according to the present invention.
Figure 20B:
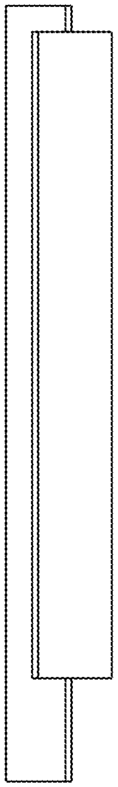
FIG. 20B is a rear perspective view of the rib of FIG. 20A.
Figure 20C:
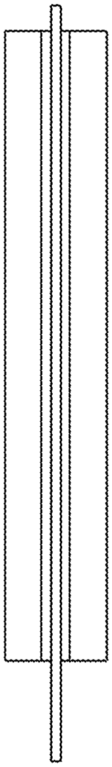
FIG. 20C is a front view of the rib of FIG. 20A.

Another example embodiment, shown in FIGS. 20A-C, is similar to the previous embodiment, with the addition that the rib portion on the exterior of the platform also extends above the interior rib portion at both ends. In other words, the stem of the "T" extends beyond the arm of the "T" at both ends of the rib. In this manner the rib "hooks" onto both the top and the bottom exterior of the platform. The dimensions of the slot and rib are adjusted so that the exterior portion of the rib fits through the slot when the longer extension end is inserted through the slot and moved to its limit.

Another example embodiment has the arm extending vertically beyond the stem of the T at both ends of the rib. One benefit of this design is that the arm completely covers the slot in the platform wall.

In another embodiment, the T stem is notched at the top of the rib so that the stem extends vertically beyond the arm while the arm still covers the slot near the top of the platform.

Yet another embodiment is for a rib that has a stem that extends above the arm at the top of the rib and the arm extends below the stem at the bottom of the rib. This design allows the arm to completely cover the slot in the platform wall while reducing the tendency of the arm to separate from the platform wall near the top of the rib during loading scenarios such as "side push" which occurs when the side of a platform is accidentally pushed into a tree.

When the stem of the T-shaped portion extends vertically beyond the arm of the T at the top of the rib, this is beneficial during scenarios when a load is being applied to the bottom of the platform (like when the platform is accidentally slammed into the ground). In this scenario, the stem of the T above the arm of the T on the inside of the platform is in compressive contact with the platform wall and this prevents the arm of the T from separating from the inside wall of the platform due to a tension force (i.e., the rib being pushed into the platform near the top of the platform).

When the stem of the T-shaped portion extends vertically beyond the arm of the T at the bottom of the rib, this is beneficial during scenarios when a vertical load is being applied to the inside of the platform (like when an operator is standing in the platform). In this scenario, the stem of the T below the arm of the T on the inside of the platform is in compressive contact with the platform wall and this prevents the arm of the T from separating from the inside wall of the platform due to a tension force (i.e., the rib being pushed into the platform near the bottom of the platform).

In general, when the stem of the T on the outside of the platform extends above or below the arm of the T on the inside of the platform, the stem is allowed to support more force than would otherwise be supported by the arm or by the adhesive. This occurs because the stem has a greater section modulus than the arm.

Figure 21A:
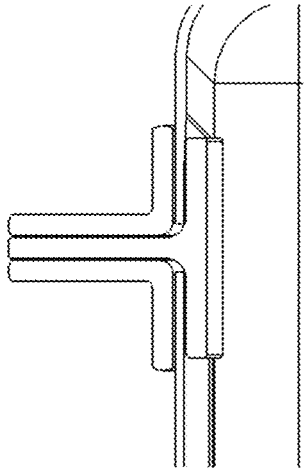
FIGS. 21A-D illustrate a rib according to the present invention composed of a T-shape and two L-shapes.
Figure 21B:
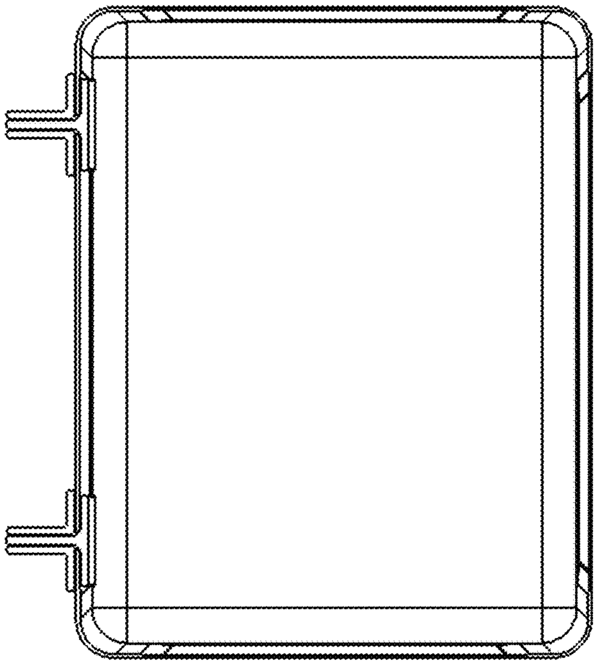
Figure 21C:
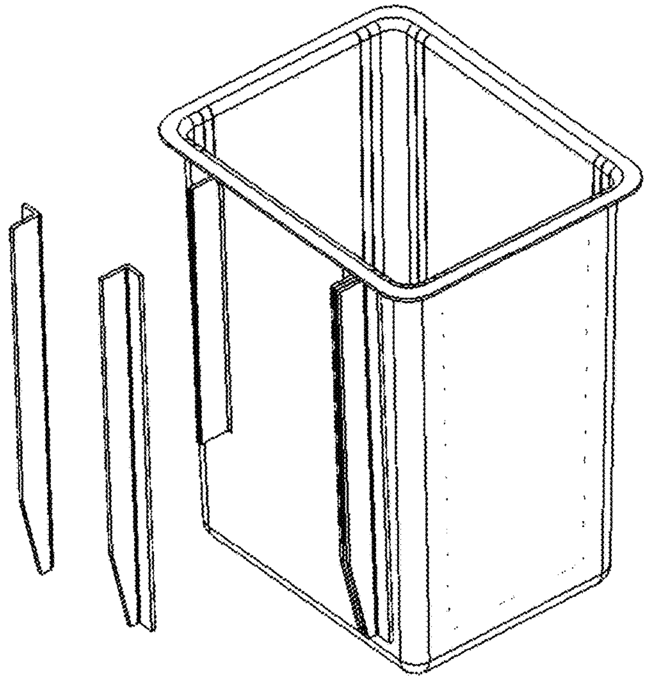
Figure 21D:
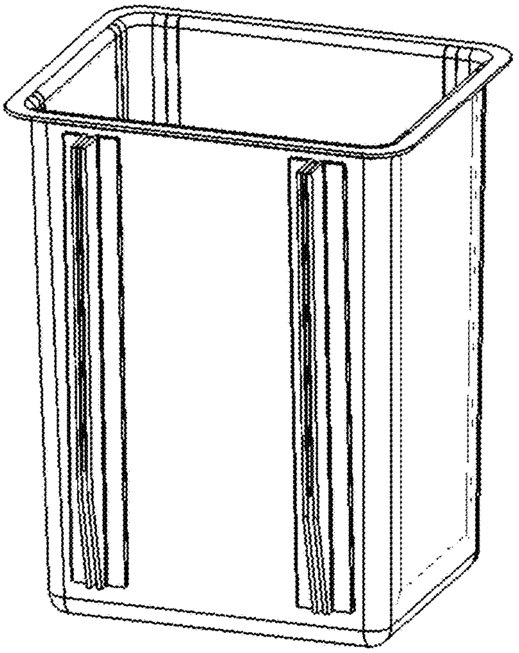

FIGS. 21A-D illustrate another mounting rib embodiment according to the present invention that is designed for greater load-bearing. In this embodiment, the rib is composed of a T-shape and two L-shapes. FIG. 21A is a cross-sectional view of the rib installed in a platform. FIG. 21B is a cross-sectional view of a platform with two ribs installed. FIG. 21C is a front perspective view showing a rib partially installed (left) and fully installed (right). FIG. 21D is a front perspective view showing two ribs installed.

The second L-shape provides additional reinforcement to the rib because the arm of the L-shape provides more contact area between the platform and the rib and the stem of the L-shape provides a stronger attachment point for the boom. This embodiment is thus designed and configured for heavier loads, such as platforms used with aerial units that extend upwards of 170 ft. which can operate with a total gross weight up to about 1300 lbs in the platform.

Figure 22:
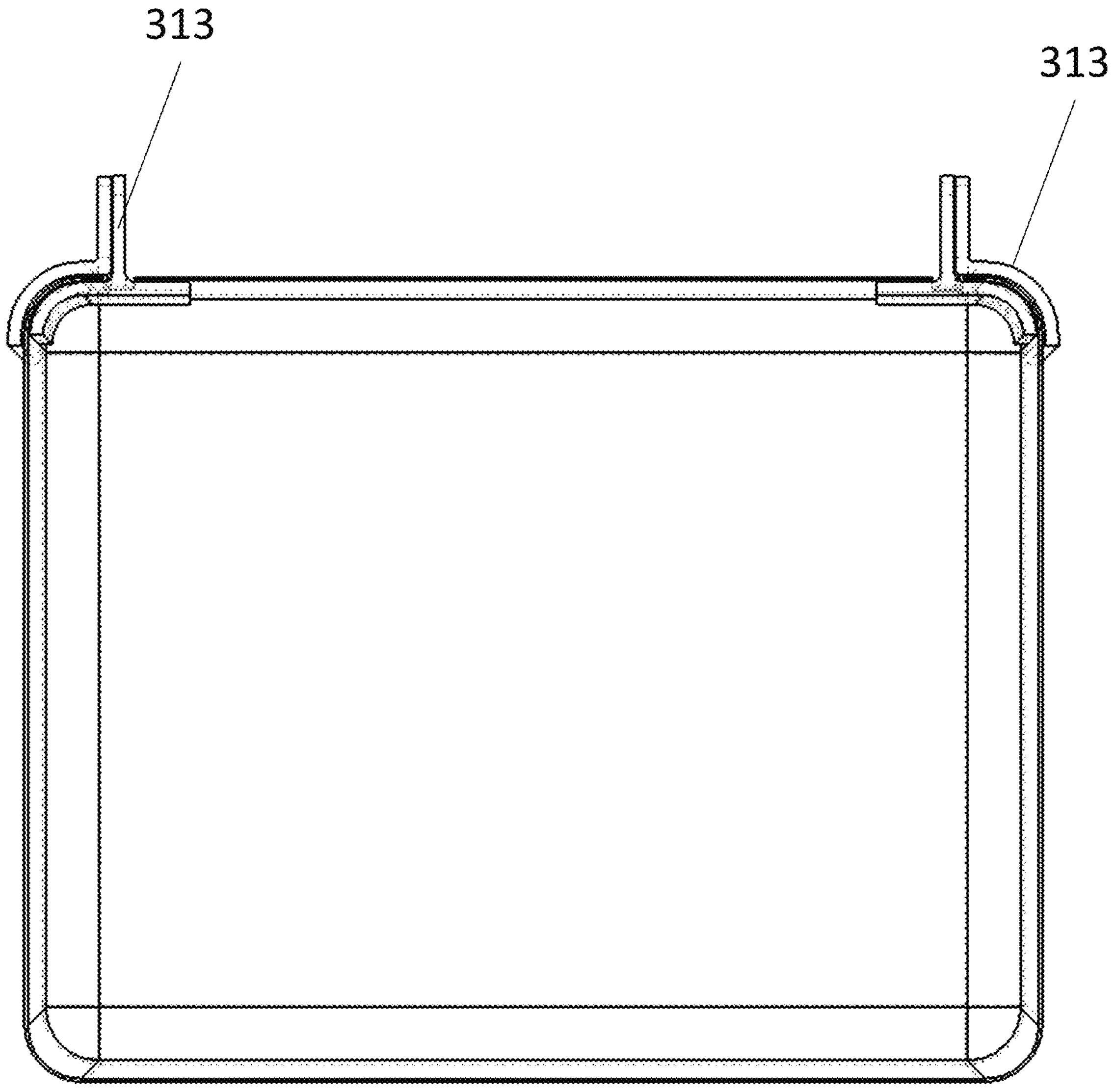
FIG. 22 is a cross-sectional view of a platform with partial-corner ribs according to the present invention.

The mounting rib is mounted on the platform sidewall, as shown in FIGS. 21B-D, or alternatively on the platform sidewall corners, as shown in FIGS. 21A-29B. In the corner-mounted embodiments, the ribs are mounted on the sidewall corners and are curved to fit against the corner. In one embodiment, the rib only goes part-way around the corner, forming a partial-corner mounting rib 313, as shown in FIGS. 22 and 23A&B. FIG. 22 is a cross-sectional view of a platform with partial-corner ribs according to the present invention. FIG. 23A is a transparent top view of a platform with partial-corner ribs according to the present invention. FIG. 23B is transparent top perspective view of a platform with partial-corner ribs according to the present invention.

Figure 25A:
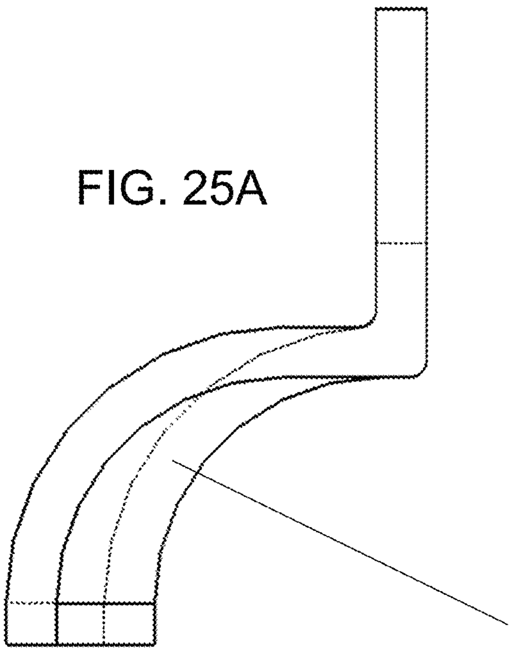
FIG. 25A is a transparent top view of an L-rib portion with curved arm for a partial-corner rib according to the present invention.
Figure 25B:
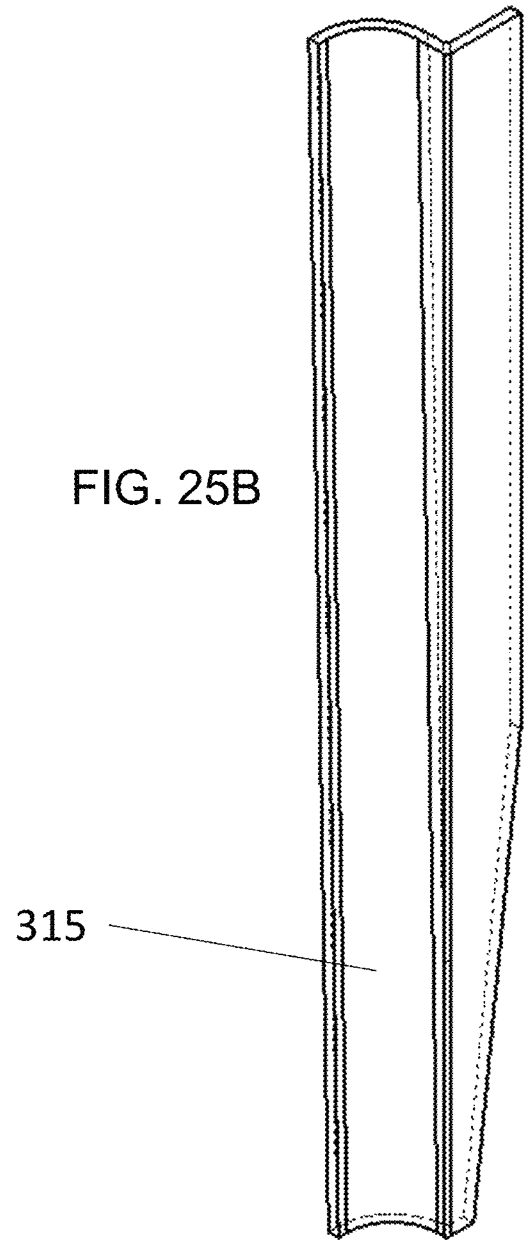
FIG. 25B is a transparent side perspective view of an L-rib portion with curved arm for a partial-corner rib according to the present invention.

The T-shaped portion of the rib, shown in detail in FIGS. 24A&B, includes a curved arm 315. One of the L-shaped portions, shown in FIGS. 25A&B, also includes a curved arm 315. These arms are curved such that they match the curvature of the corner to maximize the contact area between them and the platform corner. FIG. 24A is a transparent top view of a T-rib portion with single curved arm according to the present invention. FIG. 24B is a transparent side perspective view of a T-rib portion with single curved arm according to the present invention. FIG. 25A is a transparent top view of an L-rib portion with curved arm according to the present invention. FIG. 25B is a transparent side perspective view of an L-rib portion with curved arm according to the present invention.

Figure 26:
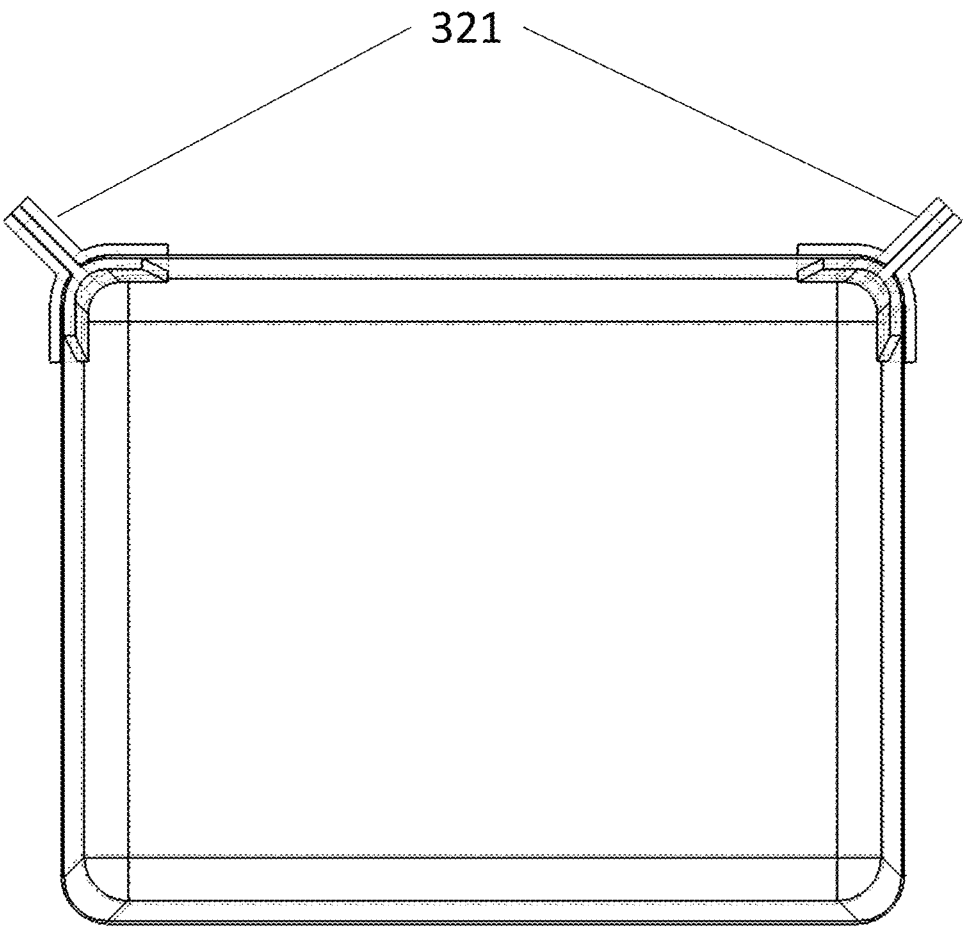
FIG. 26 is a cross-sectional view of a platform with full-corner ribs according to the present invention.

In another embodiment, the rib is positioned farther into the corner, forming a full-corner mounting rib 321, as shown in FIGS. 26 and 27A&B. FIG. 26 is a cross-sectional view of a platform with full-corner ribs according to the present invention. FIG. 27A is a transparent top view of a platform with full-corner ribs according to the present invention. FIG. 27B is transparent top perspective view of a platform with full-corner ribs according to the present invention.

Figure 28A:
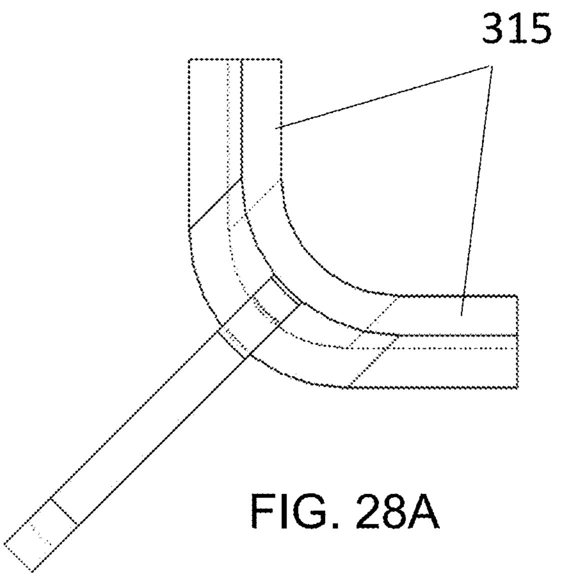
FIG. 28A is a transparent top view of a T-rib portion with double curved arms for a full-corner rib according to the present invention.
Figure 28B:
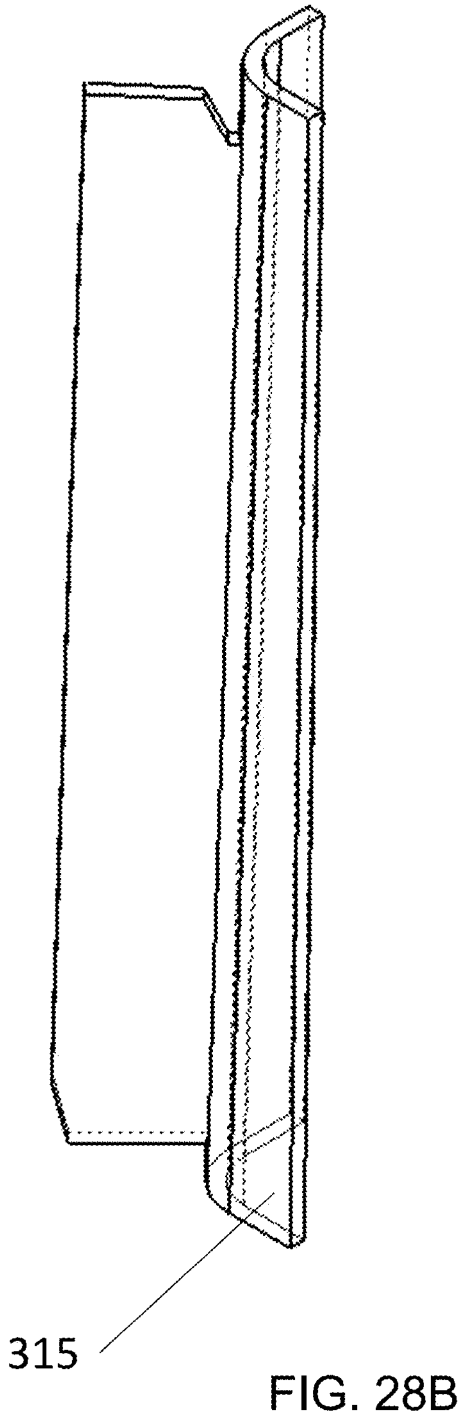
FIG. 28B is a transparent side perspective view of a T-rib portion with single curved arm for a full-corner rib according to the present invention.
Figure 30:
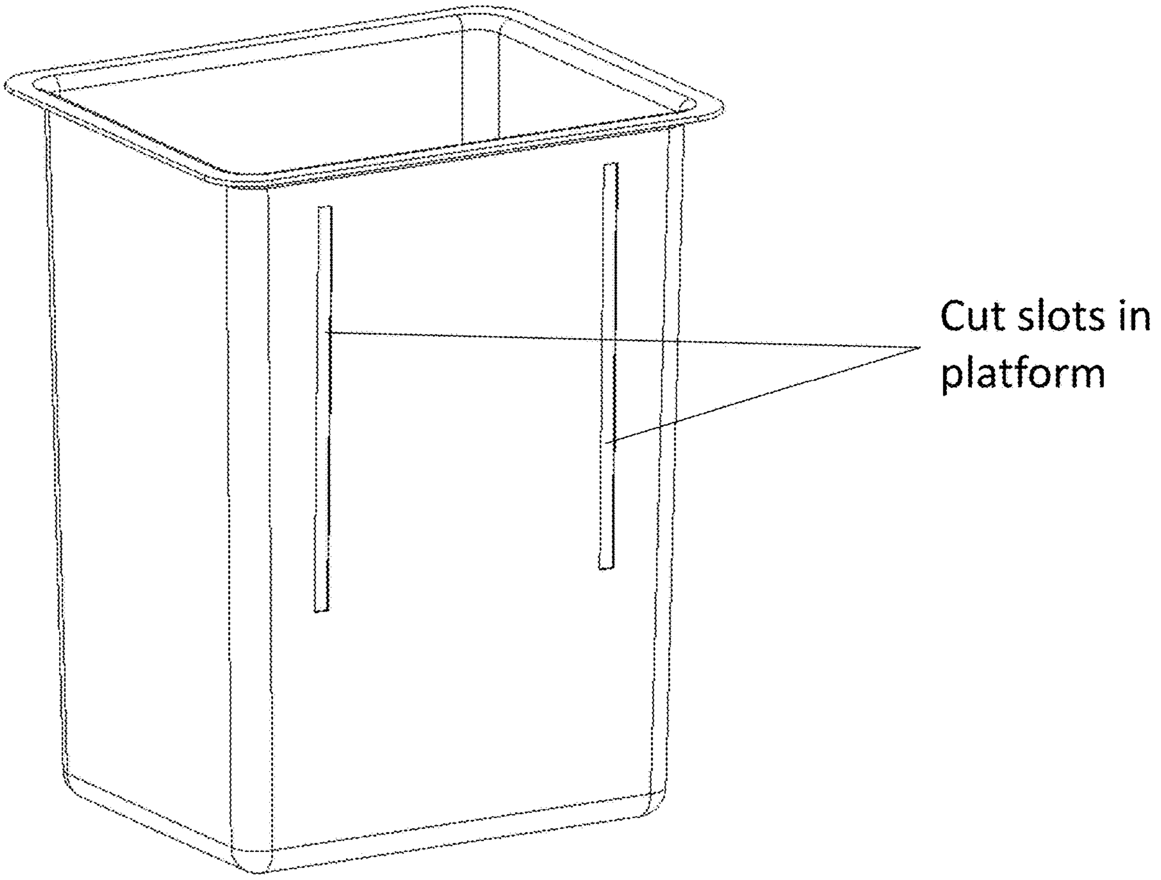
FIG. 30 is a perspective view of a platform with slots for receiving reinforcing ribs according to the present invention.

In this embodiment, both arms of the T-shaped portion are curved (FIGS. 28A&B) and the arms of both L-shaped portions (FIGS. 29A&B) are curved to match the curvature of the corner. FIG. 28A is a transparent top view of a T-rib portion with double curved arms according to the present invention. FIG. 28B is a transparent side perspective view of a T-rib portion with single curved arm according to the present invention. FIG. 29A is a transparent top view of an L-rib portion with curved arm according to the present invention. FIG. 29B is a transparent side perspective view of an L-rib portion with curved arm according to the present invention.

The corner-mounted ribs advantageously decrease the deflection of the platform sidewall with respect to the side-mounted ribs when under load for several reasons. The curved design of both the platform corner and of the ribs provides greater resistance to deflection. Also, the structural fiber reinforcement within the platform is normally overlapped in the corners, thereby providing double fiber reinforcement in the platform where the mounting ribs attach without increasing the weight or changing the design of the platform. This is beneficial because the extra reinforcement within the platform corners allows less deflection when the platform is loaded. When mounting ribs join with the platform in the flat wall section an oil-can-effect is more likely to occur during platform loading. Thus, the use of curved mounting ribs in the corners reduces the deflection of the platform when under load, making the users feel more secure. Ribs mounted on the flat area of the platform sidewall may not prevent bending of the platform below the rib when a load is applied to the platform. By mounting the ribs in the corners, this bending is eliminated or reduced. Consequently, for a similar load rating, the corner ribs are smaller and/or shorter as compared to ribs mounted on the flat portion of the sidewall, thereby reducing the weight of the finished platform.

Because the full-corner ribs provide more curved surface contact area than the partial-corner ribs, they provide more support than the partial-corner ribs The overlap of the structural fiber reinforcement in the horizontal and vertical platform corners combined with extra structural fiber reinforcement in the platform flange effectively creates a cage structure that is connected by thinner structural wall portions. The cage structure of the platform is so much stronger than the thinner wall portions that it's possible, in some cases, to remove an entire wall section while still meeting structural requirements. Therefore, tying the ribs into the corners creates a more robust interface between the platform and the mounting ribs.

In other embodiments, the dimensions of the T and L-shapes are configured to accommodate more weight. For example, the thickness of the T and L rib components is increased. Also, the length of the arms and stems is increased to provide more support.

The ribs are preferably formed of fiber-reinforced thermosets, unreinforced thermosets, fiber-reinforced thermoplastics, and/or unreinforced thermoplastics.

The rib includes at least a first rib zone and a second rib zone, each with a sidewall contact portion. The sidewall contact portion of the first rib zone is positioned inside of the elevating platform and contacts an inner surface of the sidewall to provide sidewall contact area. The sidewall contact portion of the second rib zone is positioned outside of the elevating platform and contacts an outer surface of the sidewall to provide sidewall contact area. The first rib zone extends through the at least one sidewall cutout in the sidewall and joins with the second rib zone on the outside of the sidewall. The first rib zone is at least one T-shaped component with an arm and a stem and the second rib zone is at least two L-shaped components with arms and stems.

The T-shaped component and the at least two L-shaped components are permanently joined via chemical bonding, physical bonding, and/or mechanical attachment.

The mounting rib and the at least one sidewall cutout are configured such that when the mounting rib is positioned in the elevating platform, the mounting rib completely closes or seals the at least one sidewall cutout in the sidewall.

In a preferred embodiment, the top of the mounting rib includes a notch in the stem of the at least one T-shaped component at the junction of the stem and the arm, configured such that the arm and the stem of the at least one T-shaped component slide over the sidewall via the notch.

Figure 31:
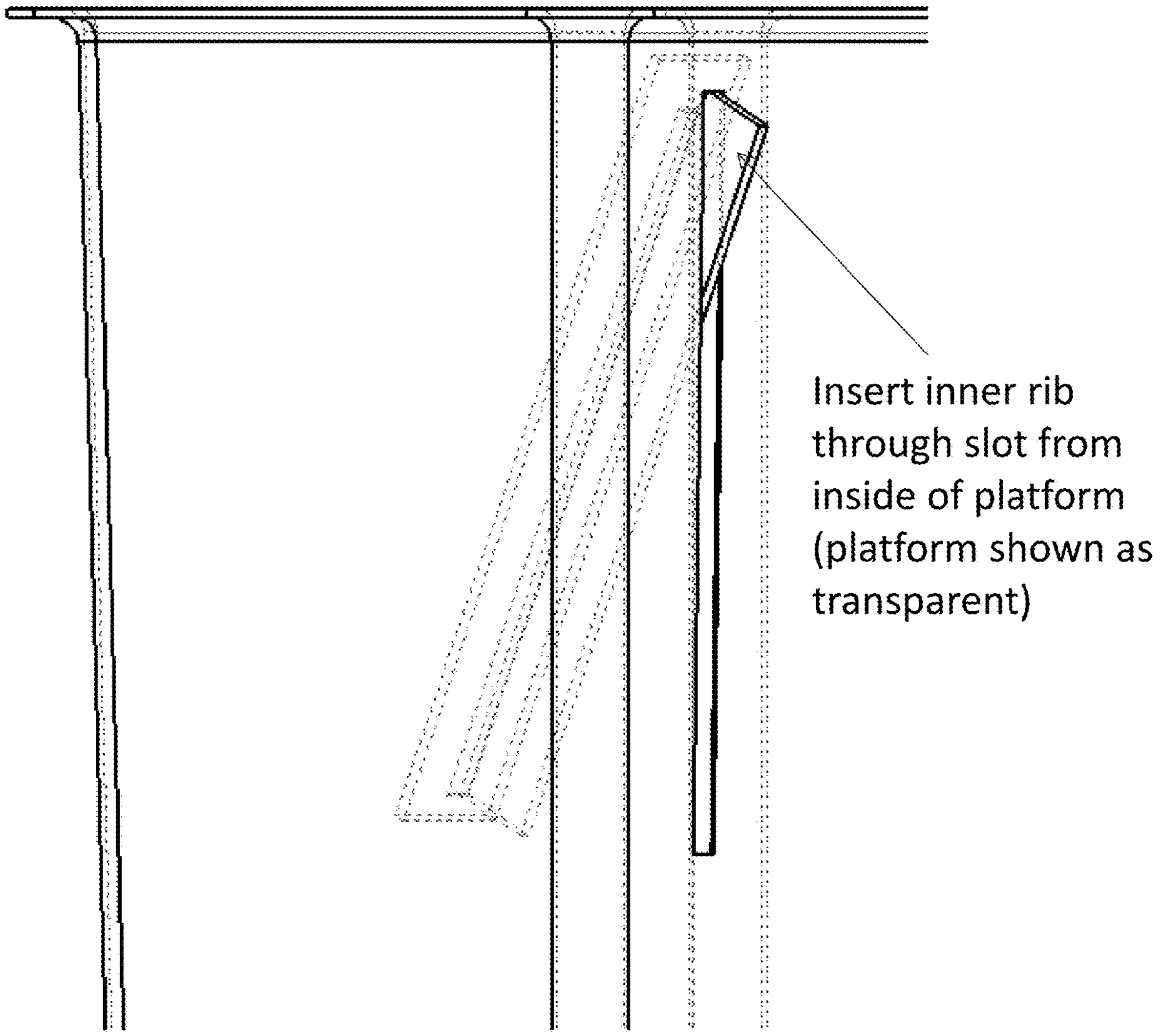
FIG. 31 is a perspective exterior view of a T-shaped rib being inserted into one of the slots of FIG. 30.
Figure 32:
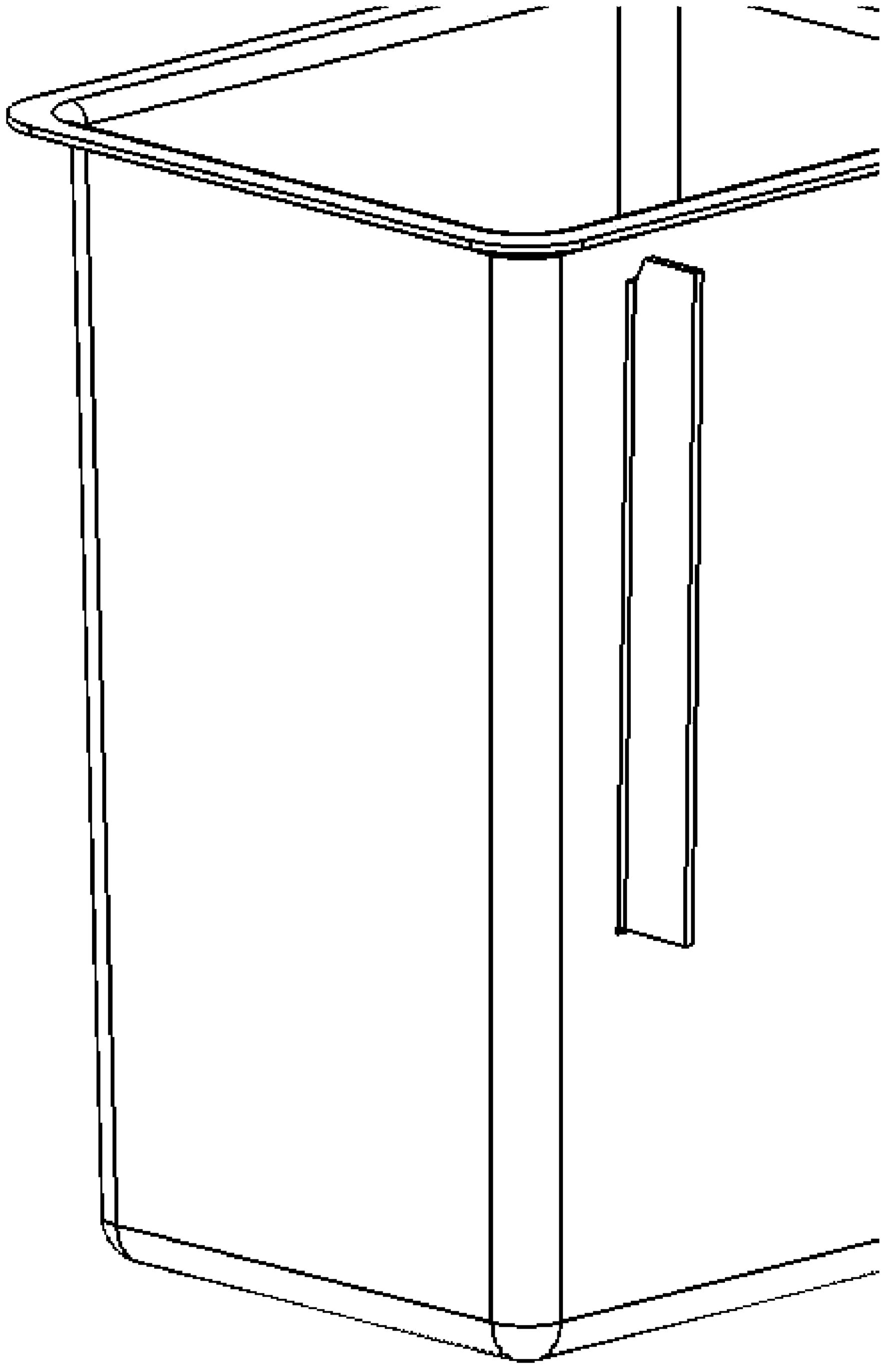
FIG. 32 is a perspective exterior view of the T-shaped rib of FIG. 31 in position in the slot.
Figure 33:
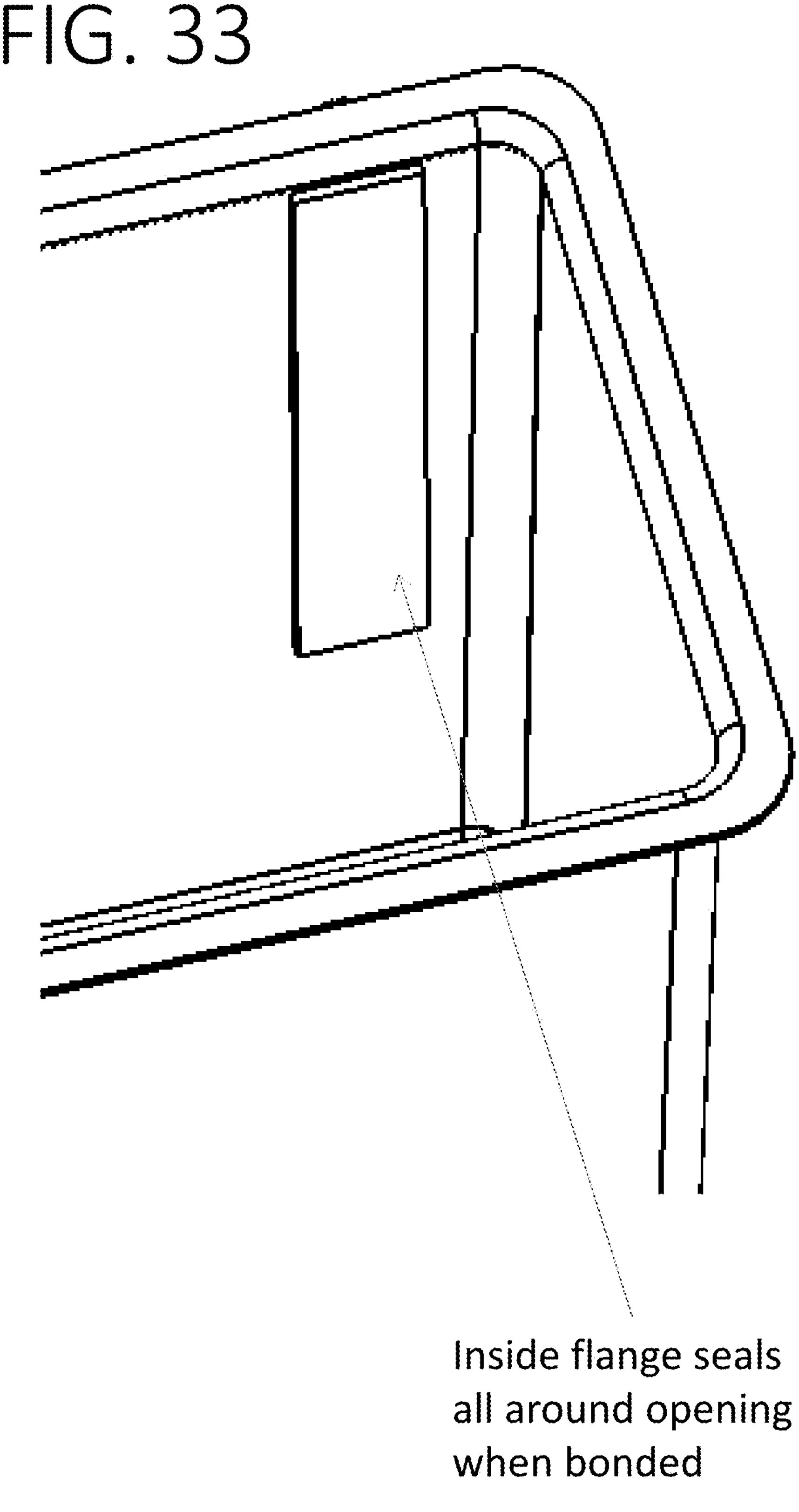
FIG. 33 is a perspective interior view of the rib of FIG. 31 in position in the slot.
Figure 34:
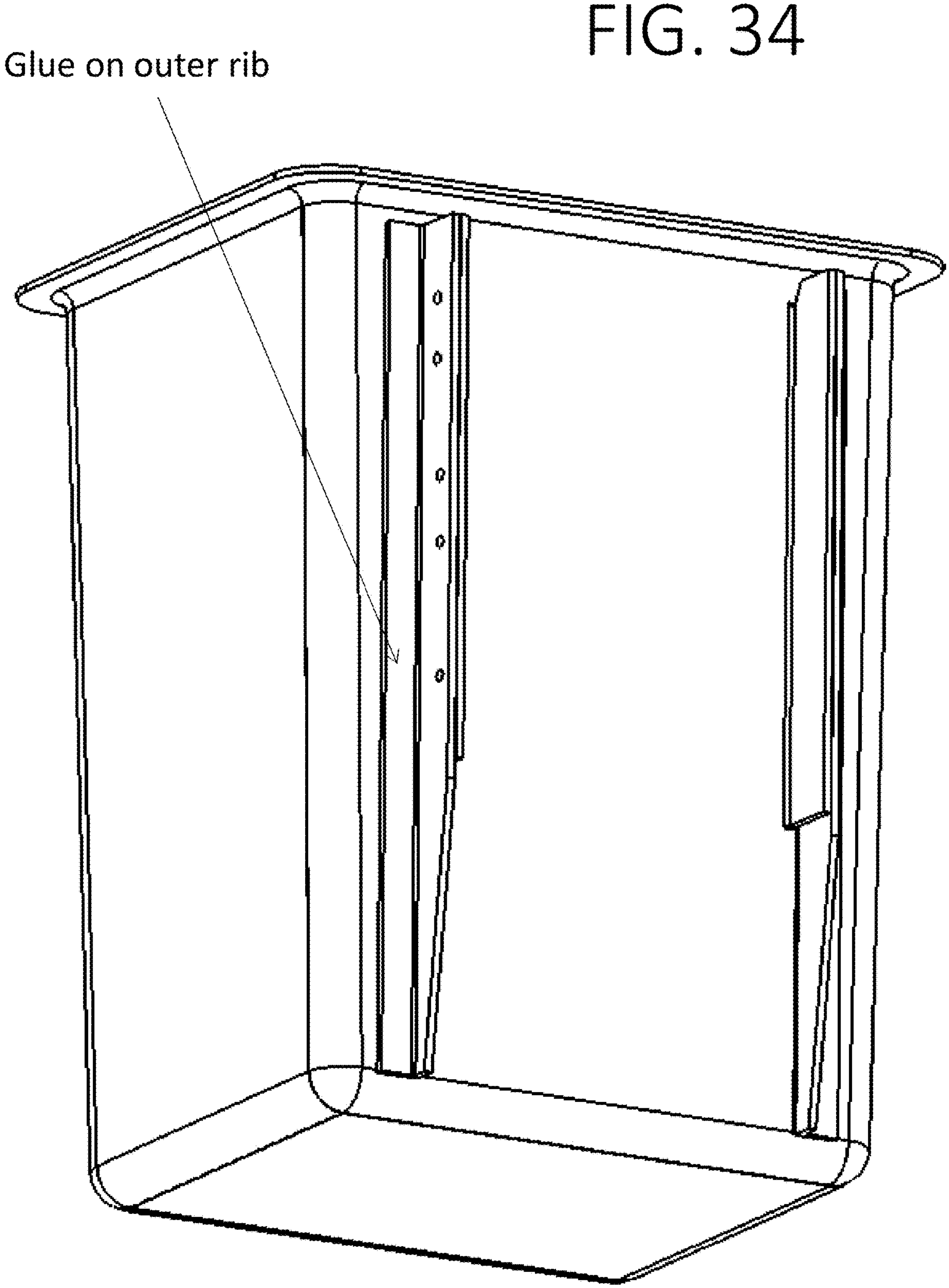
FIG. 34 is a perspective exterior view of the rib of FIG. 31 with an L-shaped rib applied.
Figure 35:
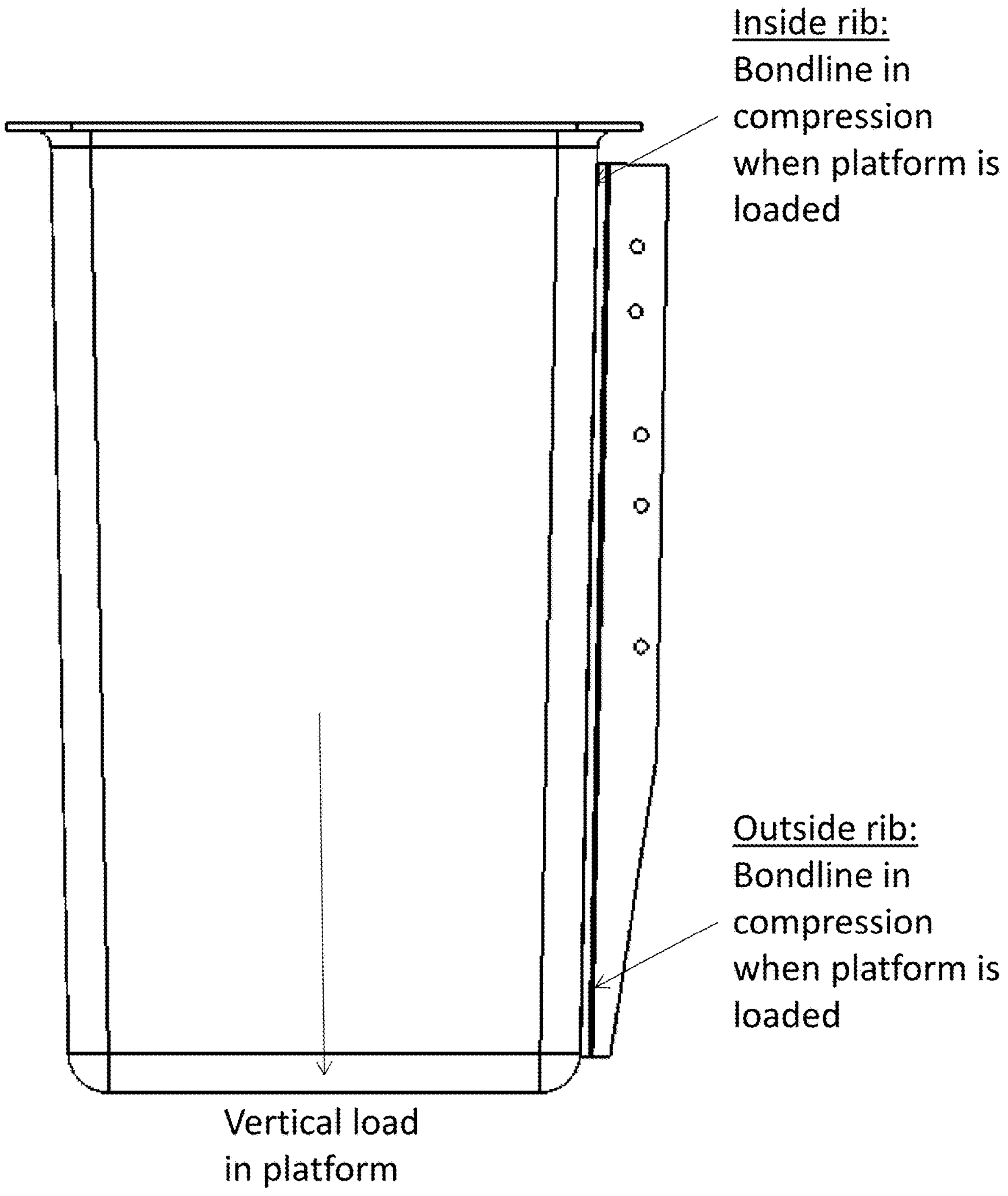
FIG. 35 is a side view of the rib of FIG. 34, with areas of compression noted.
Figure 36A:
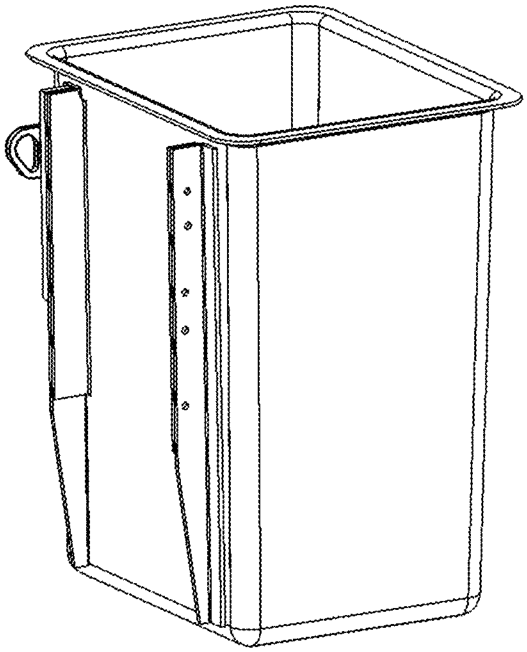
FIGS. 36A-C are perspective views of the rib of FIGS. 34-35 with a lanyard bracket attached.
Figure 36B:
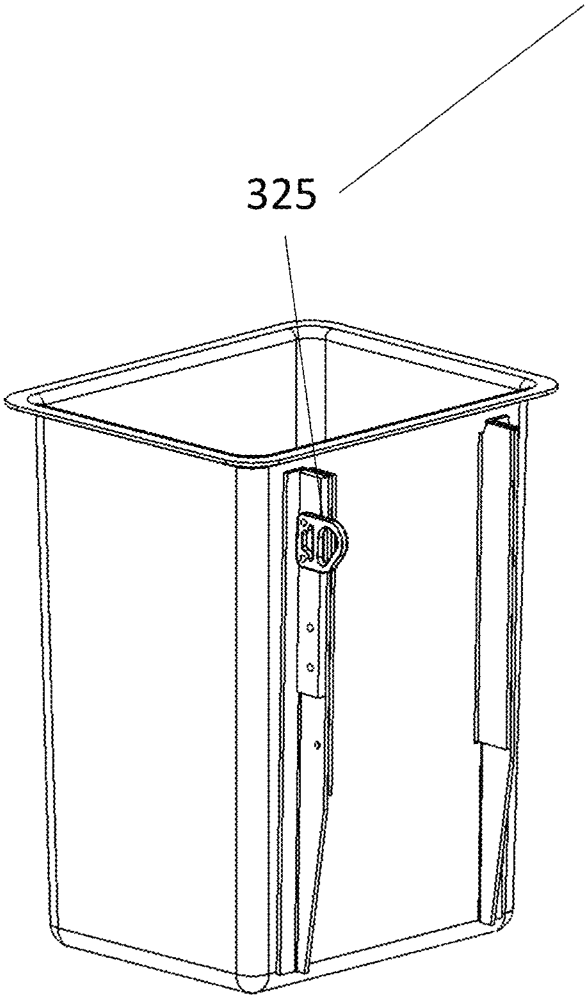
Figure 36C:
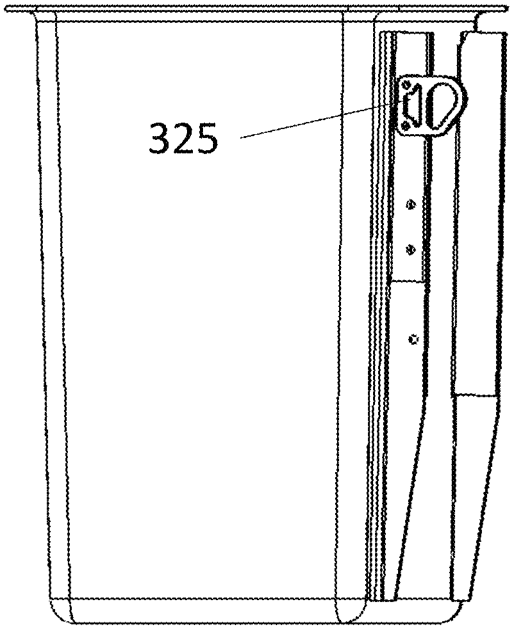
Figure 37A:
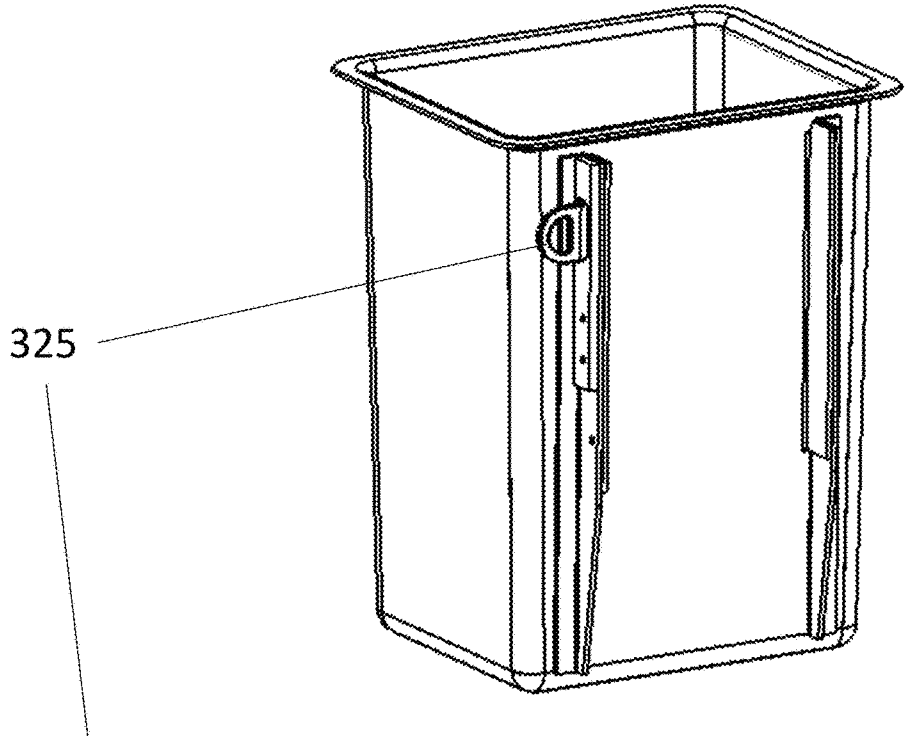
FIGS. 37A-B are perspective views of the rib of FIGS. 34-35 with another lanyard bracket attached.
Figure 37B:
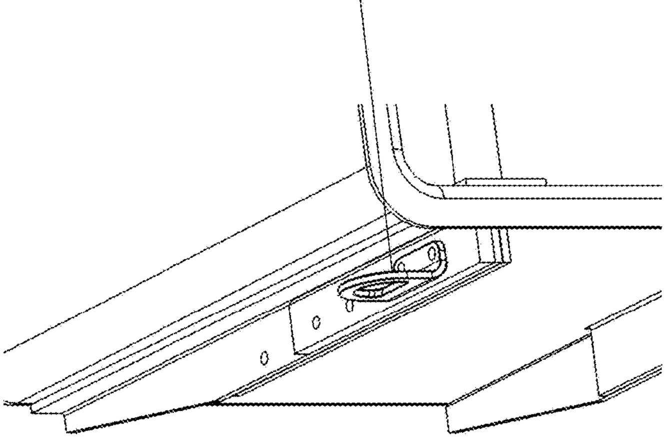

FIGS. 30-35 show the assembly steps of the embodiment of FIG. 17. Slots are cut into the platform (FIG. 30), whereupon the inner ribs are inserted through the slots (FIG. 31). The inner rib is glued to the platform (FIG. 32, exterior view; FIG. 33, interior view). The outer rib is next glued in place (FIG. 34). FIG. 35 shows the compression forces acting on the rib.

Figure 38:
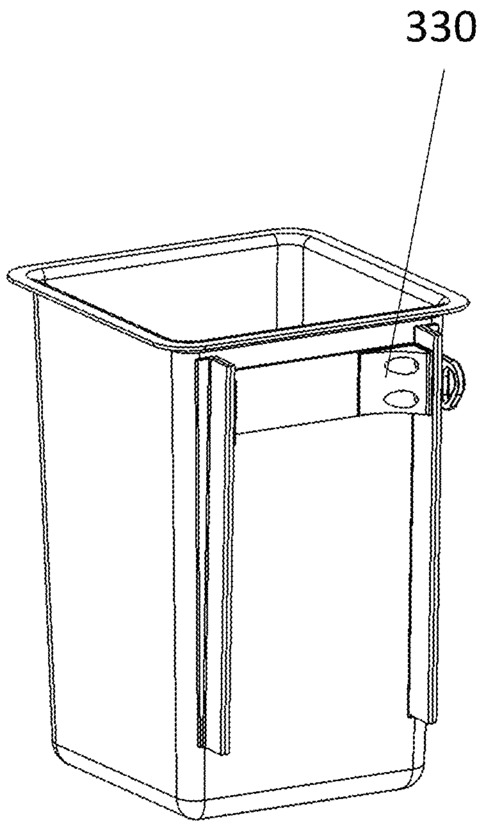
FIG. 38 shows the elevating platform of FIGS. 37A-B with a lanyard bracket support.

In another embodiment, a lanyard anchor bracket reinforcement section 325 is attached to the rib (FIGS. 36A-C and FIGS. 37A-B). In one embodiment, the lanyard anchor bracket reinforcement section 325 is constructed out of an unreinforced thermoplastic. In exemplary embodiments, the lanyard anchor bracket reinforcement section is constructed of nylon and/or urethane. However, other materials including reinforced thermoplastics and thermoset are also used for the lanyard bracket. The lanyard anchor bracket reinforcement section ensures connection between the platform mounting bracket and the lanyard anchor bracket even if the platform rib breaks between these two structures. FIG. 38 shows the embodiment of FIG. 36 further including a brace 330 to reinforce the lanyard anchor bracket. FIGS. 39A-E show various views of the brace.

Figure 40:
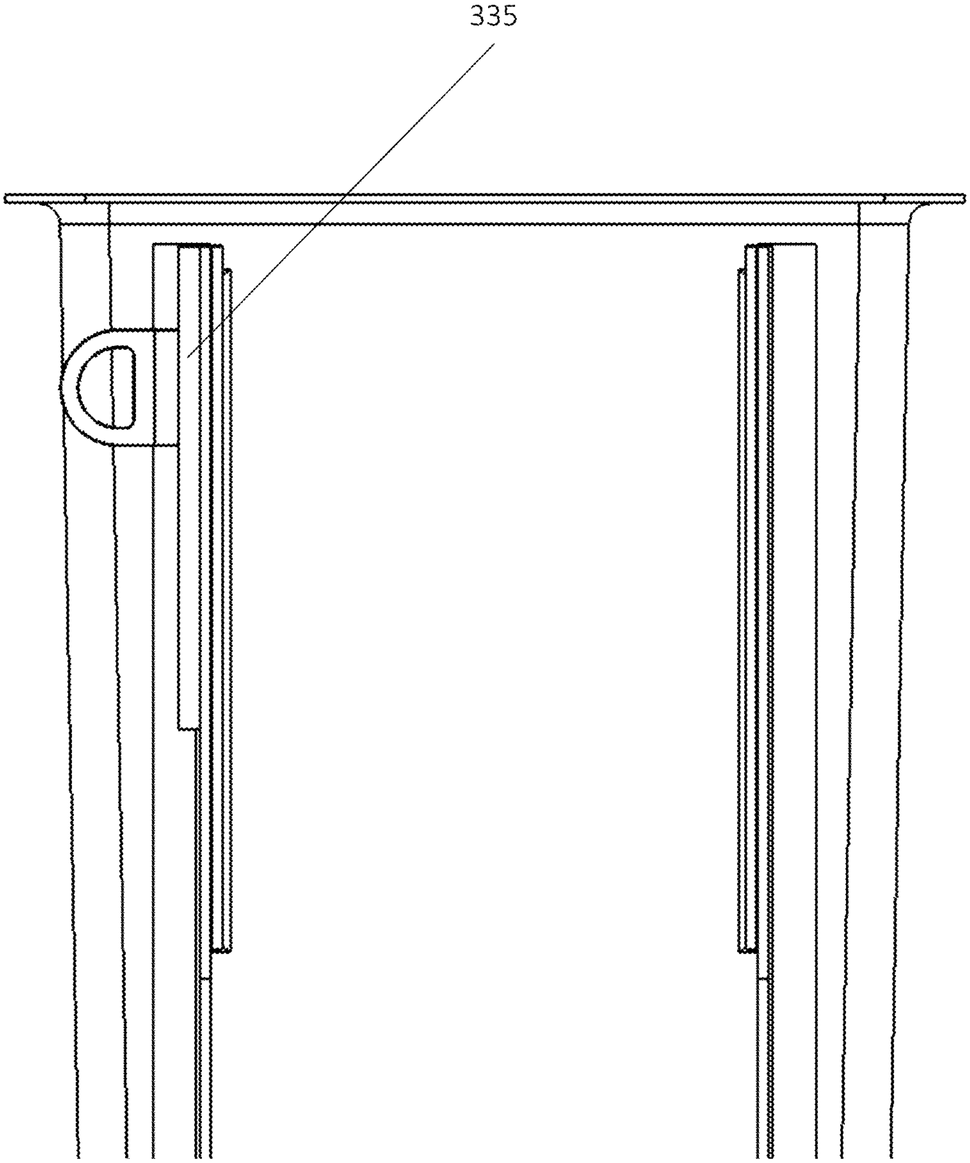
FIG. 40 shows a 0.75" thick urethane bar affixed as a lanyard bracket support.

FIG. 40 shows a 0.75" thick urethane bar 335 affixed as a lanyard bracket support.

In yet another embodiment, the present invention is directed a T-and- L-shaped rib including a T-shaped portion that has a T-shaped cross-section with an arm and a stem and an L-shaped portion that has an L-shaped cross-section with an arm and a stem; the arm of the T-shaped portion is positioned inside the elevating platform and contacts an inner surface of the sidewall of the platform; the arm of the L-shaped portion is positioned outside the elevating platform and contacts an outer surface of the sidewall; the stem of the T-shaped portion extends through the sidewall slot and the stem of the L-shaped portion is external to the sidewall and extends beyond the top and bottom of the sidewall slot; and the stems of the T-shaped and L-shape portions are adhered to each other. In one embodiment, this rib further including a notch in the top of the rib in the stem of the T-shape portion at the conjunction of the stem and the arm; the notch configured such that the arm and the stem of the T-shape slide over the sidewall via the notch. Preferably, the arm of the T-shaped portion extends vertically beyond the sidewall slot at both ends when installed in the elevating platform and the L-shaped portion extends between about 1 and about 13 inches beyond the bottom of the slot. The rib is preferably formed of fiber-reinforced thermosets, unreinforced thermosets, fiber-reinforced thermoplastics, and/or unreinforced thermoplastics.

Another rib according to the present invention is a double-L-shaped rib including a first L-shaped portion and a second L-shaped portion, both portions having an L-shaped cross-section with an arm and a stem; the arm of the first L-shaped portion contacts an outer surface of the sidewall of the platform and the arm of the second L-shaped portion contacts an inner surface of the sidewall; the arm of the second L-shaped portion extends vertically beyond the sidewall slot at both ends; the stem of the second L-shaped portion extends through the sidewall slot and the stem of the second portion is external to the sidewall; and the stems of the portions are adhered to each other or the rib is pultruded. In one embodiment, the arm of the second L-shaped portion extends vertically beyond the sidewall slot at both ends when installed in the elevating platform. The rib preferably includes a notch in the top of the rib in the stem of the second L-shaped portion at the conjunction of the stem and the arm; the notch is configured such that the second L-shape portion slides over the sidewall via the notch. In another embodiment, the stem of the second L-shape portion at the top of the rib extends above the sidewall slot. The first L-shaped portion extends between about 1 and about 13 inches beyond the bottom of the slot. The rib is preferably formed of fiber-reinforced thermosets, unreinforced thermosets, fiber-reinforced thermoplastics, and/or unreinforced thermoplastics.

Mount System

The present invention further provides for a mounting plate, system and method. Current mounting plates (FIG. 41) consist of flat fiberglass plates that have metal reinforcement encapsulated inside of the fiberglass with studs protruding from the fiberglass plate. These mounting plates are typically bonded to the exterior of platforms. When a load is applied to the mounting plate the adhesive at the top is in tension and the adhesive at the bottom is in compression. There is a greater potential for a traditional mounting plate to separate from a platform near the top of the plate where the adhesive is in tension. Other reasons why relying on adhesive as a primary joining mechanism is not preferred pertain to quality risks such as improper adhesive application, improper adhesive mixing, and improper adhesive mix ratios.

The present invention is directed to a system and method to mount components to a platform wall utilizing a joining mechanism that relies on the structural strength of the platform and the component instead of adhesive or other fasteners. The attachment method is applicable to any component that needs to be attached to a platform. An example embodiment is a valve mounting plate. The purpose of a valve mounting plate is to provide a mounting location on a platform wall for a controller assembly. The controller assembly is used by the operator to direct the movement of the platform while the operator is inside of the platform.

A common feature among the mounting systems of the present invention is that some portion of the mounting system is located inside and another portion is located outside of the platform via an opening in the platform wall. This is the design feature that allows the mounting system to be mechanically locked into a platform wall without adhesive.

Another benefit of the new mounting systems are their reduced size and weight. The reduced size also allows less adhesive to be used due to the reduced bonding surface area that is now allowed due to the redirection of stress into the platform wall and mounting plate.

Thus the present invention relies on the structural strength of the platform wall and the mounting plate to hold the two together. Adhesive is not the primary joining mechanism in this invention.

Figure 42:
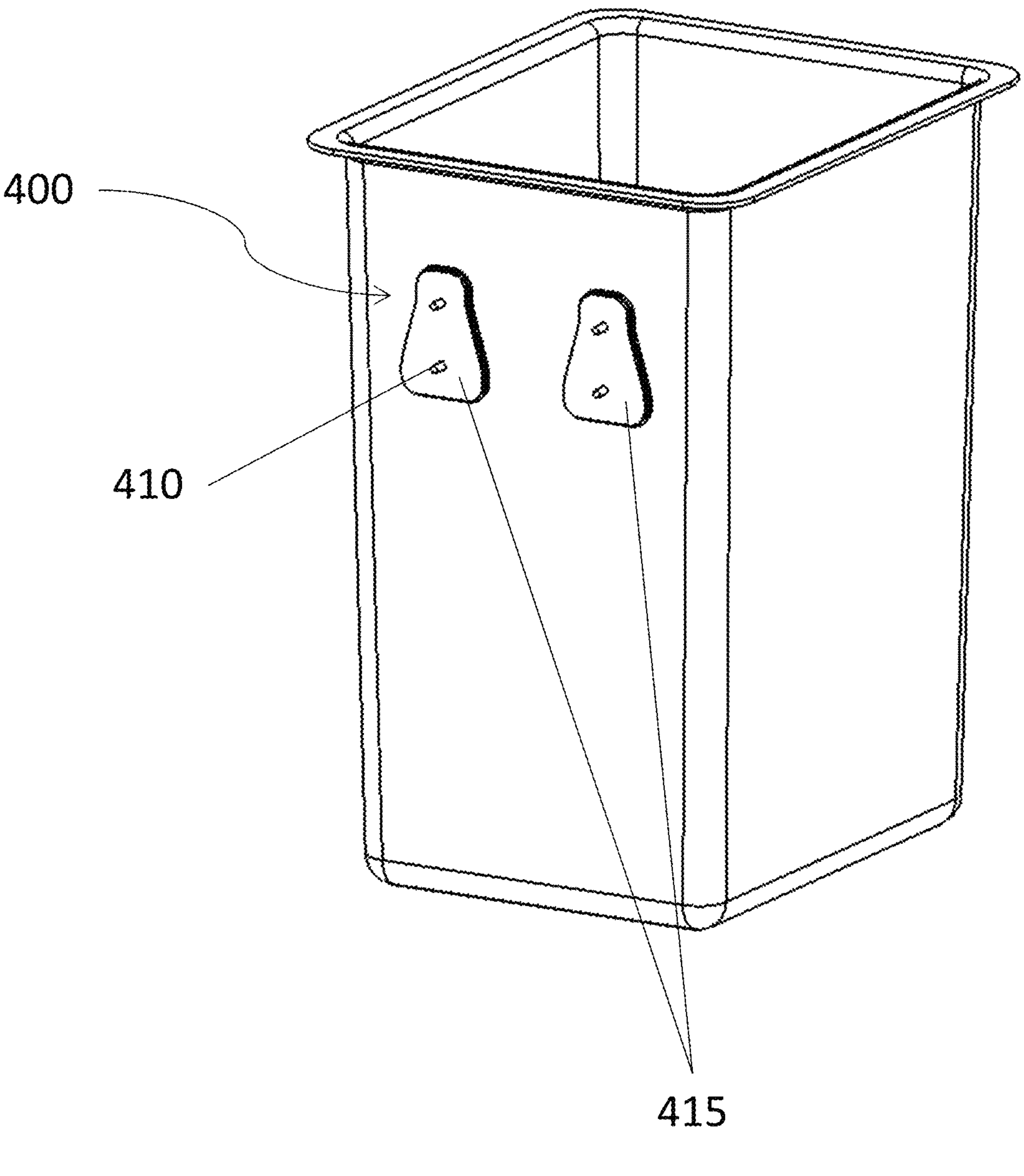
FIG. 42 is an exterior view of a mounting plate according to the present invention.
Figure 43:
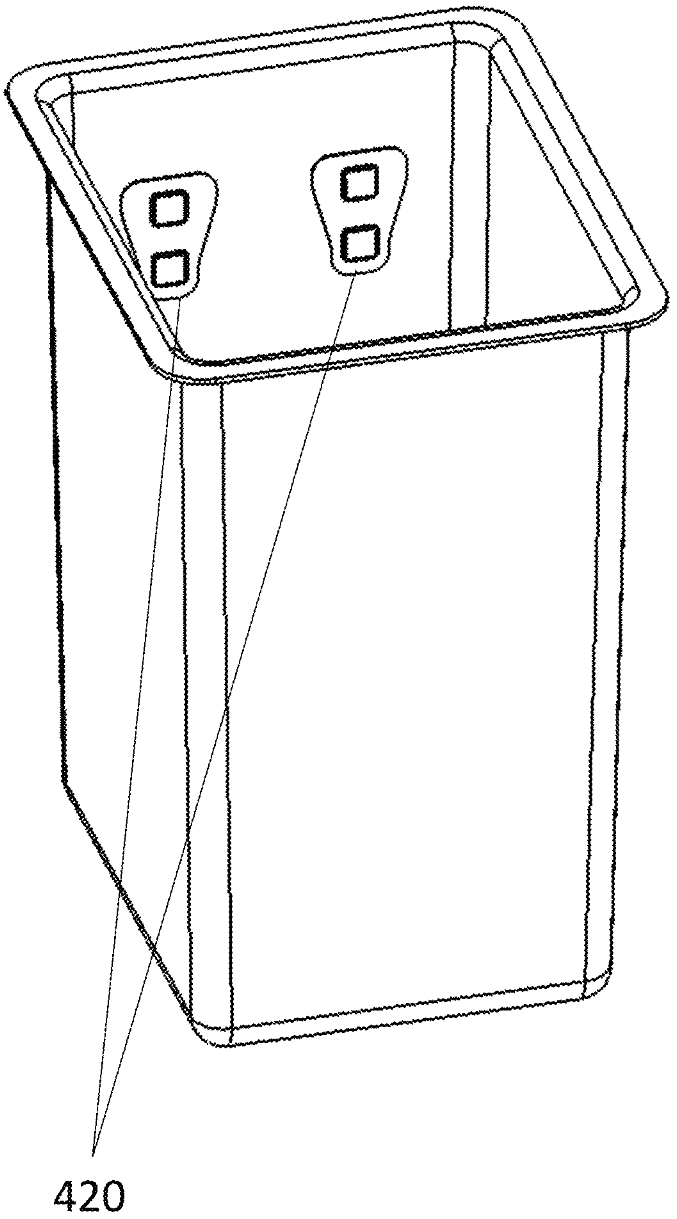
FIG. 43 is an interior view of a mounting plate according to the present invention.
Figure 44A:
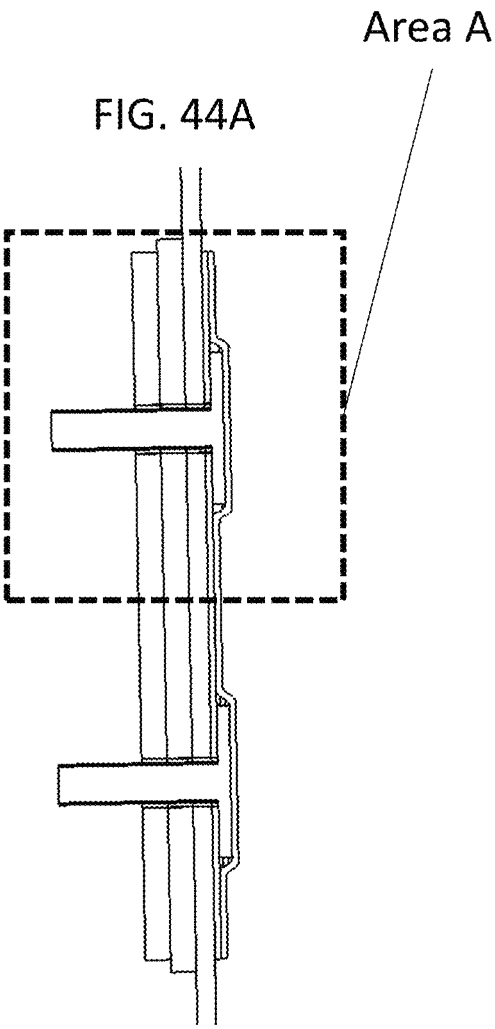
FIG. 44A is a cross-sectional view of a mounting plate according to the present invention.
Figure 44B:
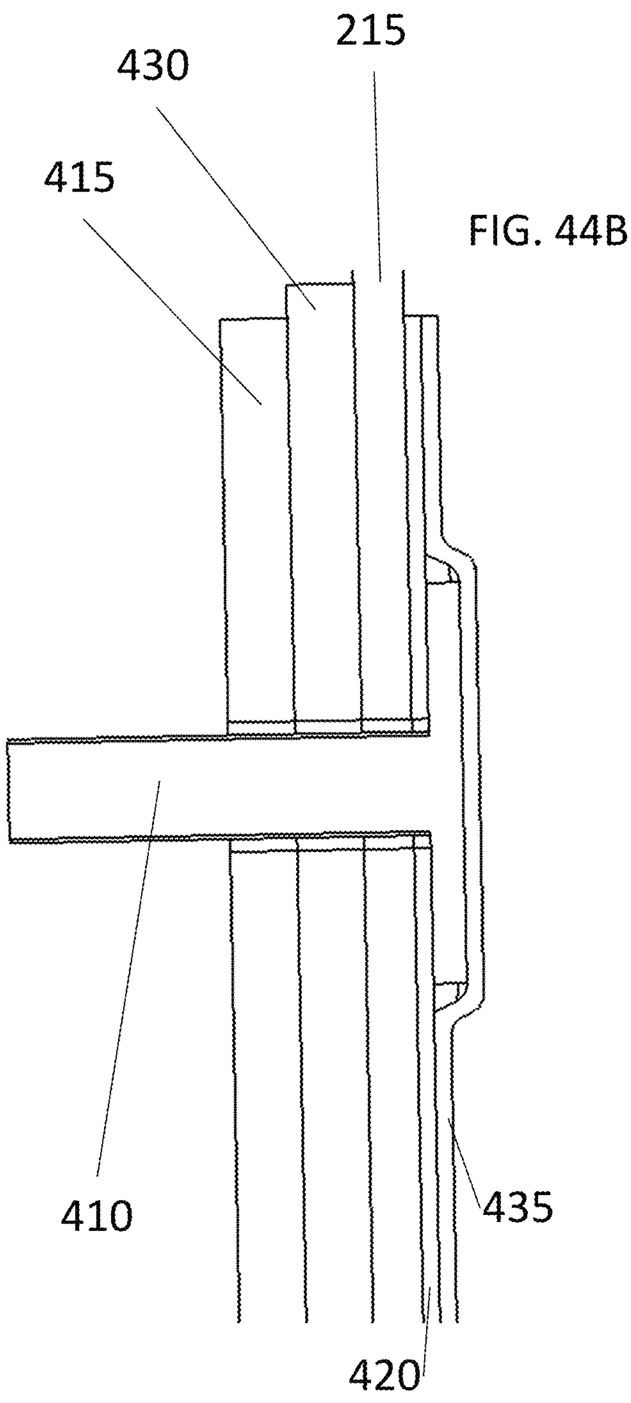
FIG. 44B is a magnified view of area A of FIG. 44A.
Figure 45A:
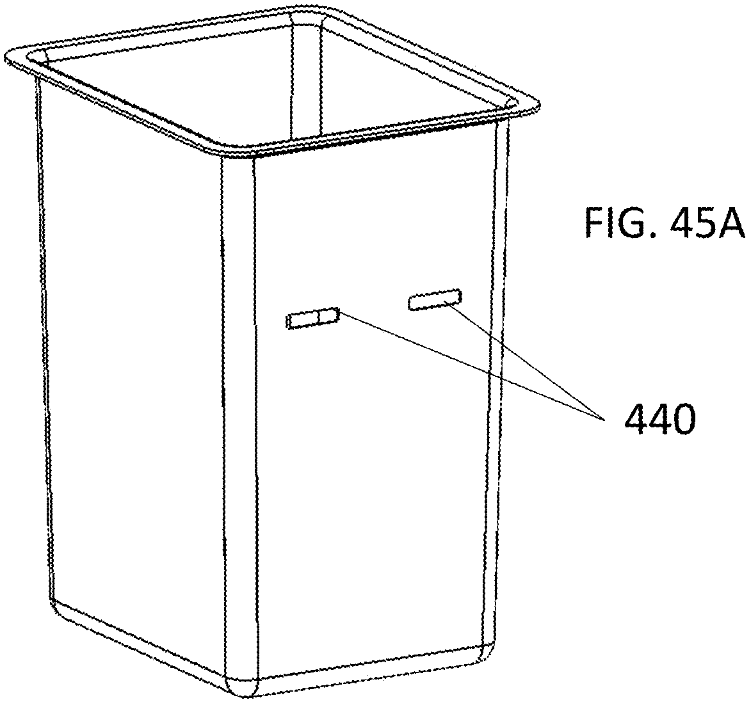
FIG. 45A shows a platform with two slots for mounting a mounting plate according to the present invention.
Figure 45B:
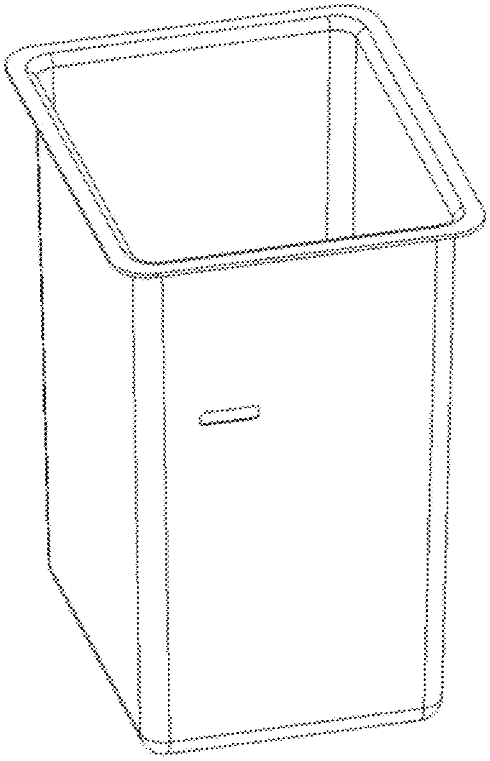
FIG. 45B shows a platform with one slot for mounting a mounting plate according to the present invention.

A first mounting plate example, generally described as 400, is shown in FIG. 42. This embodiment includes four studs 410 that protrude perpendicularly through the platform wall. These four studs are used to secure the controller mounting bracket to the mounting plate. The embodiment includes external reinforcement 415, which is wider at the bottom in order to spread out the compression load. Preferably, the bottom of the external reinforcement is between about 50% and about 100% wider than the top and the ratio of the height to the width of the wide end between about 1.4 and 2.33. Internal reinforcement 420, shown in FIG. 43, is wider at the top and the ratio of the height to the width of the wide end between about 1.4 and 2.33, also to spread out the compression load. Preferably, the top of the internal reinforcement is between about 50% and about 100% wider than the bottom. FIGS. 44A and B show cross-sectional views of the embodiment. FIG. 44B is a magnification of section A in FIG. 44A. The figures include the studs 410, the internal reinforcement 420, the external reinforcement 415, platform sidewall 215. Additionally, a spacer 430 and a dielectric cover 435 are included. The spacer is preferably silicone and the dielectric cover is preferably a non-conductive thermoplastic, such as polycarbonate.

FIGS. 45-52 show an alternative embodiment of the present mounting system. In this embodiment, one or more slots 440 are created in the platform sidewall (FIGS. 45A and B). External reinforcement 415 is attached (FIGS. 46A and B) and a mounting plate 445 is inserted through the slots (FIGS. 47A-O, with transparent platform) and rotated into position. The mounting plate 445 includes a top section 446, a bottom section 447 and a transition 448 (FIGS. 48A-O).

Figure 47A:
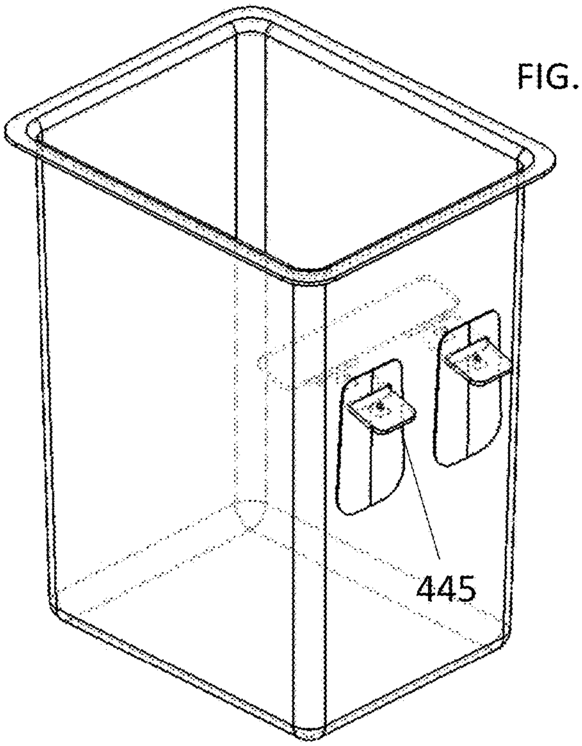
FIGS. 47A and B are perspective views of the installation of a double mounting plate according to the present invention.

FIG. 48A is a front view of the plate of FIGS. 47A and B.

FIG. 48B is a side view of the plate of FIGS. 47A and B.

FIG. 48C is a rear view of the plate of FIGS. 47A and B.

Figure 47C:
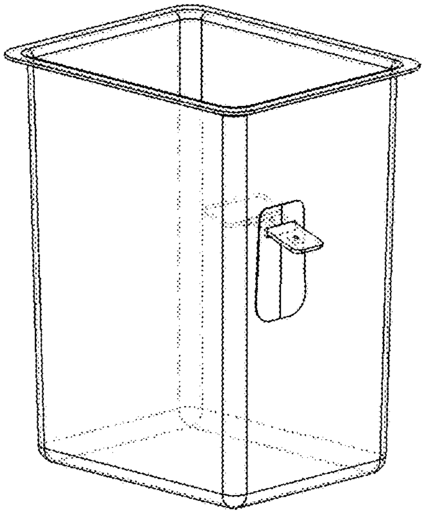
FIGS. 47C and D are perspective views of the installation of a single mounting plate according to the present invention.
Figure 47D:
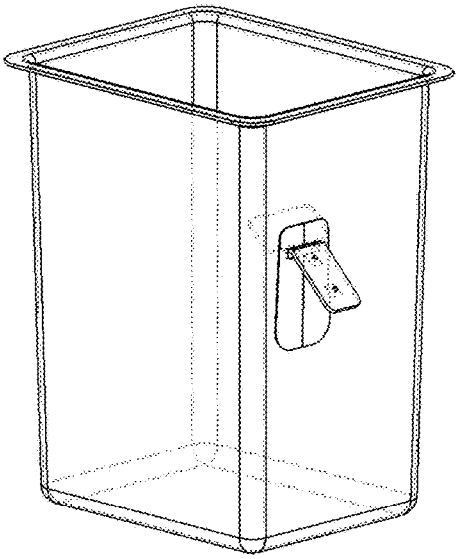
FIG. 47D shows the single mounting plate fully inserted.
Figure 47B:
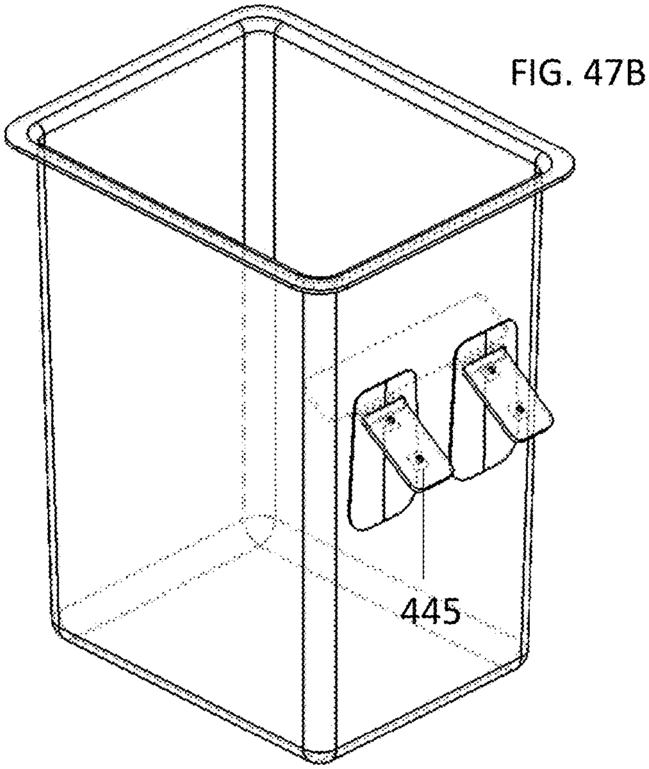
FIG. 47B shows the double mounting plate fully inserted.
Figure 49A:
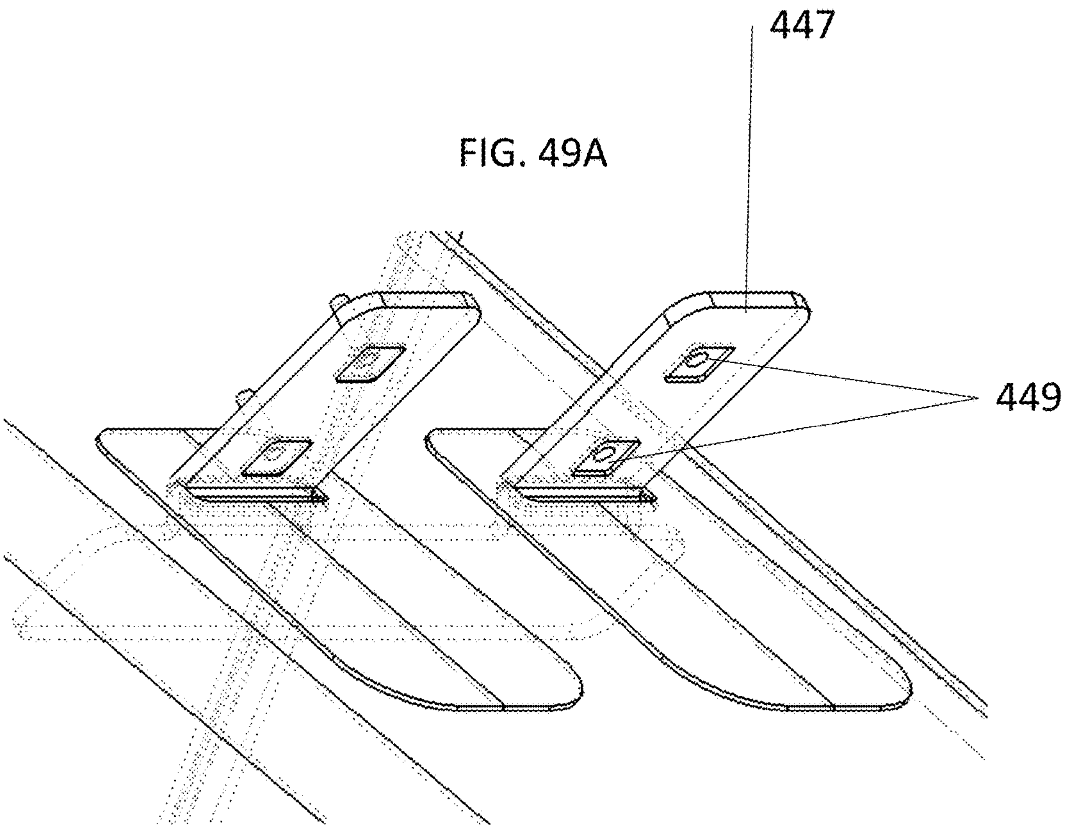
FIG. 49A is a perspective view of the rear of the lower section of the mounting plate of FIGS. 47A and B.
Figure 49C:
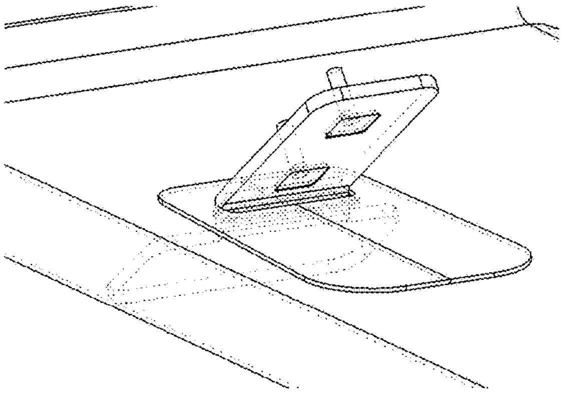
FIG. 49C is another perspective views of the rear of the lower section of the mounting plate of FIGS. 47C and D with studs inserted.
Figure 49B:
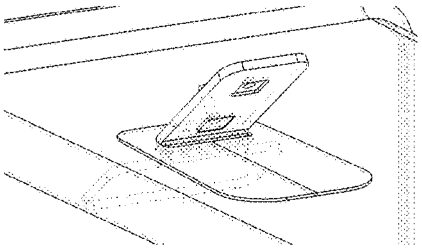
FIG. 49B is a perspective view of the rear of the lower section of the mounting plate of FIGS. 47C and D.

FIG. 48D is a front view of the plate of FIGS. 47C and D.

FIG. 48E is a rear view of the plate of FIGS. 47C and D.

FIG. 48F is a front perspective view of the plate of FIGS. 47A and B.

FIG. 48G is a rear perspective view of the plate of FIGS. 47A and B.

FIG. 48H is a front perspective view of the plate of FIGS. 47C and D.

FIG. 48I is a rear perspective view of the plate of FIGS. 47C and D.

FIG. 48J is a rear bottom perspective view of the plate of FIGS. 47A and B.

FIG. 48K is a bottom view of the plate of FIGS. 47A and B.

FIG. 48L is a front bottom perspective view of the plate of FIGS. 47A and B.

FIG. 48M is a rear bottom perspective view of the plate of FIGS. 47C and D.

FIG. 48N is a bottom view of the plate of FIGS. 47C and D.

FIG. 48O is a front bottom perspective view of the plate of FIGS. 47C and D.

Figure 50A:
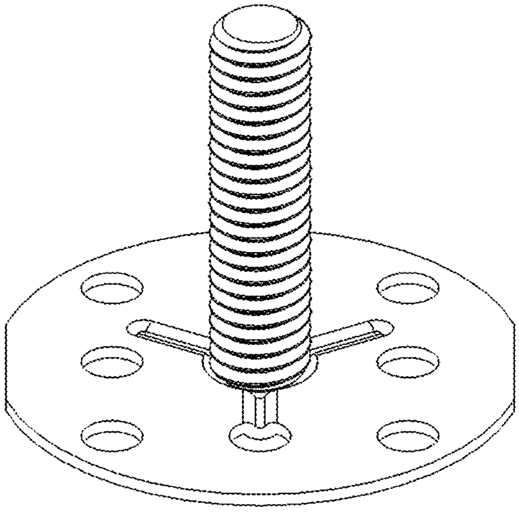
FIG. 50A-C are various views of a PRIOR ART exemplary stud used with the present invention.
Figure 50B:
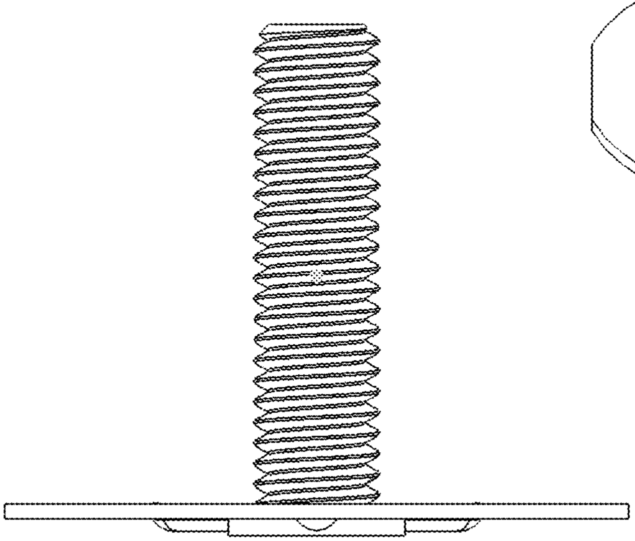
Figure 50C:
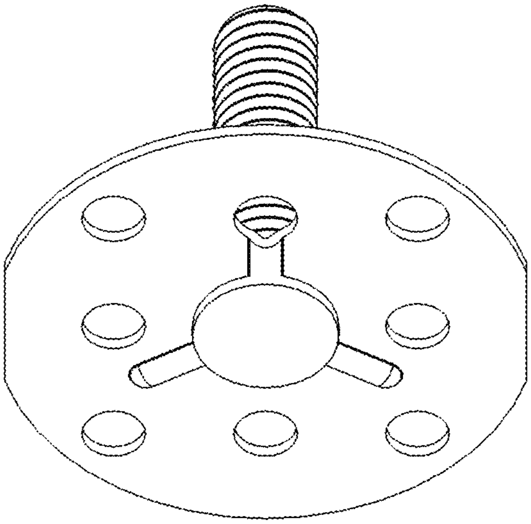
Figure 51A:
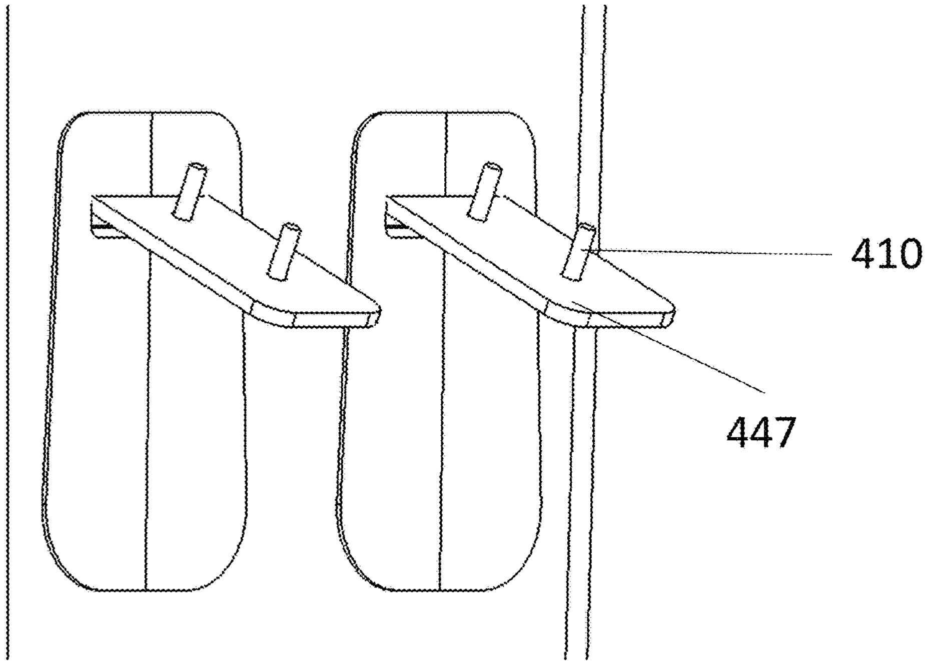
FIG. 51A is a perspective view of the lower section of the mounting plate of FIGS. 47A and B with studs installed.
Figure 51B:
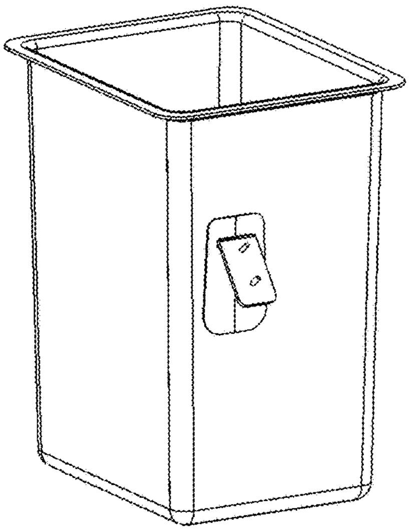
FIG. 51B is a perspective view of the lower section of the mounting plate of FIGS. 47C and D installed in a platform and with studs installed.
Figure 51C:
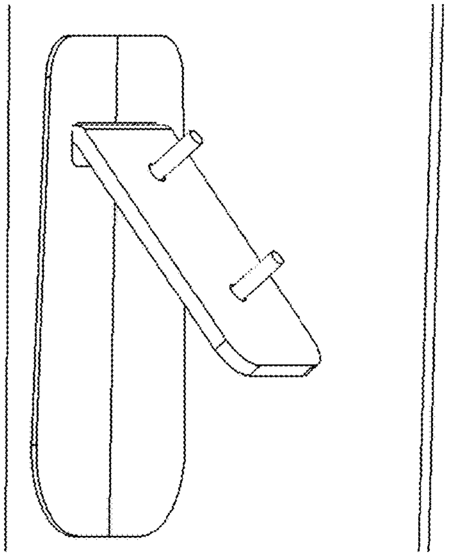
FIG. 51C is a close-up perspective view of the lower section of the mounting plate of FIGS. 47C and D installed in a platform and with studs installed.

The bottom section 447 includes recesses 449 for stud heads (FIGS. 48C, 48E, 48G, 48I, 48J, 48M and 49A-C). In a preferred embodiment, the studs 410 are stud fasteners with large, flat heads (large-and-flat-headed stud fastener), such as stud anchor studs (FIGS. 50A-C). Preferably, the stud is formed from a bolt inserted through a large washer and welded to the washer to form the stud. Designs where the stud is formed by welding a threaded rod to a flat head, although acceptable, did not provide as much strength. The flat sides of the head help to prevent the stud from twisting. The heads are preferable perforated and non-circular so that when embedded in composite resin they do not turn when a nut or other fastener is being applied and tightened. The studs 410 are inserted through the holes in the bottom section 447 (FIGS. 51A-C) and the mounting plate is rotated into position (FIGS. 52A-F). FIGS. 52A and B show a transparent platform with the double- and single-mounting plates, respectively, in position. FIGS. 52C and D show an opaque platform with the single and double-mounting plate, respectively, in position. FIGS. 52E and F are interior views of the platform with double and single-mounting plates, respectively.

FIG. 53A-K shows a design that consists of vertically elongated rectangular reinforcement pieces 450 with rounded corners (the shape is also called stadium, discorectangle, or obround) on the inside and outside of the platform wall. Big head studs penetrate the reinforcement pieces and platform wall and affix the reinforcement pieces to the wall. The elongated rectangular reinforcement pieces are oval in an alternative embodiment.

The reinforcement pieces 450 are bonded to the platform wall with an adhesive. The big head stud is inserted through a reinforcement piece on the inside of the platform, through the platform wall, and through a reinforcement on the outside of the platform. A non-conductive insulating cap 455 is placed over the stud heads on the inside of the platform to prevent any current from leaking through the platform wall. The insulating cap 455 is adhesively bonded in place or is connect via mechanical means. For example, the insulating cap is designed so it “snaps” into place over the stud heads when pressure is applied. The top and bottom of the reinforcement sections are rounded to reduce stress concentrations that is produced by sharp corners. The reinforcement sections on the inside of the platform extend up, past the reinforcement sections on the outside of the platform, by an inch or so. This further reduces stress concentrations by transferring more stress into the flange of the platform. All of the same materials proposed for previous designs are also used with this design.

The reinforcement sections preferably have a height-to-width ratio between about 3 and about 6. Whereas most prior art mounting plates have a height-to-width ratio between approximately 1 and 2, it was discovered that a greater height-to-width ratio was needed to prevent separation over time of the plate from the sidewall along the top and/or bottom edges.

Figure 53A:
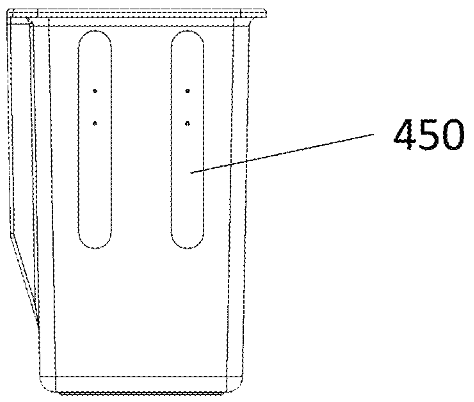
FIGS. 53A-K are various views of a vertically elongated rectangular mounting plate system installed in a platform according to the present invention.

In an example embodiment, the width of the reinforcement piece 450 in FIG. 53A is about 3.5 inches wide and about 20 inches tall (area=70 square inches). The bolt head shown in FIG. 50 is 2 inches in diameter and the mounting stud is centered in the 3.5-inch-wide portion shown in FIG. 53A. Two plates with an approximately 8-inch margin above and below the top and bottom bolts do not separate when under a 175 lbs on a 6.5-inch moment arm. Thus, the example embodiment was able to support about 95 ft-lbs with two of the plates, with a combined area of 140 square inches, without separation, giving a separation support factor of about 0.68 ft-lbs/square inch. In contrast, a prior art mounting plate that was rated to support 40 lbs with an 8" moment arm (26.66 ft-lbs) had dimensions of about 11.5×16 inches (area=184 square inches), giving a separation support factor of 0.144 ft-lbs/square inch. By increasing the height to width ratio, the plate is able to several times more load without separation along the top or bottom edges.

Figure 53B:
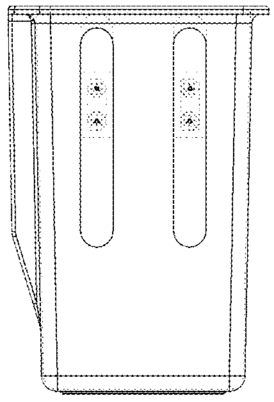
Figure 53C:
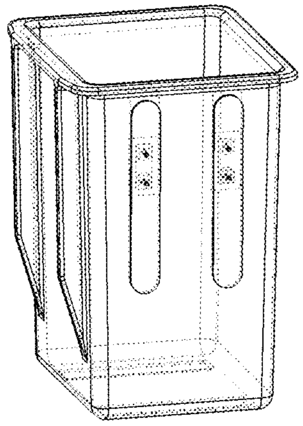
Figure 53D:
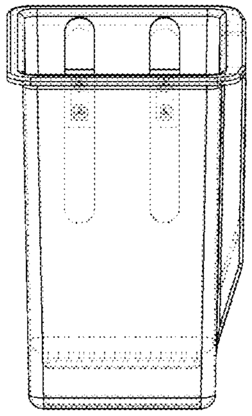
Figure 53E:
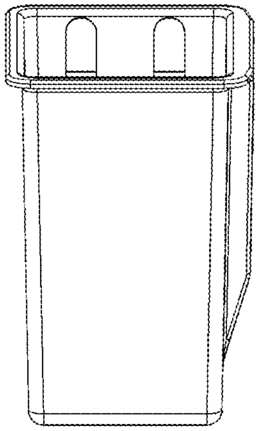
Figure 53F:
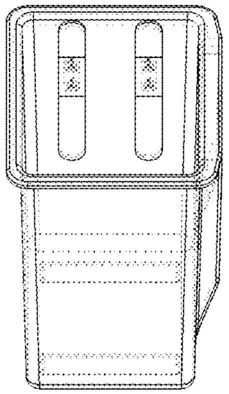
Figure 53G:
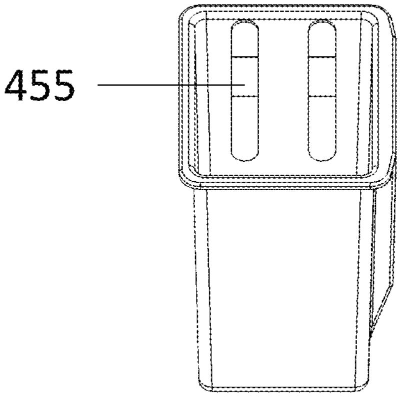
Figure 53H:
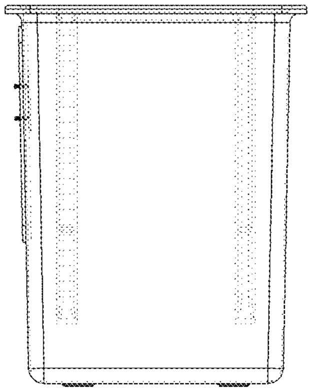
Figure 53I:
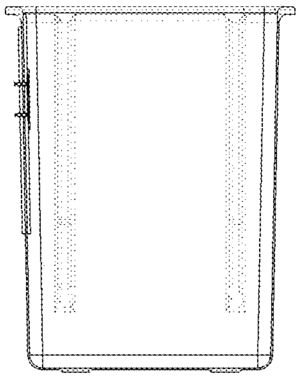
Figure 53J:
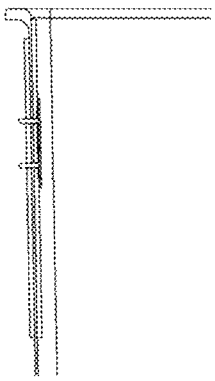
Figure 53K:
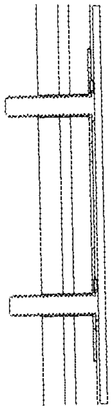

FIG. 53A is a front view of the design. FIG. 53B is a transparent front view showing the reinforcement sections and the studs. FIG. 53C is a front perspective, transparent view. FIG. 53D is a rear perspective transparent view. FIG. 53E is a rear perspective solid view. FIG. 53F is a top rear perspective transparent view. FIG. 53G is a top rear solid perspective view. FIG. 53H is a side transparent view. FIG. 53I is a cross sectional view. FIG. 53J is a side, cut-away detailed view of the design. FIG. 53K is a closer detailed of FIG. 53J.

Figure 54:
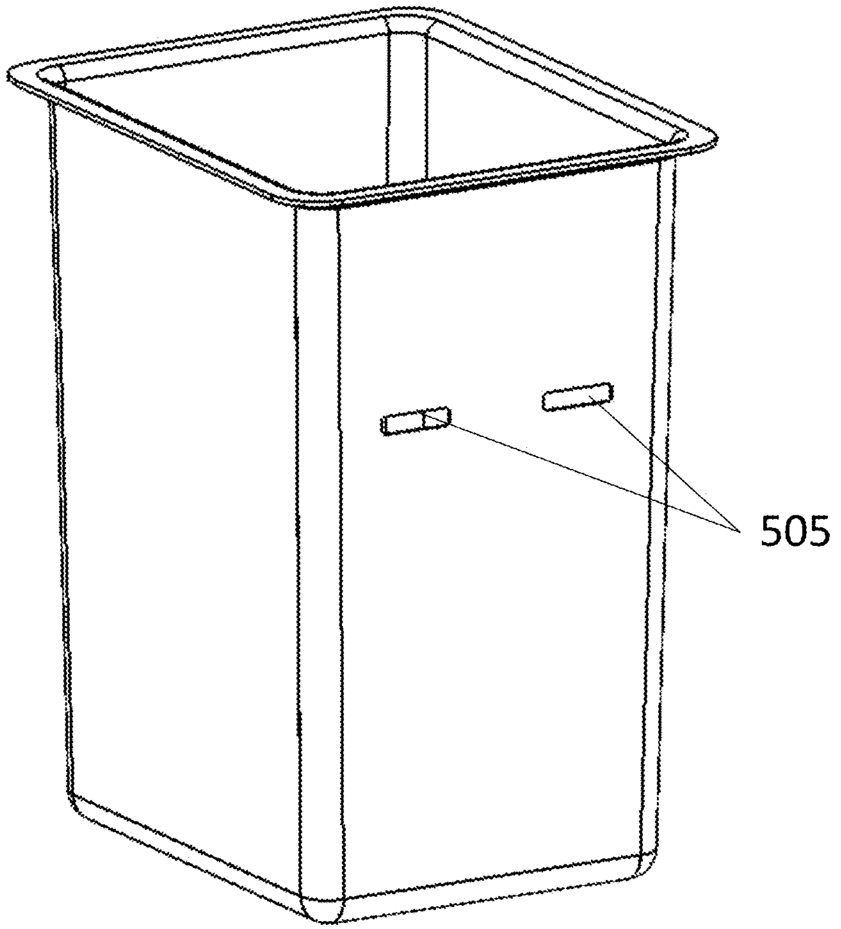
FIG. 54 is a perspective view of a platform with slots for mounting a mounting plate according to the present invention.
Figure 55A:
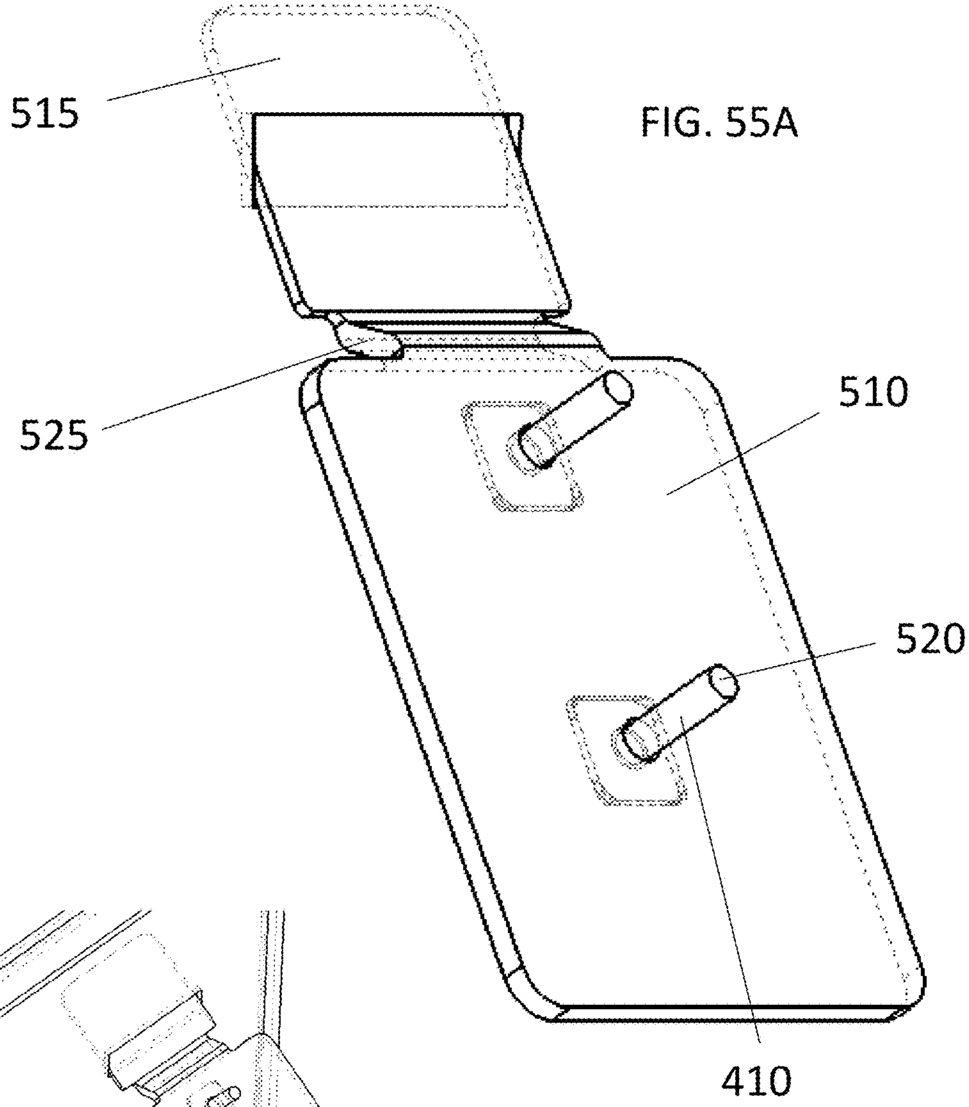
FIG. 55A is a perspective exterior view of a single-upper-section mounting plate according to the present invention partially installed in a transparent platform.
Figure 55B:
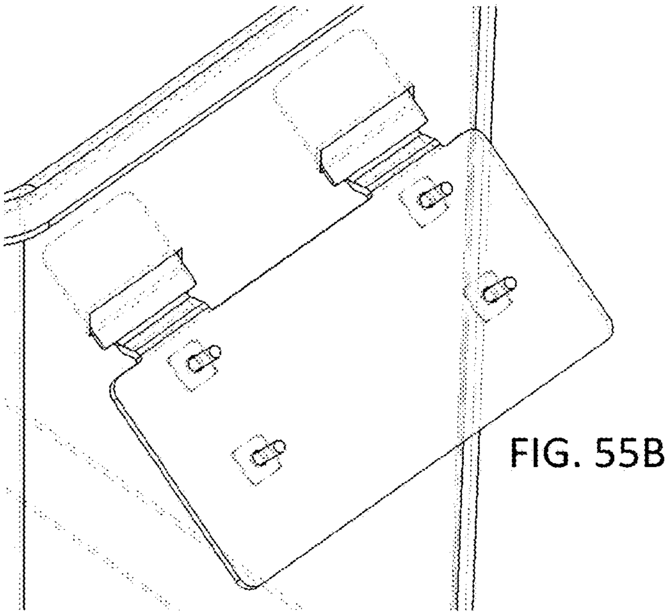
FIG. 55B is a perspective exterior view of a double-upper-section mounting plate according to the present invention partially installed in a transparent platform.

Yet another mounting system example embodiment is shown in FIGS. 54-58. In this system, slots 505 are created in the platform sidewall (FIG. 54). A plate 510, with at least one upper section 515 and a lower section 520 is provided (FIGS. 55A and B). The lower section has a horizontal dimension that is greater than the length of the slot, such that the platform cannot slide beyond the transition area 525. The lower section includes holes for studs 410. The plate is shown being inserted into a slot 505 in a transparent platform.

Figure 57A:
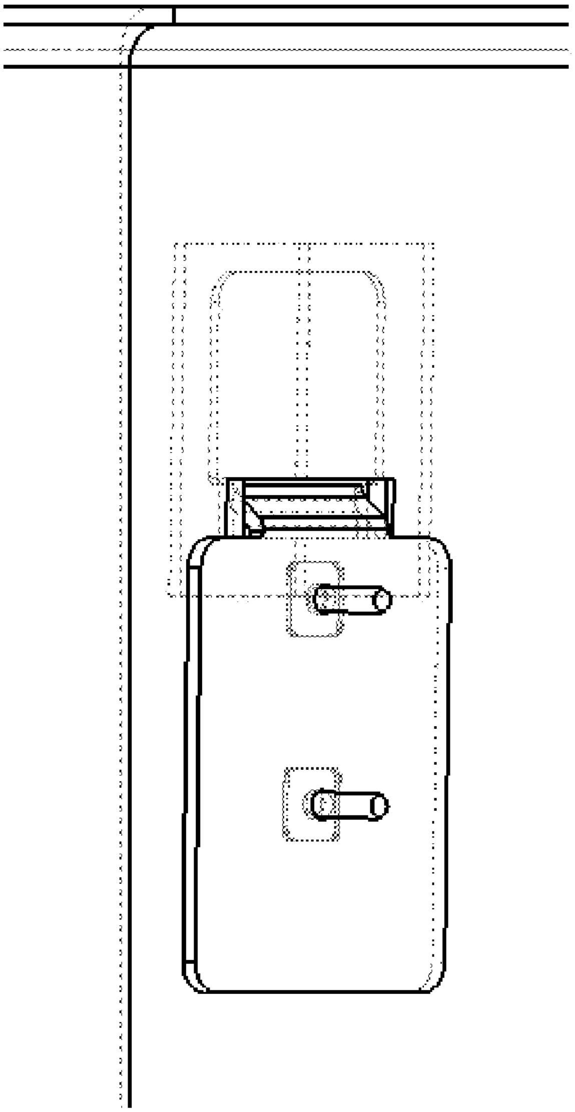
FIG. 57A is a perspective exterior view of the mounting plate of single-upper-section mounting plate installed in a transparent platform.
Figure 57B:
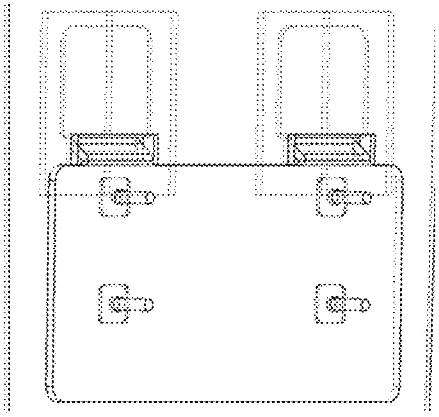
FIG. 57B is a perspective exterior view of the mounting plate of double-upper-section mounting plate installed in a transparent platform.

On the inside of the platform, two inner reinforcement components 530 are positioned between the upper section 515 and the platform. The reinforcement components are slotted 535 to receive the transition area 525 (FIGS. 56A-D), so that the two reinforcement components contact one another when slid together and provide a reinforcement for the entire area of the upper section. FIGS. 57A and B show an exterior perspective view of the plate rotated into position in a transparent platform. FIGS. 58A and B show interior views, respectively, for a plate installed in an opaque platform. FIGS. 58C and D show exterior views, respectively, for a plate installed in an opaque platform.

Advantageously, these valve mounting systems eliminate the risk associated with using adhesives to mount the mounting plate to the platform. In particular, a tension force that is created at the top of the plate when the plate is loaded has the potential to separate the mounting plate from a platform wall. Mechanically interlocking the platform wall via a slot or cutout in the platform wall eliminates the risk of separation of the mounting plate from the platform wall. However, in some scenarios it is undesirable to cut slots or holes in the wall of the platform and/or for the platform to include interior components because a platform liner, used for dielectric insulation, may not fit in a platform that has extra mounting plate components taking up space inside of the platform. In these scenarios, it is desirable for the entirety of the mounting plate to remain on the outside of the platform.

Figures 59A, 59B, 59C, 59D:
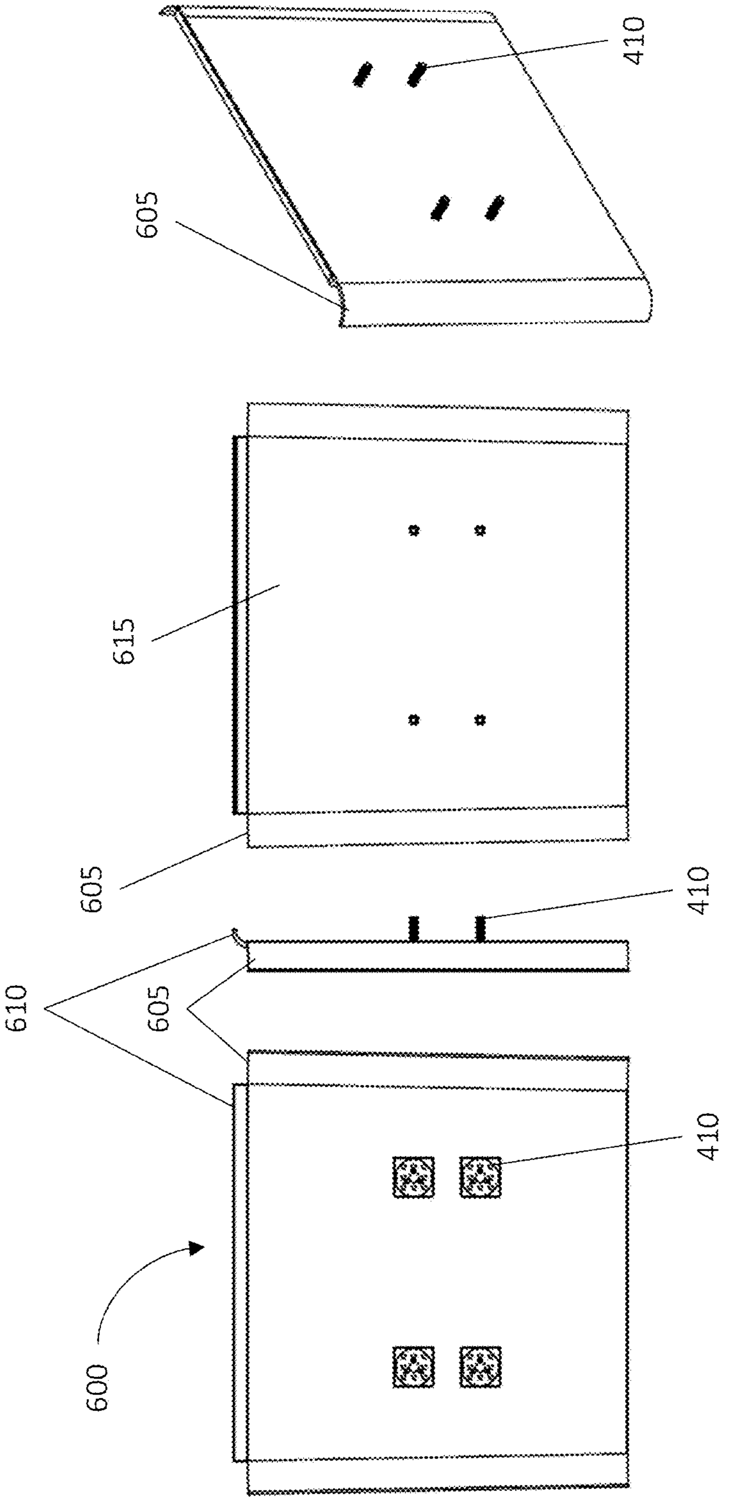
FIG. 59A is a rear view of a mounting plate with tabs according to the present invention.
FIG. 59B is a side view of the mounting plate of FIG. 59A.
FIG. 59C is a front view of the mounting plate of FIG. 59A.
FIG. 59D is a perspective view of the mounting plate of FIG. 59A.
Figures 60A, 60B, 60C, 60D:
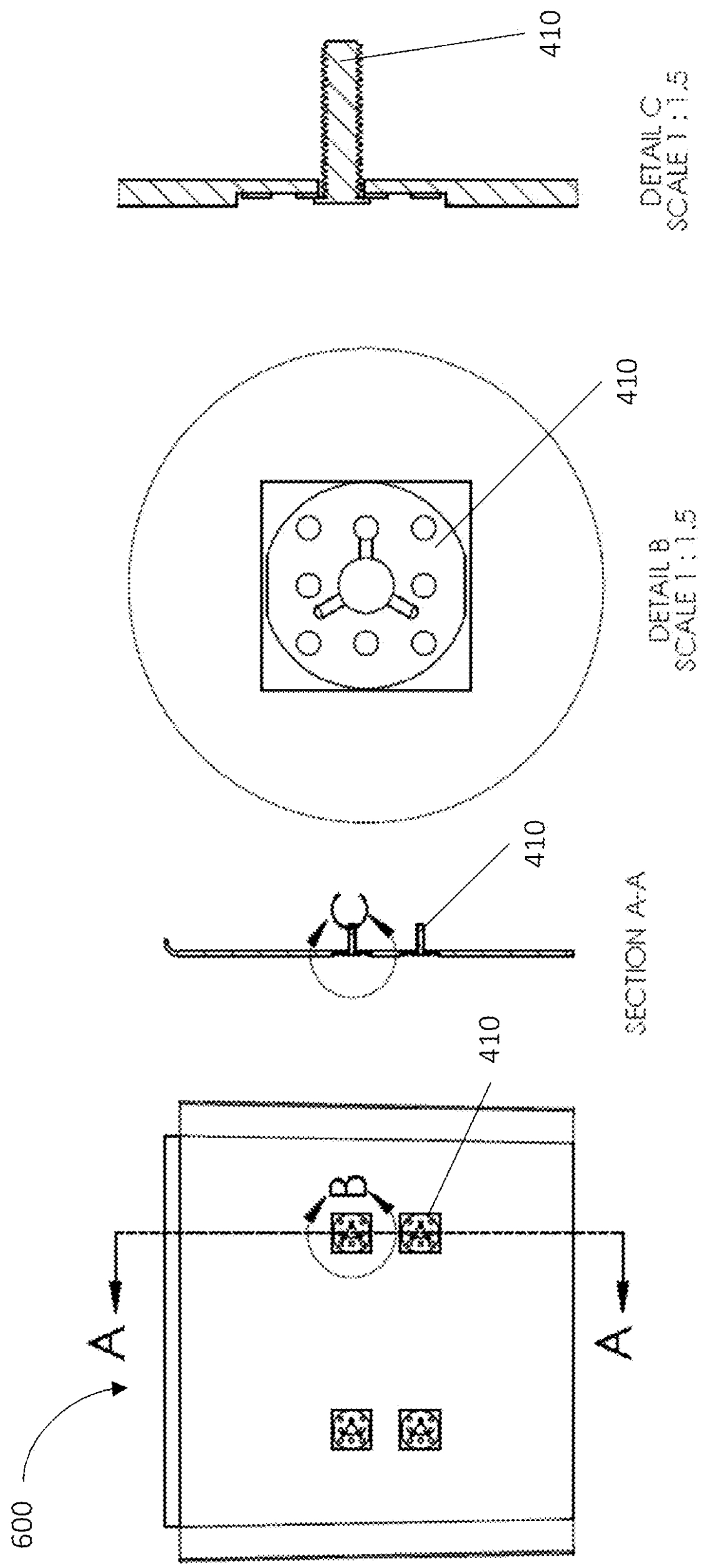
FIGS. 60A-D show detailed views of the embedded big-head studs in the mounting plate of FIGS. 59A-D.
Figure 61D:
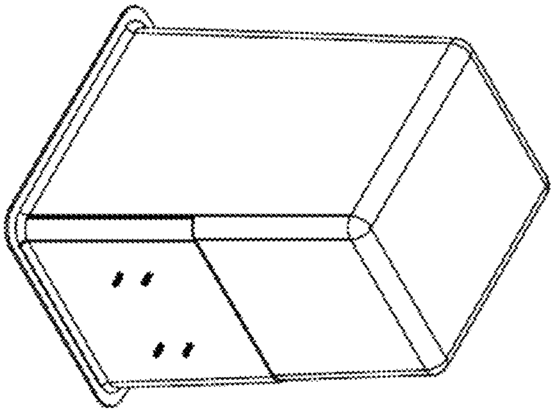
FIGS. 61A-D show the embodiment of FIGS. 59A-D mounted on a platform.
Figure 61C:
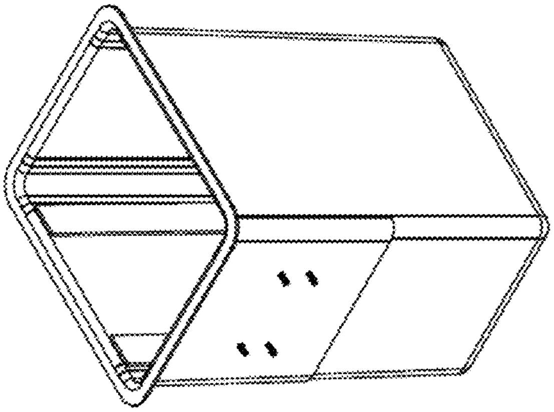
Figure 61B:
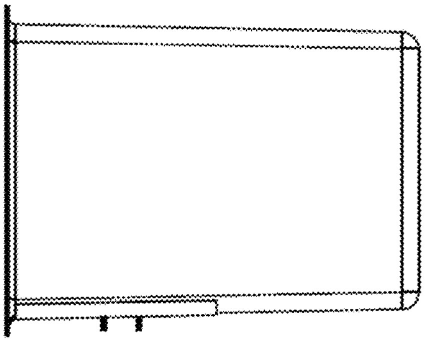
Figure 61A:
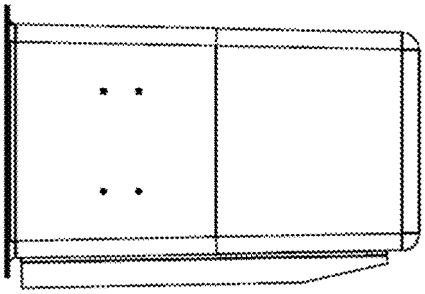

Such a mounting system according to the present invention includes a mounting plate that wraps around the sides of the platform and around the underside of the platform flange. FIGS. 59-61 show a valve mounting plate design, generally described as 600, with side tabs 605 that wrap around the sides of the platform, a top tab 610 that wraps against the underside of the platform flange, and a main support component 615 that substantially or matingly contacts and is adhered to the planar side of the platform. The tabs are non-parallel to the main support component. They are orthogonal to the main support component or at another angle and substantially or matingly contact the sidewall of the platform and/or the top flange of the sidewall. These tabs allow tension stress, which could induce peeling at the outer edges of the mounting plate, to be transformed into shear stresses. In the preferred embodiment, the top and side edges are tabbed. In an alternative embodiment, only the top edge is tabbed. Surprisingly, this mounting system configuration supports about four times the load of prior art mounting plates when a similar moment arm is used. Studs 410 (see FIG. 41) are inserted through the plate and other components affixed to the platform with them. FIGS. 60A-D show detailed views of the embedded big-head studs. FIGS. 61A-D show this embodiment mounted on a platform. FIG. 61A is a front view; FIG. 61B is a side view, FIGS. 61C&D are top and bottom perspective views, respectively The plate is made out of fiber-reinforced thermosets, unreinforced thermosets, fiber-reinforced thermoplastics, or unreinforced thermoplastics. The studs are adhesively or mechanically joined with the mounting plate. Alternatively, the studs are embedded in the mounting plate when it is manufactured.

Figures 62A, 62B, 62C, 62D, 62E, 62F:
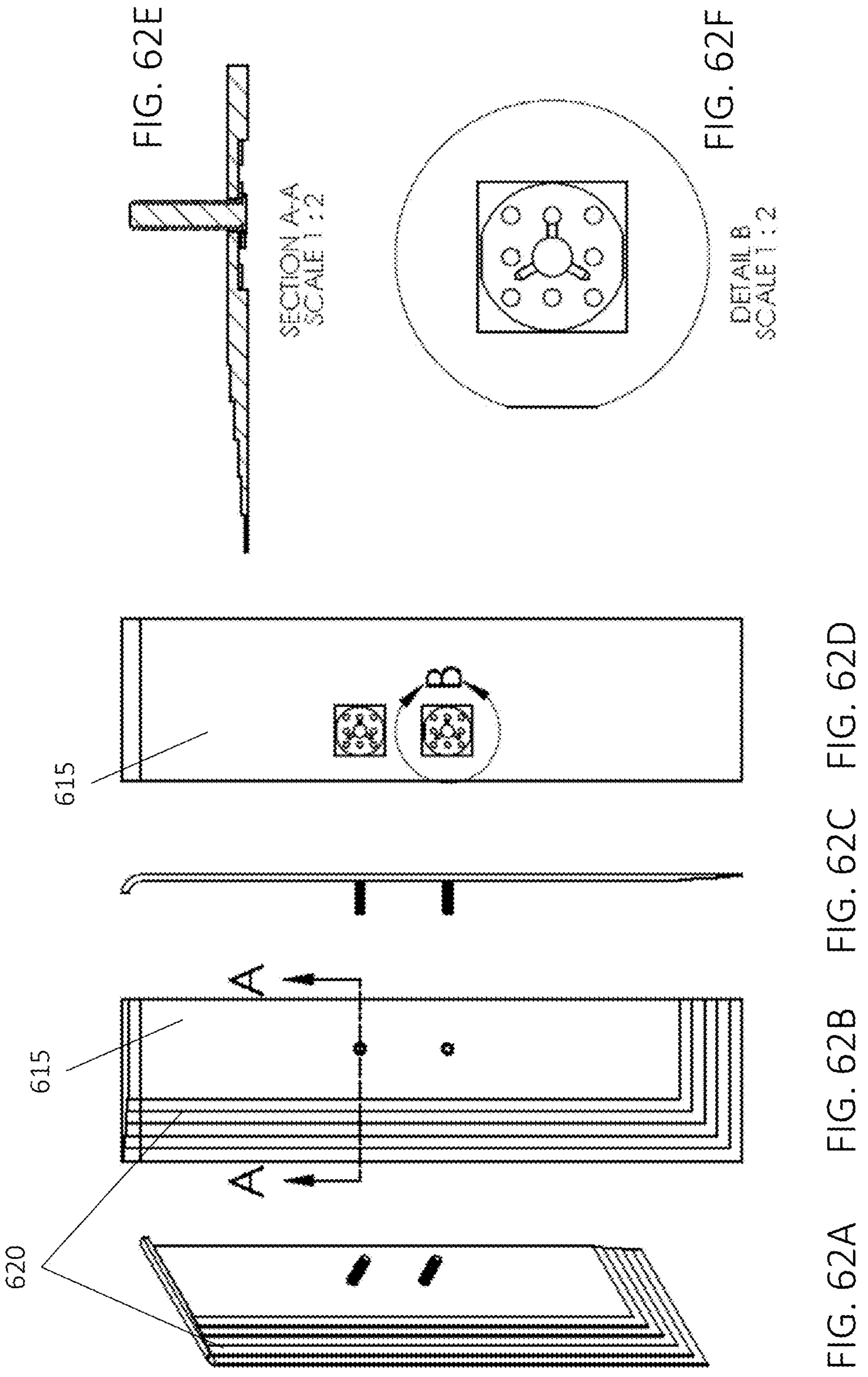
FIGS. 62A-F show another mounting plate embodiment that utilizes tabs.
Figure 63C:
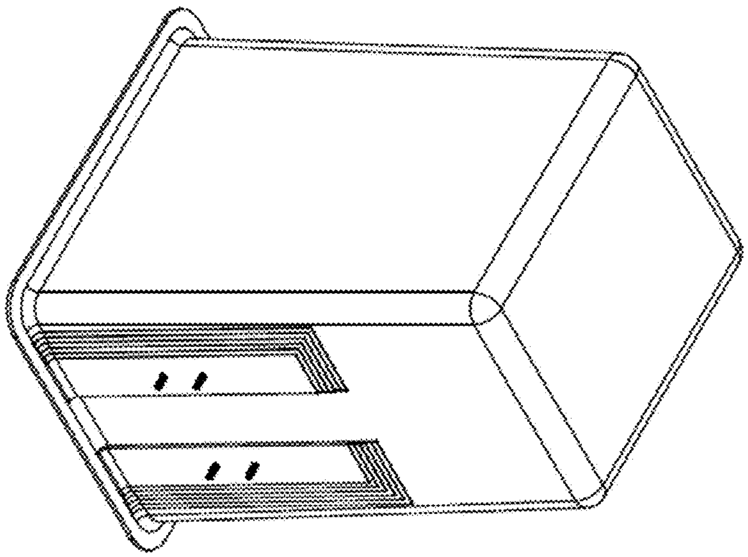
FIGS. 63A-C show the embodiment of FIGS. 63A-C mounted on a platform.
Figure 63B:
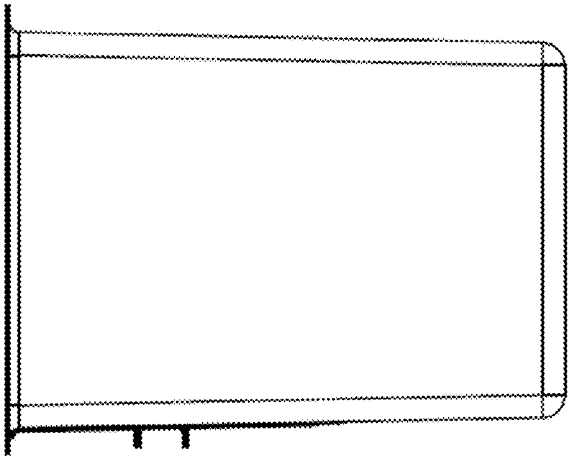
Figure 63A:
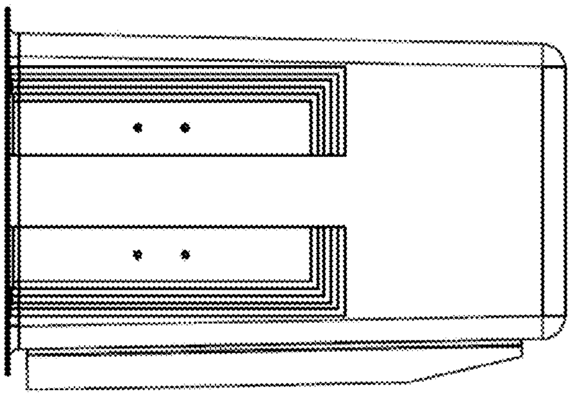

FIGS. 62A-C show another embodiment that utilizes edge modifications to change the tension stress at the edges into shear stress. In this embodiment the vertical sides are tapered or stepped 620 in order to transition the load to the platform wall more gradually and reduce stress concentrations. This design is lighter than the previous design due to its smaller size and reduced bonding area. This design uses the same materials and joining techniques as previously described. FIGS. 63A-C show the embodiment of FIGS. 62A-C mounted on a platform.

The present invention is thus directed to a mounting plate for an elevating platform. The mounting plate includes an interior reinforcement piece, an exterior reinforcement piece, and at least one fastener. The interior and exterior reinforcement pieces are vertically elongated with rounded corners, and positioned on the interior and exterior of the platform sidewall, respectively. The at least one fastener is inserted through the interior reinforcement piece on the inside of the platform, through the sidewall, and through the exterior reinforcement piece on the outside of the platform. The height-to-width ratio of the reinforcement pieces is between about 3 and about 6. The fastener is a mounting stud embedded in the interior reinforcement piece. In one embodiment, the interior reinforcement piece extends above the exterior reinforcement piece. In another embodiment, the exterior reinforcement piece is wider at the bottom than the top; and the interior reinforcement piece is wider at the top than the bottom. The bottom of the exterior reinforcement piece is between about 50% and about 100% wider than the top and the top of the interior reinforcement piece is between about 50% and about 100% wider than the bottom. The plate preferably includes a spacer positioned between the exterior reinforcement piece and the sidewall and a dielectric cover positioned over the interior reinforcement piece and a head of the at least one fastener; the spacer is silicone and the dielectric cover is a non-conductive thermoplastic. The mounting plate is made from fiber-reinforced thermosets, unreinforced thermosets, fiber-reinforced thermoplastics, and/or unreinforced thermoplastics.

Another mounting plate according to the present invention includes a wide planar section, narrow planar section and a transition. The wide and narrow planar sections are in parallel planes and not coplanar and the connects the wide and narrow planar sections. The narrow planar section is inserted through a slot in the sidewall. The wide planar section has a horizontal dimension that is greater than the length of the slot, such that the plate cannot slide through the slot beyond the transition area. The wide and narrow planar sections are parallel with and juxtaposed to the sidewall, providing a top planar section and a bottom planar section. At least one of the planar sections including at least one hole and at least one fastener, preferably a mounting stud, inserted through the hole to the platform exterior. In one embodiment, the mounting plate includes two inner reinforcement components positioned between the top planar section and the platform. The reinforcement components are slotted to receive the transition, such that the two reinforcement components contact one another when in position and seal the slot. The mounting plate is made from fiber-reinforced thermosets, unreinforced thermosets, fiber-reinforced thermoplastics, and/or unreinforced thermoplastics.

The present invention is also directed to a support for mounting components to a container. The support has a front, a back, a bottom edge, at least two side edges, a main support component, a top edge with a tab, and means for attaching components to the main support component, preferably mounting studs embedded in the main support component. The main support component is substantially parallel to the main planar surface of a first wall of the container and configured to substantially contact the main planar surface of the first wall of the container. The tab on the top edge is configured to substantially contact the projection of the container, thereby transforming the tension stress along the top edge of the mounting plate into shear stress. Preferably, at least one side edge and/or the bottom edge is tapered or stepped. In one embodiment, the support includes a first side tab along a first side edge of the support; the first side tab is configured to substantially contact the exterior of a second wall of the container that is non-coplanar with the first wall, thereby transforming the tension stress to shear stress along the at least one side edge of the support. Another embodiment includes a second side tab along a second side edge of the support, wherein the second side tab is configured to substantially contact the exterior of a third wall of the container that is non-coplanar with the first and/or second walls; thereby transforming the tension stress to shear stress along the second side edge of the support. In one embodiment, the support is a mounting plate, the container is an elevating platform with sidewalls, a top flange and a bottom, and the projection is the top flange. The support is preferably made from fiber-reinforced thermosets, unreinforced thermosets, fiber-reinforced thermoplastics, and/or unreinforced thermoplastics.

The present invention further includes, in one embodiment, mini-ribs. Similar to the full-length ribs illustrated in FIGS. 10-40 and described above, the mini-ribs also provide external attachment functionality for a platform. However, while the full-length ribs are constructed for attaching a platform to a supporting mechanism, the mini-ribs provide support to apparatuses attached to an outside or inside of the platform. For example, in one embodiment, the mini-ribs are operable to support a mounted control assembly for controlling a boom mechanism. In another embodiment, the mini-ribs are constructed to hold a bucket, basket, or tool tray for securing tools or providing a work area. In another embodiment, the mini-ribs are attached to a platform in a reversed orientation from the full-size rib such that stems of the ribs extend into the platform and at least one arm is positioned on an outside of the platform wall. The mini-ribs provide several advantages over traditional mounting mechanisms that are, in some embodiments, analogous to the advantages discussed above that are provided by the full-length ribs over traditional boom attachment mechanisms. Specifically, the modular design of the mini-ribs allows for external apparatuses to be removed and reattached between several sets of mini-ribs without the need for attaching the apparatuses to a supporting wall directly via bolting or similar means. The mini-ribs allow much more flexibility than elements that were bolted in, as the mini-ribs are operable to be paired with any necessary adapters or hardware to secure external apparatuses. Further, the rib-based construction eliminates the need for elements with low dielectric properties to be positioned through a mounting wall (e.g., metallic bolts), allowing for the elimination of potential electrical safety and hazard conditions in electrical power-based applications. In one embodiment, a platform sidewall with mini-ribs does not include any metallic components or other highly conductive materials embedded within, extending through, or otherwise connecting external and internal sides of the platform.

Notably, as described herein, mini-ribs are references in the plural, however one of ordinary skill in the art will recognize that a mini-rib is operable to attach to external apparatuses in a standalone, singular embodiment, and provide each of the structures and functionality disclosed. In another embodiment, a mini-rib is operable to be used in combination with any number of other mini-ribs, which each of the mini-ribs function independently or collectively to provide the disclosed structures and functionality.

In one embodiment, one or more mini-ribs are positioned to positioned on wall of a platform such that the ribs are operable to attach to a boom or boom connecting mechanism. For example, multiple mini-ribs are combined and positioned in place of a full-height rib (disclosed above) and attached to a boom or boom connecting mechanism in order to reduce the amount of material and weight required by the full-height rib. In another embodiment, ribs are positioned such that the stems of the ribs extend inward through a wall, wherein the rib is operable to attach to and support apparatuses within a platform.

Figure 64A:
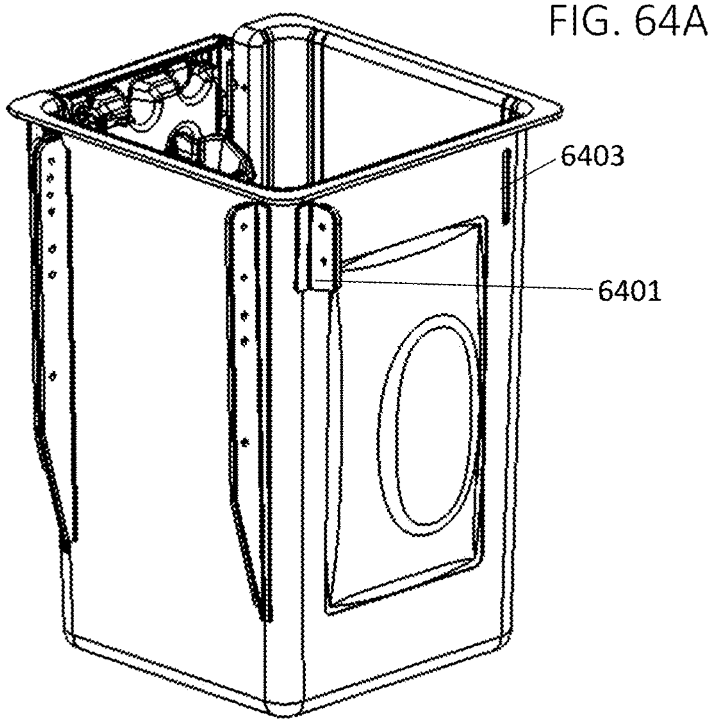
FIG. 64A illustrates a left perspective view of a mini-rib and sidewall cutout according to one embodiment of the present invention.
Figure 64B:
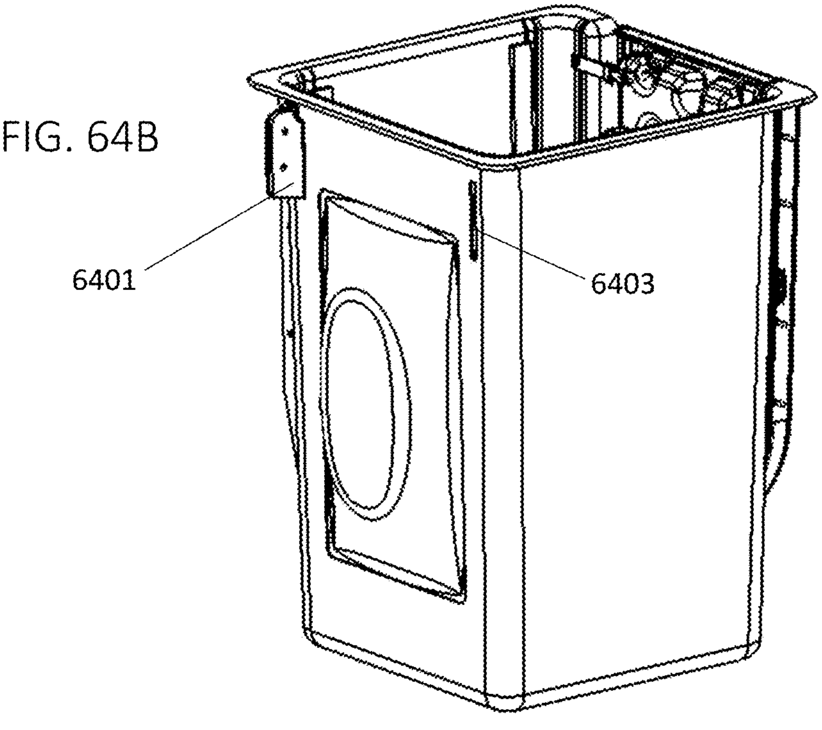
FIG. 64B illustrates a right perspective view of a mini-rib and sidewall cutout according to one embodiment of the present invention.

FIG. 64A illustrates one embodiment of a mini-rib 6401 constructed from an external L-shaped component and an internal L-shaped component. Preferably, the internal L-shaped component extends from inside a platform wall, through a slot, and attaches to the external L-shaped component on an outside of the platform wall. The mini-ribs include, in one embodiment, a pair of mini-ribs, wherein each mini-rib is aligned with a corresponding mini-rib on the same surface, and wherein the mini-ribs are constructed to be attached to and hold an apparatus between the pair. Pairs of mini-ribs are preferably constructed with mirrored components, wherein an apparatus secured between the mini-rib pair is in contact with or in nearest proximity to the same mirrored components of the mini-rib (for example, stems of internal L-shaped components). In one embodiment, external L-shaped components are positioned on distal sides of mini-rib pairs such that an apparatus secured between the pair is in contact with or in nearest proximity to a surface of a stem of the internal component. FIG. 64A further illustrates a slot 6403, which is constructed to receive a mini-rib to be paired with the mini-rib 6401 illustrated. Notably, the slot 6403 is similar to the slot through which the mini-rib 6401 illustrated passes through (not visible). FIG. 64B illustrates another perspective view of a platform with an installed mini-rib 6401, wherein the stem of the internal component of the mini-rib 6401 is visible.

In one embodiment, as illustrated in FIGS. 64A and 64B, the mini-ribs do not overlap with any element on the sidewall, including a knee space, a panel, a step, or any other element attached to the sidewall. In another embodiment, a platform wall includes drain tubes and/or toe pods, wherein the mini-ribs overlap a part or a whole of the drain tubes and/or toe pods.

In another embodiment, mini-rib pairs include a bracket or other similar structure that connects each of the mini-ribs in a pair. The bracket provides a further mounting location for an apparatus to be attached, such as a bucket, basket, control mechanism, or table, while also adding additional structure and support to the mini-ribs.

Figure 65A:
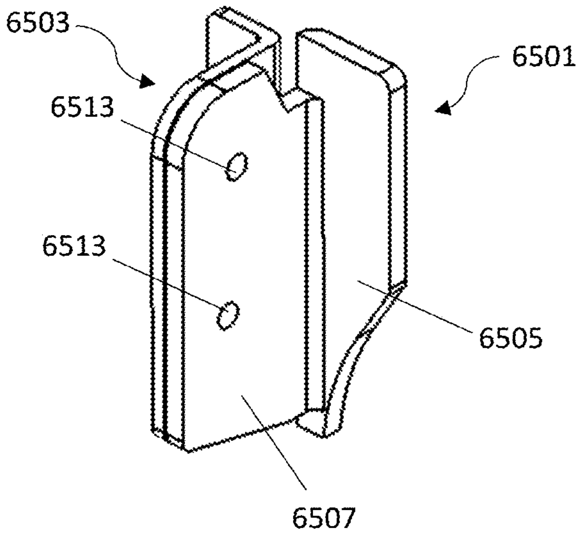
FIG. 65A illustrates a right detail perspective view of a mini-rib according to one embodiment of the present invention.

FIG. 65A illustrates a right-side view of one embodiment of a mini-rib. The mini-rib in one embodiment includes an internal L-shaped component 6501 and an external L-shaped component 6503. The internal L-shaped component 6501 includes at least one arm 6505 and at least one stem 6507. The arm 6505 is, in one embodiment, positioned on and in contact with an inside surface of a sidewall, such that the visible surface of the arm 6505 contacts the internal surface of the wall. The stem 6507 extends through a slot in the sidewall. In one embodiment, the arm 6505 is attached to the sidewall via one or more physical, chemical, and/or mechanical means (e.g., bonding via an adhesive, welding, or tape and/or mechanical fastening via a low-conductivity bolt and/or nut). In another embodiment, the arm 6505 is not attached to the wall but instead relies on mechanical, physical, and/or chemical attachment to the external L-shaped component 6503 to remain secured in place.

Figure 65B:
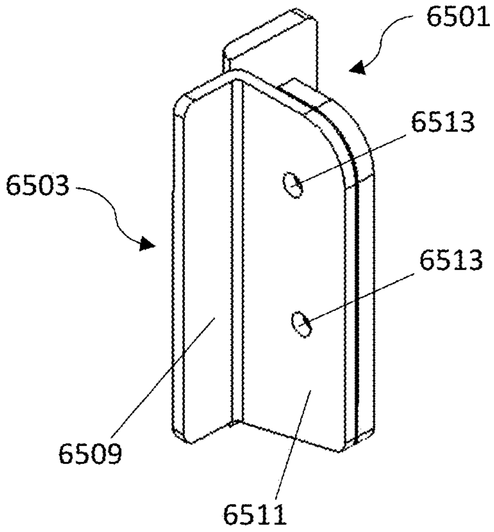
FIG. 65B illustrates a left detail perspective view of a mini-rib according to one embodiment of the present invention.

FIG. 65B illustrates a left-side view of one embodiment of the mini-rib, wherein the external L-shaped component 6503 includes an arm 6509 and a stem 6511. The arm 6509 is, in one embodiment, positioned on and in contact with an outside surface of a sidewall, such that the surface of the arm 6509 opposite to the illustrated surface contacts an external surface of the wall. The stem 6511 is in mating contact with the stem 6507 of the internal L-shaped component 6501. In one embodiment, the arm 6509 is attached to the sidewall via one or more physical, chemical, and/or mechanical means (e.g., bonding via an adhesive, welding, or tape and/or mechanical fastening via a low-conductivity bolt and/or nut). In another embodiment, the arm 6509 is not attached to the wall but instead relies on mechanical, physical, and/or chemical attachment to the internal L-shaped component 6501 to remain in place. In one embodiment, the internal L-shaped component 6501 and the external L-shaped component 6503 are attached via a mechanical fastener (e.g., a bolt, screw, pin, latch, or other mechanism) extending through holes 6513. In another embodiment, the holes 6513 are further used to secure both the mini-rib and an external apparatus, such as a control mechanism, a bucket, or an intermediate fastening mechanism, such as a bracket. Though the mini-rib is illustrated with two holes, in further embodiments, the mini-rib is constructed with any number of holes, including a no-hole embodiment, a single-hole embodiment, a three-hole embodiment, a five-hole embodiment, or any other number of holes that allow for attachment of the external apparatuses without diminishing structural integrity of the mini-rib. In one embodiment, apparatuses are attached to the rib at mounting locations (for example, holes) via adhesive, hook-and-loop fasteners, magnets, or other mechanical attachment means. In yet another embodiment, apparatuses are attached via snap fit, wherein the snap fit includes a snap fit between two ribs with mirrored blind holes or depressions, or wherein the material and/or construction of the apparatus is such that it is operable to snap fit to a single rib with at least one hole or depression. In the illustrated embodiment, the holes 3513 are horizontally offset, wherein a lower hole is positioned further from the arms of the stems than at top hole. Advantageously, the offset provides improved stress and strain distribution throughout the material by directing forces applied by an attached apparatus to the arms of the mini-rib and ensuring load bearing is distributed between each hole 6513. In another embodiment, the holes are vertically offset.

Figure 65C:
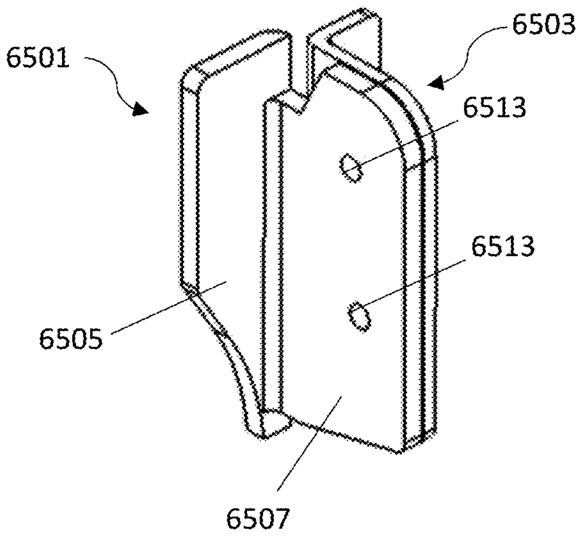
FIG. 65C illustrates a left mirror perspective view of a mini-rib according to one embodiment of the present invention.
Figure 65D:
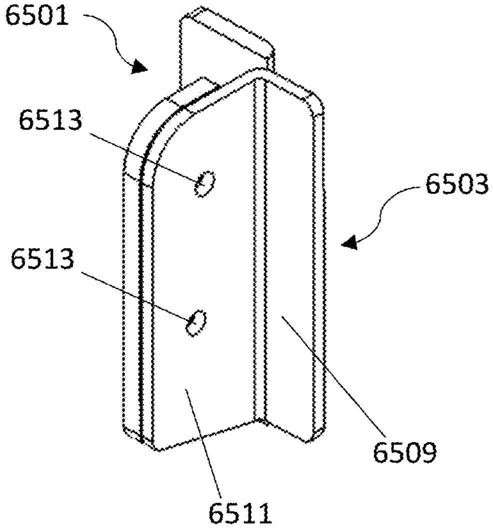
FIG. 65D illustrates a right mirror perspective view of a mini-rib according to one embodiment of the present invention.

FIGS. 65C and 65D illustrate a mirrored embodiment of the mini-rib illustrated in FIGS. 65A and 65B. The mirrored embodiments are structurally analogous to the embodiment illustrated in FIGS. 65A and 65B and are operable to be used in mini-rib pairs or as a standalone structure.

In one embodiment, one or both of the stems (6507, 6511) have heights that extend past the heights of one or both of the arms (6505, 6509). In another embodiment, one or both of the arms (6505, 6509) have heights that extend past the heights of one or both of the stems (6507, 6511).

Figure 66:
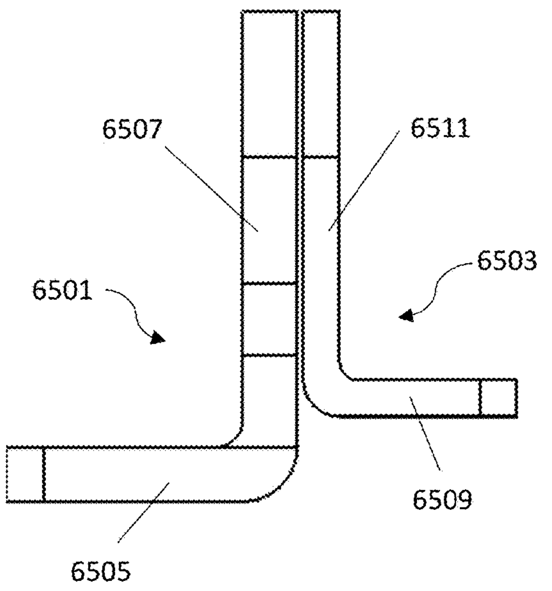
FIG. 66 illustrates a top view of an L-shaped mini-rib according to one embodiment of the present invention.

FIG. 66 is a top view of the mini-rib embodiment illustrated in FIGS. 65A and 65B, illustrating the relative lengths of the stem 6507 of the internal L-shaped component 6501 and the stem 6511 of the external L-shaped component 6503. Notably, the length of the stem 6507 of the internal L-shaped component 6501 is preferably longer than the stem 6511 of the external L-shaped component 6503, as the stem 6507 extends through a slot in a sidewall and contacts an internal surface of the sidewall.

Figure 67:
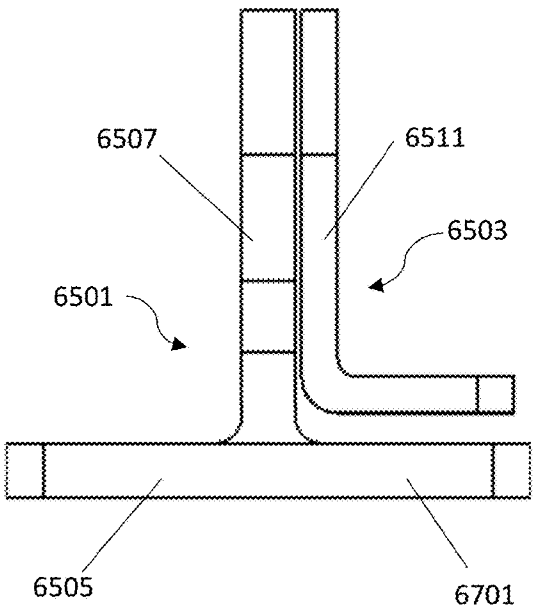
FIG. 67 illustrates a top view of a T-shaped mini-rib according to one embodiment of the present invention.

FIG. 67 illustrates a T-shaped embodiment of the present invention, wherein the internal component 6501 includes a second arm and is T-shaped. Similar to the full-sized ribs described above, by providing more surface area that is in contact with the sidewall, the T-shaped mini-rib provides additional structural security during use while sealing a cutout and providing improved dielectric properties to a platform. Notably, in further embodiments, any of the L-shaped internal components illustrated and described herein are constructed with an additional arm to form a T-shaped component.

In one embodiment, the internal component and/or the external component are constructed to completely cover and/or seal the sidewall cutout either through the T-shape construction or the L-shaped construction.

Figure 68A:
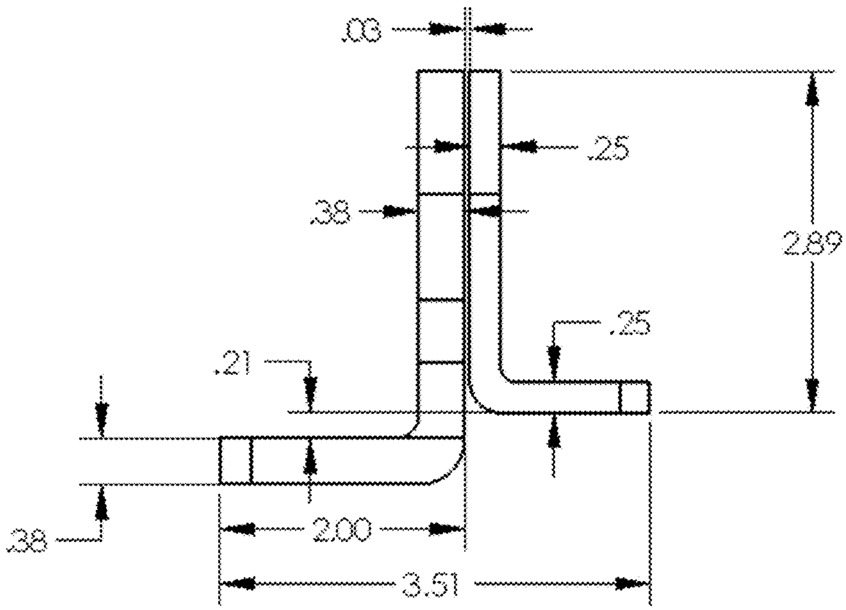
FIG. 68A illustrates a top view of a L-shaped mini-rib with dimensions according to one embodiment of the present invention.

FIG. 68A illustrates one embodiment of a mini-rib with L-shaped components with dimensions according to one embodiment of the present invention. In one embodiment, the thickness of each of the components are approximately as illustrated, wherein a thickness of the internal L-shaped component is approximately 0.38 inches, a length of the arm of the internal L-shaped component is approximately 2.00 inches, and a length of the stem of the internal L-shaped component is approximately 3.10 inches; a thickness of the external L-shaped component is approximately 0.25 inches, a length of the arm of the external L-shaped component is approximately 1.48 inches, and a length of the stem of the external L-shaped component is approximately 2.89 inches. In another embodiment, the thicknesses of each of the components are any thickness between approximately 0.060 inches and 1.0 inches, the stems of the components each have a length of any measurement between approximately 0.5 inches and 10.0 inches long, and the arms of the components each have a length of any measurement between approximately 0.25 inches and 10.0 inches in length. In yet another embodiment, the stems of the component have a length of any measurement between approximately 1.0 inch and 5.0 inches, and the arms of the component each have a length of any measurement between approximately 1.0 inch and 5.0 inches in length.

Figure 68B:
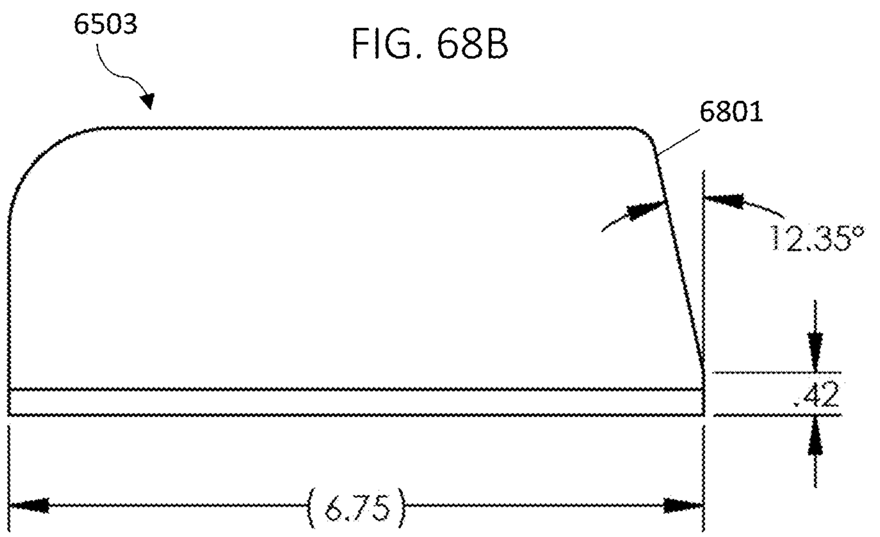
FIG. 68B illustrates a side view of an L-shaped external rib component according to one embodiment of the present invention.

FIG. 68B illustrates a side view of the external rib component 6503, wherein the external rib component is between approximately 6.75 inches in height (when positioned vertically) and has an upwardly angled bottom edge 6801 with an angle of approximately 12.35 degrees from the horizontal. In another embodiment, the height of the external rib component 6503 is between approximately 3 inches and 15 inches. In yet another embodiment, the height of the external rib component 6503 is between approximately 4 inches and 12 inches. The bottom edge 6801 has, in one embodiment, an angle of between 5 degrees and 70 degrees. In another embodiment, the bottom edge 6801 has an angle of between 7 degrees and 35 degrees.

Figure 68C:
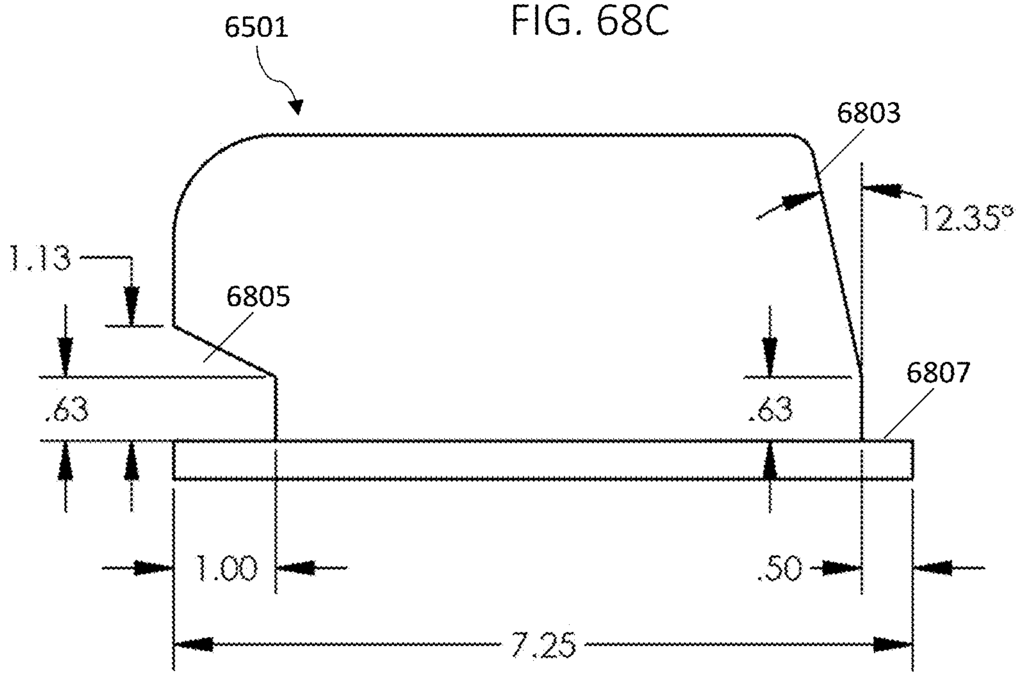
FIG. 68C illustrates a side view of an L-shaped internal rib component with dimensions according to one embodiment of the present invention.

FIG. 68C illustrates a side view of the internal rib component 6501, wherein the internal rib component 6501 is approximately 7.25 inches in height (when positioned vertically) and has an upwardly angled bottom edge 6803, wherein the angle of the bottom edge 6803 matches the upwardly angled bottom edge 6801 of the external rib component 6503. In one embodiment, the internal rib component 6501 includes a notch 6805 to allow the inserting the internal rib component 6501 through a sidewall slot. In the illustrated embodiment, the internal rib component 6501 includes an extension portion 6807 that provides additional seal and structural security to the internal rib component 6501. In one embodiment, the height of the external rib component 6503 is equal to the height of the internal rib component 6501 less the height of the extension portion 6807.

Figure 69A:
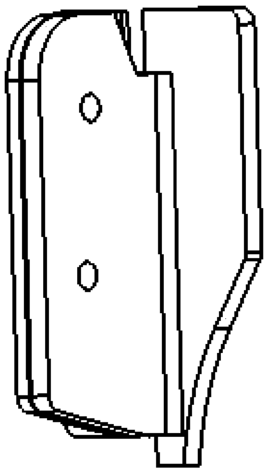
FIG. 69A illustrates a right perspective view of a mini-rib according to one embodiment of the present invention.
Figure 69B:
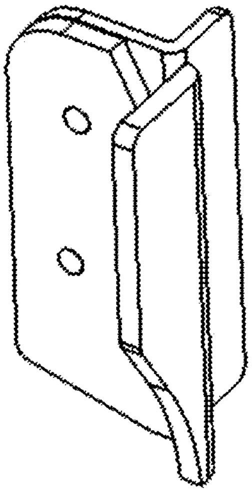
FIG. 69B illustrates a rear perspective view of a mini-rib according to one embodiment of the present invention.
Figure 69C:
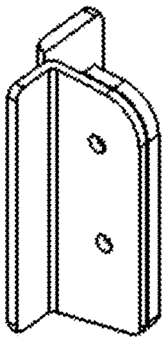
FIG. 69C illustrates a perspective view of a first mini-rib of a mini-rib pair according to one embodiment of the present invention.
Figure 69D:
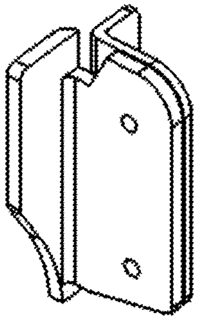
FIG. 69D illustrates a perspective view of a second mini-rib of a mini-rib pair according to one embodiment of the present invention.
Figure 70A:
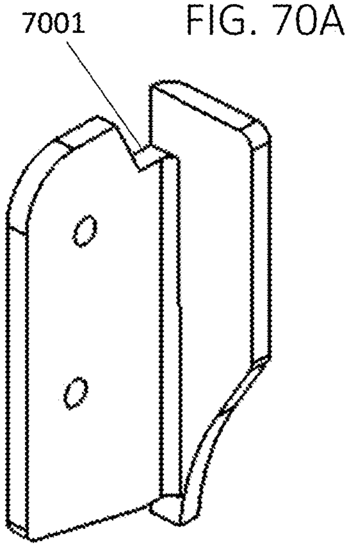
FIG. 70A illustrates a right perspective view of an internal rib component according to one embodiment of the present invention.
Figure 70B:
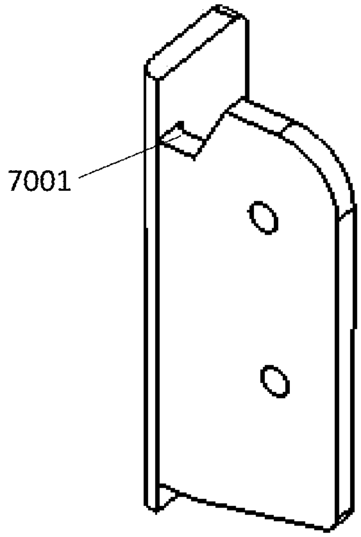
FIG. 70B illustrates a left perspective view of an internal rib component according to one embodiment of the present invention.
Figure 70C:
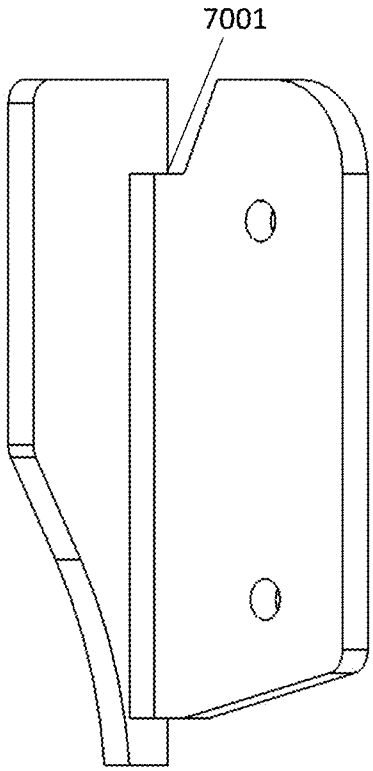
FIG. 70C illustrates a side view of an internal rib component with a notch according to one embodiment of the present invention.

FIGS. 69A-69B illustrate perspective views of the mini-rib components. FIG. 69C illustrates a left rib embodiment of a mini-rib pair, and FIG. 69D illustrates a right rib embodiment of a mini-rib pair.

FIGS. 70A-70D illustrate perspective views of the internal rib component and further highlight a notch 7001 included in the mini-rib component. The notch advantageously provides a method for securing the component within a slot of a sidewall. In one embodiment, a slot has a height that is less than the height of the stem of the component, which ensures that the component is secured in place once inserted through the slot. The method of inserting the internal mini-rib component through the slot is illustrated in FIGS. 72A and 72B and described below.

Figure 71A:
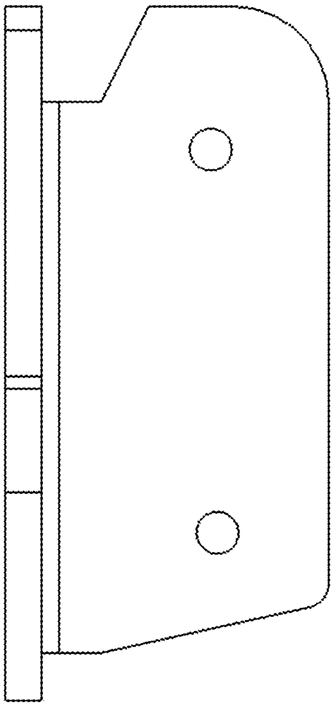
FIG. 71A illustrates a left side view of an internal rib component according to one embodiment of the present invention.
Figure 71B:
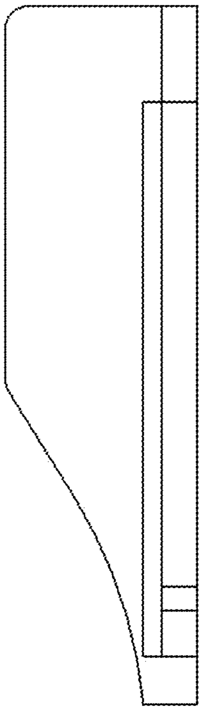
FIG. 71B illustrates front side view of an internal rib component according to one embodiment of the present invention.
Figure 71C:
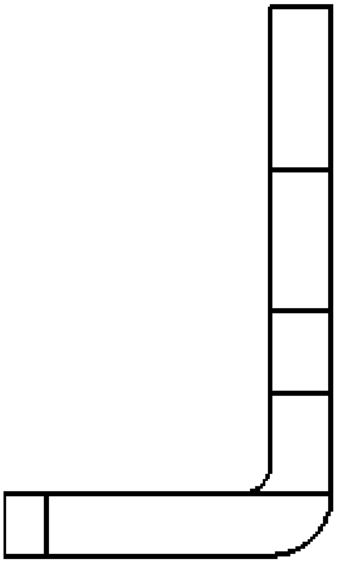
FIG. 71C illustrates a top view of an internal rib component according to one embodiment of the present invention.

FIGS. 71A and 71B illustrate side views of the internal L-shaped component of the mini-rib, and FIG. 71C illustrates a top view of the L-shaped component of the mini-rib.

Figure 72A:
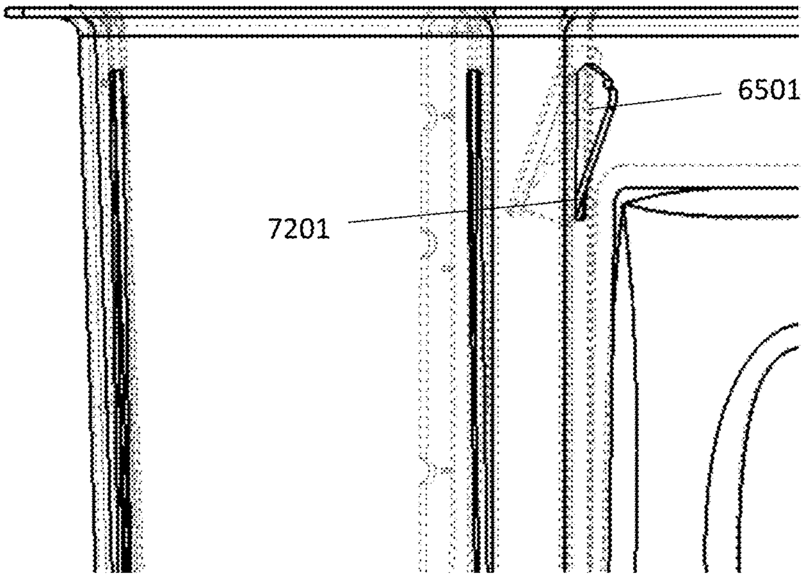
Figure 72B:
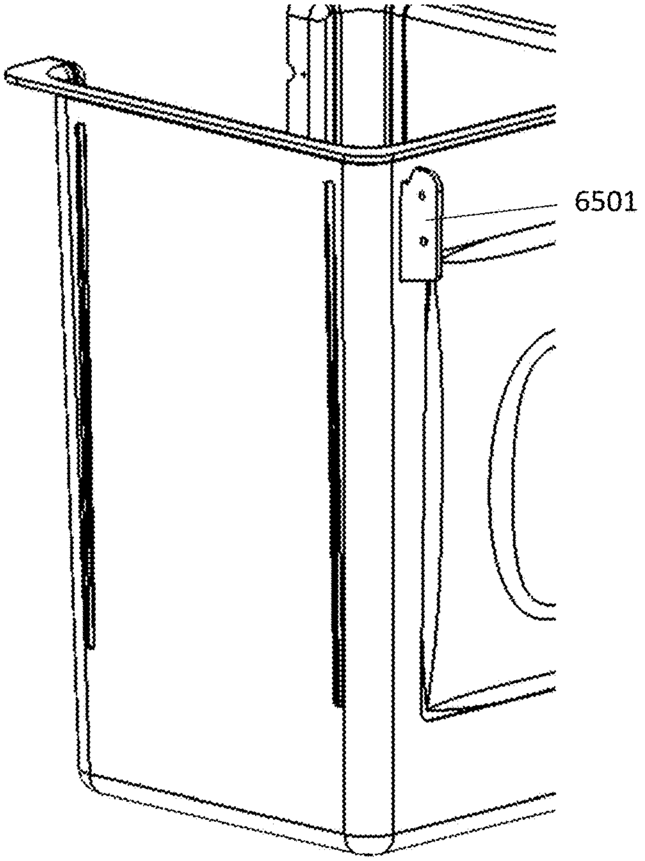
Figure 72C:
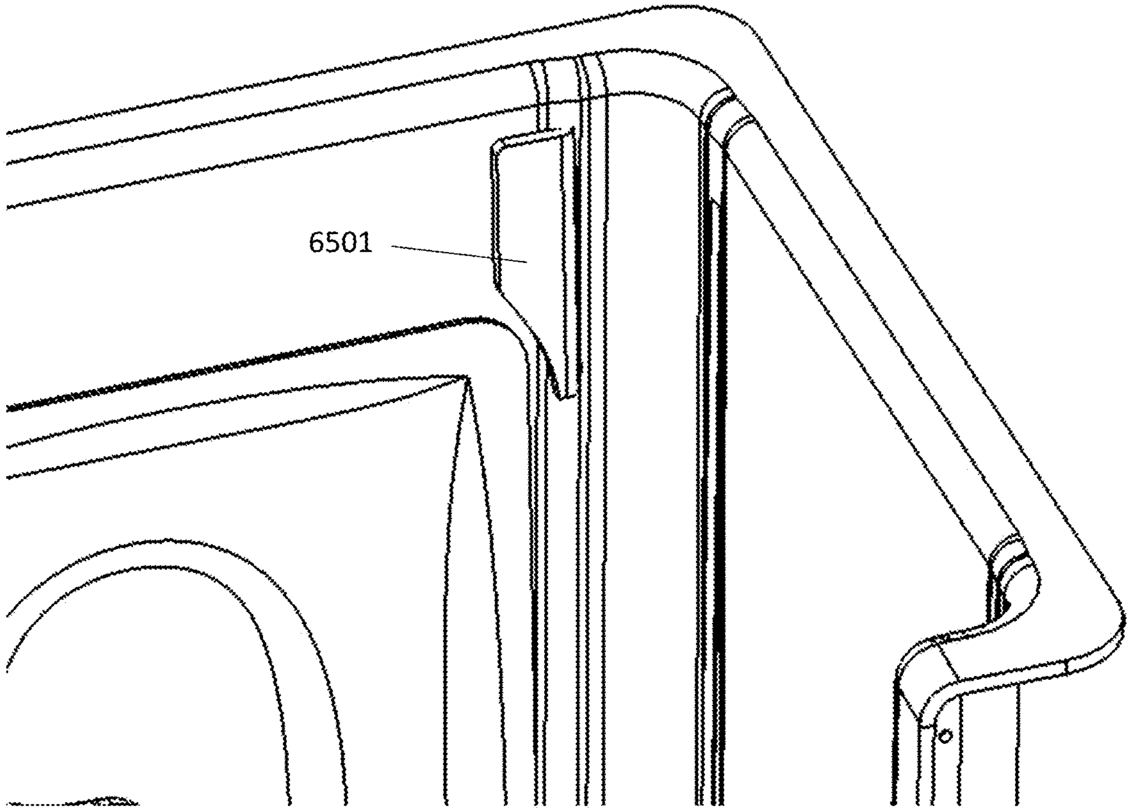

FIGS. 72A and 72B illustrate the mechanism by which the internal L-shaped component 6501 is inserted through a slot 7201 in a sidewall. This is an analogous mechanism to that illustrated in FIG. 31 and described above. The component 6501 is hooked through the slot 7201, and the arm of the component 6501 is brought into contact with the internal surface of the sidewall. FIG. 72B illustrates a front view of the component 6501 secured in place. FIG. 72C illustrates an internal view of the arm of the component 6501 in contact with the sidewall. This shape and enabled attachment mechanism allows for the ribs to be securely positioned while ensuring rib components are securely mated with and/or attached together and/or to the sidewall.

Figure 73A:
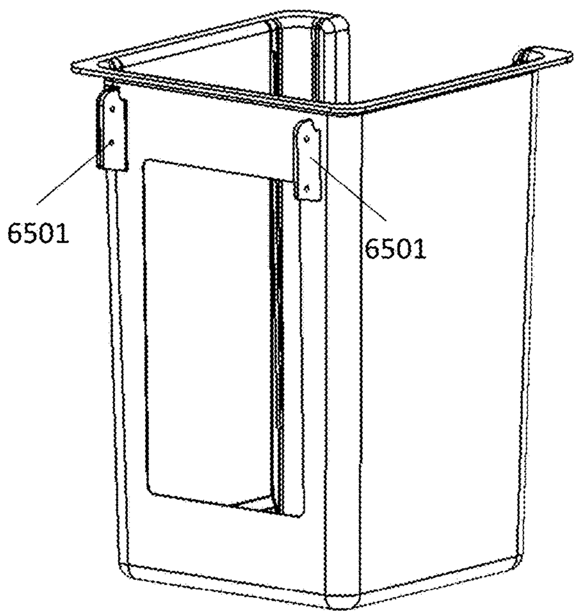
Figure 73B:
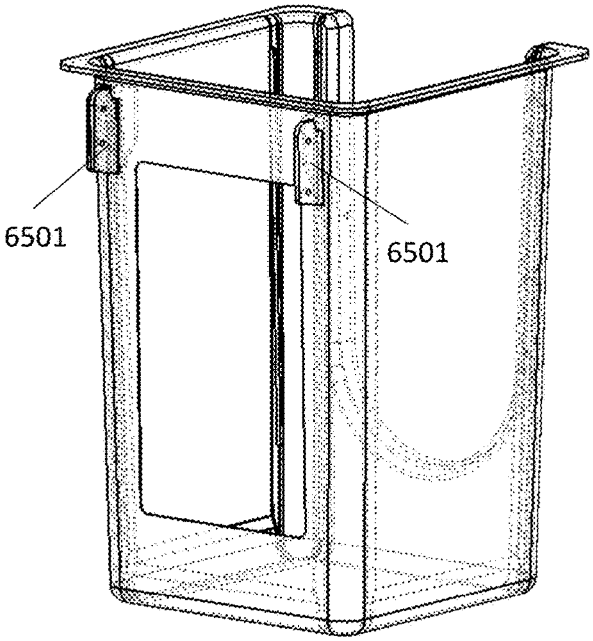
Figure 73C:
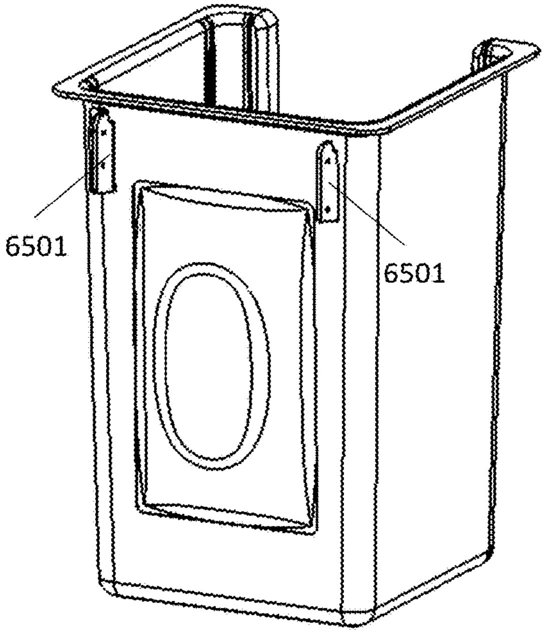
Figure 73D:
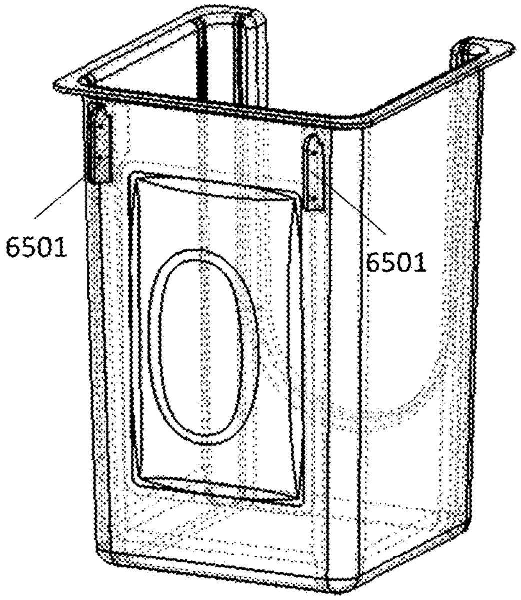
Figure 73E:
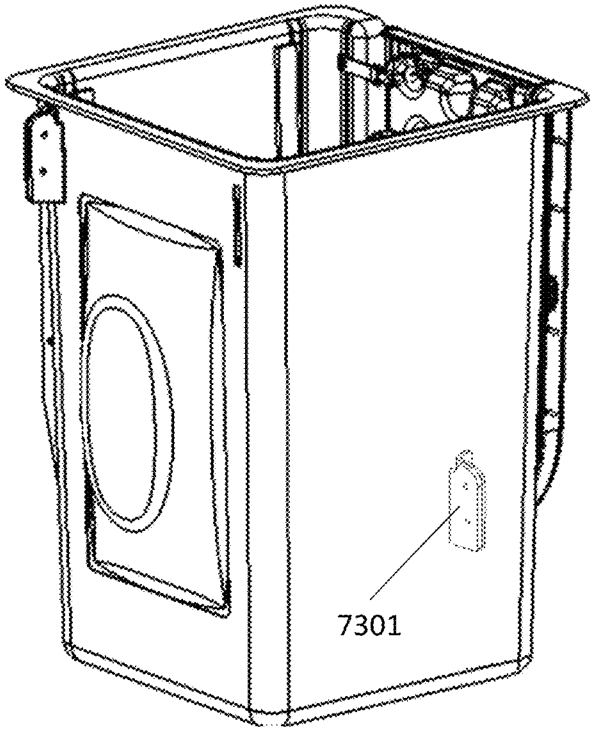

FIGS. 73A-73D illustrate front perspective views of internal L-shaped components 6501 secured in place on platform sidewalls. FIGS. 73B and 73D illustrate translucent platforms with the internal L-shaped components 6501 secured in place. The mini-ribs illustrated in FIGS. 73A-73D depict the mini-ribs in a preferred embodiment, wherein the ribs are positioned near a top of the sidewall platform. In one embodiment, the slot in the sidewall extends at any measurement between approximately 0.5 inches and 12 inches. In another embodiment, the slot in the sidewall extends at any measurement between approximately 1 inches and 6 inches. In another embodiment, the ribs are positioned anywhere on the sidewall. For example, FIG. 73E illustrates a mini-rib 7301 positioned in the central area of a sidewall. In a further embodiment, arms and stems of the mini-ribs are positioned and/or contoured to a corner analogously to the full-size ribs described and illustrated with respect to FIGS. 22-29B. In yet another embodiment, the mini-ribs are positioned between full-sized ribs on a sidewall.

Figure 74A:
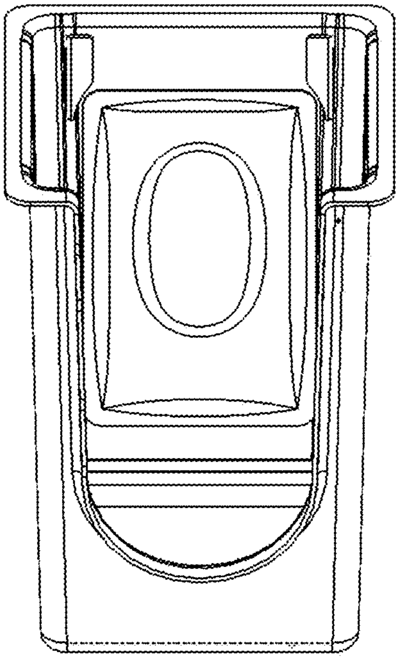
Figure 74B:
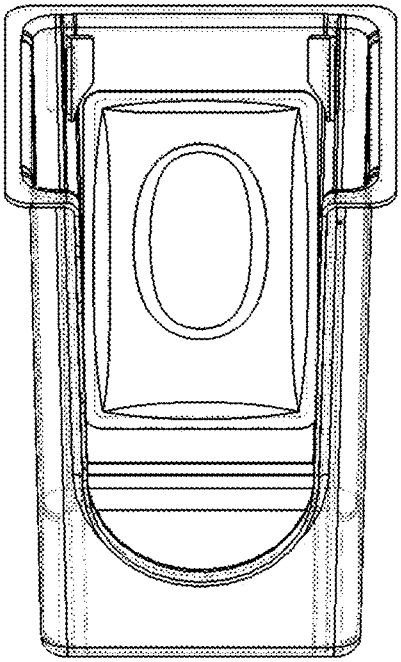

FIGS. 74A and 74B illustrate rear perspective views of internal L-shaped components 6501 secured in place on platform sidewalls. FIG. 74B illustrates a translucent platform with the internal L-shaped component 6501 secured in place.

FIGS. 75A, 75B, and 75C illustrate perspective views of an external L-shaped component according to one embodiment of the present invention.

FIGS. 76A and 76B illustrate side views of the external L-shaped component, and FIG. 76C illustrates a top view of the internal L-shaped component. FIG. 76A illustrates an angled bottom 7601 of the component, wherein the angled bottom of the component serves to provide clearance for the stem to be placed in the cutout in the platform wall without interference via a “hooking” or “swinging” motion.

FIGS. 77A and 77B illustrate a front view and a side view, respectively of the external L-shaped component according to one embodiment of the present invention.

FIGS. 78A and 78B illustrate rear views of the external L-shaped component 6503 positioned in place. In one embodiment, the arm of the external L-shaped component 6503 is secured in place on a platform sidewall via a chemical and/or physical attachment mechanism, including via adhesive. FIG. 78B illustrates the external L-shaped component 6503 positioned on a translucent platform sidewall.

FIG. 78C illustrates a side view of the external L-shaped component 6503 positioned in place on a platform sidewall. FIG. 78D illustrates a perspective view of the external L-shaped component 6503 positioned in place with the internal L-shaped component 6501 also positioned in place.

Notably, as analogs to the full-length ribs disclosed herein, the mini-ribs disclosed and illustrated are, in some embodiments, operable to be modified or adjusted according to any of the shapes, sizes, positions, materials, or other described or illustrated features of the full-length ribs. Accordingly, the full-length ribs are, in other embodiments, operable to be modified or adjusted according to any of the shapes, sizes, positions, materials, or other described or illustrated features of the mini-ribs.

Notably, the components recited in the present invention, including but not limited to the ribs, mini-ribs, and any other component which is attachable to any part of a vehicle, elevating platforms or splicer platforms including platform doors, platform walls, platform floors, knee spaces, and/or any other component recited in the present specification are operable to be constructed out of reinforced and/or unreinforced thermoplastics and/or thermosets, including filled and/or unfilled thermoplastics and/or thermosets. These materials include any specific materials recited in the present application such as fiber reinforced or unreinforced Polycarbonate, fiber reinforced or unreinforced Acrylic, fiber reinforced or unreinforced Nylon, fiber reinforced or unreinforced Polypropylene, Vectorply EPP-W 1500, Vectorply EPP-W, fiber reinforced or unreinforced Polyethylene Terephthalate (PET), fiber reinforced or unreinforced Polyethylene Terephthalate Glycol (PET-G), and/or fiber reinforced or unreinforced polyester.

Alternatively, these components are operable to be manufactured out of nylon and/or fiberglass, including pultruded fiberglass. The components are operable to include any core including a honeycomb core, an aramid honeycomb core, a thermoplastic honeycomb core, a metal honeycomb core, a wood core, a balsa core, a glass fabric core including a 3D woven sandwich glass fabric core, a fiberglass core, a fabric core including laminate bulkers, a carbon core, a thermoplastic foam core, a polyurethane foam core, a syntactic foam core, a polymethacrylimide (PMI) foam core, a Polyethylene Terephthalate (PET) foam core, a Polyethylene Terephthalate Glycol (PET-G) foam core, a cross linked polyvinyl chloride (PVC) foam core, a linear PVC foam core, and/or a polyester foam core. Additionally, the components are operable to be manufactured via any of the techniques recited herein, including any type of thermoforming process or other thermoplastic manufacturing process, such as injection molding, rotational molding, compression molding, compression molding using unidirectional tape, compression molding using sheet molding compound, compression molding using bulk molding compound, compression molding using thick molding, compression molding using wet molding, chop spray, gravity fed casting, low pressure casting, high pressure casting, resin transfer molding including light resin transfer molding, 3D printing, extrusion, Digital Light Synthesis (DLS) including Continuous Light Interface Production (CLIP), vacuum forming, infusion including vacuum infusion, hand layup, flex molding, lamination, squish molding, etc. Furthermore, the components of the present invention are operable to be manufactured integrally (i.e. manufactured at the same time or around the same time such that the components are integrally formed) or manufactured separately and then attached to other components or identical components via physical bonding, chemical bonding, mechanical attachment, mechanical interlocking, magnetism, reversible adhesive, irreversible adhesive, welding including plastic welding, and/or vacuum attachment. In particular, unreinforced thermosets, reinforced thermosets, unfilled thermosets, and/or filled thermosets are operable to be manufactured via injection molding, rotational molding, compression molding, compression molding using sheet molding compound, compression molding using fiber reinforced thermoset, compression molding using bulk molding compound, compression molding using thick molding, compression molding using wet molding, gravity fed casting, low pressure casting, high pressure casting, resin transfer molding, light resin transfer molding, 3D printing, extrusion, Digital Light Synthesis (DLS), Continuous Light Interface Production (CLIP), vacuum forming, infusion, vacuum infusion, hand layup, flex molding, lamination, squish molding, chop spray, and/or pultrusion. Unreinforced thermoplastics, reinforced thermoplastics, unfilled thermoplastics, and/or filled thermoplastics are operable to be manufactured via injection molding, rotational molding, compression molding, compression molding using fiber reinforced thermoplastic, compression molding using bulk molding compound, compression molding using thick molding, compression molding using wet molding, gravity fed casting, low pressure casting, high pressure casting, resin transfer molding, light resin transfer molding, 3D printing, extrusion, Digital Light Synthesis (DLS), Continuous Light Interface Production (CLIP), vacuum forming, infusion, vacuum infusion, hand layup, flex molding, lamination, squish molding, chop spray, and/or pultrusion.

Alternatively, the mini-ribs and/or other components are translucent and are constructed from a translucent or opaque material that is either fiber-reinforced or non-fiber-reinforced, such as Polycarbonate, Acrylic, Nylon, Polypropylene, Polyethylene Terephthalate (PET), Polyethylene Terephthalate Glycol (PET-G), and/or polyester, and is further operable to support a load of an attached apparatus.

FIGS. 79A-83C illustrate top views of multiple combinations, components, and constructions for mini-ribs, wherein each of the illustrated mini-ribs retain each of the functional aspects described above. The mini-ribs are each illustrated without a visible wall or slot; however, each of the stems of the internal components are operable to extend from an inside of a wall to an outside of a wall through a slot, wherein each of the external components are operable to be positioned on an exterior of the wall and connect with the stem on the outside of the wall.

FIGS. 79A-79D illustrate mini-ribs with L-shaped internal rib components and L-shaped external rib components. FIGS. 79A and 79B illustrate left and right embodiments, respectively, of an internal L-shaped component (7903, 7907) and an external L-shaped component (7901, 7905). FIGS. 79C and 79D illustrate left and right embodiments, respectively, of an internal L-shaped component (7913, 7919) with two external L-shaped components (7909 and 7911, 7915 and 7917). Right and left embodiments in these illustrations refer to the direction arms of the internal component extends once positioned within the slot in the sidewall when viewed from the top.

FIGS. 80A-80C illustrate mini-ribs with a T-shaped internal rib component and L-shaped external rib components. FIGS. 80A and 80B illustrate left and right embodiments, respectively, of an internal T-shaped component (8003, 8007) with an external L-shaped component (8001, 8005). FIG. 80C illustrates a T-shaped component with an internal T-shaped component 8013 and both left and right external L-shaped components (8009, 8011). Right and left embodiments in these illustrations refer to the direction of arms of the external L-shaped components when attached to the stem of the T-shaped component when viewed from the top.

FIGS. 81A-81D illustrate mini-ribs with a Y-shaped internal rib component. FIG. 81A illustrates an internal Y-shaped component 8103 with an external L-shaped component 8101, wherein the stem of the Y-shaped component 8103 extends perpendicular to a wall and through a slot in the wall, wherein one arm of the Y-shaped component 8103 curves around an inside of a curved wall, and wherein one arm of the Y-shaped component 8103 extends along a flat surface of a flat wall. FIG. 81B illustrates an internal Y-shaped component 8109 with a right L-shaped component 8107 and a left L-shaped component 8105. FIG. 81C illustrates an internal Y-shaped component 8115 with an external L-shaped component 8111 and a curved corner component 8113, wherein the curved corner component 8113 includes a stem and an arm, and wherein the arm of the curved corner component 8113 wraps around an outside of a curved wall. FIG. 81D illustrates an internal Y-shaped component 8119 with an external curved corner component 8117.

FIGS. 82A and 82B illustrate mini-ribs with an internal L-shaped component and an external corner component. FIG. 82A illustrates an internal L-shaped component 8205 with a single external curved corner component 8203. FIG. 82B illustrates an internal L-shaped component 8211 with an external curved corner component 8209 and an external L-shaped component 8207.

FIGS. 83A-83C illustrate mini-ribs with an internal Y-shaped component and external corner components positioned on a corner of a wall. FIG. 83A illustrates an internal Y-shaped component 8303 with a left external corner component 8301, wherein the stem of the internal Y-shaped component 8303 extends through a slot in a curved wall (i.e., a corner), wherein the external corner component 8301 includes a stem and an arm, and wherein the arm of the external corner component 8301 wraps around an outside of a curved wall. FIG. 83B illustrates an internal Y-shaped component 8307 with a right external corner component 8305. FIG. 83C illustrates an internal Y-shaped component 8313 with two external corner components (8309, 8311).

FIGS. 84A-85C illustrate perspective views of external components attached to an outside of a platform. FIG. 84A illustrates two slots, each with a single, external L-shaped component 8401 attached to a stem of an internal component 8403. FIG. 84B illustrates two slots, each with two external L-shaped components 8405 attached to a stem of an internal component 8407. FIG. 85A illustrates two slots, each with a single, external corner component 8501, wherein the corner components 8501 are attached to a stem 8503 that extends perpendicular to a flat wall through a slot in the wall. FIG. 85B illustrates two slots, each with an external corner component 8509 and an external L-shaped component 8505, wherein each of the external components (8505, 8509) are attached to a stem of an internal component 8507. FIG. 85C illustrates two slots, each with two corner components 8511, wherein the corner components 8511 are attached to a stem 8513 that extends through slot in the wall, and wherein the slot is positioned on a curved portion (i.e., a corner) of the platform.

FIGS. 86A-86D illustrate rear views of internal components in a platform. FIG. 86A illustrates two slots, each with a single, internal L-shaped component 8601. FIG. 86B illustrates two slots, each with an internal, T-shaped component 8603. FIG. 86C illustrates two slots, each with an internal Y-shaped component 8605, wherein each internal Y-shaped component 8605 includes a stem that extends perpendicular to a flat wall of the platform, one curved arm, and one flat arm. FIG. 86D illustrates two slots, each with an internal Y-shaped component 8605, wherein the internal Y-shaped component 8605 includes two curved arms as well as a stem that extends through a corner of the platform wall.

In one embodiment, the present invention includes mini-ribs that extend into a platform. The mini-ribs that extend into a platform, in some embodiments, are constructed with longer stems than external mini-ribs. FIGS. 87A-87C illustrate top views of internal mini-ribs. Internal mini-ribs are constructed with internal and external components, but in contrast to the external mini-ribs, the external components extend through a slot in the wall, and the internal components attach to a stem of the external component. FIG. 87A illustrates two internal L-shaped components 8701 attached to a stem of a left, external L-shaped component 8703. FIG. 87B illustrates two internal L-shaped components 8705 attached to a right, external L-shaped component 8707. FIG. 87C illustrates two internal L-shaped components 8709 attached to a stem of an external T-shaped component 8711. Right and left embodiments in these illustrations refer to the direction the arm of the external L-shaped component (8703, 8707) extends when viewed from the top.

FIGS. 88A and 88B illustrate exterior perspective views internal mini-ribs. FIG. 88A illustrates two slots, each with an external L-shaped component 8801. FIG. 88B illustrates two slots, each with an external T-shaped component 8803.

FIG. 89 illustrates an interior perspective view of internal mini-ribs. FIG. 89 illustrates two internal L-shaped components 8901 attached to a stem of an external component 8903.

Notably, both external mini-ribs and internal mini-ribs are operable to be constructed and positioned with any shapes, sizes, or number of components, including with a combination of Y-shaped components, T-shaped components, and L-shaped components, wherein one or more of the components are either positioned on a flat surface or on a curved surface. For example, in one embodiment, an external mini-rib includes a curved internal component with two external L-shaped components. Further, each of the components are operable to be constructed in a mirrored embodiment with left or right constructions such that the components are operable to be attached to any corner or flat surface of a wall.

An internal and/or external mini-rib is further operable to be positioned on a wall with one or more additional ribs, wherein the one or more additional ribs are identical to the internal and/or external mini-rib, wherein the one or more additional ribs include mirrored components to the internal and/or external mini-rib, or wherein the ribs do not have any structural correlation (e.g., one corner mini-rib with one internal mini-rib on a flat surface).

FIGS. 90A-90F illustrate example symmetrical positions for external mini-ribs. FIG. 90A illustrates two internal L-shaped components 9001, wherein arms of the internal components 9001 extend in the same direction along the wall. FIG. 90B illustrates two internal L-shaped components 9003, wherein arms of the internal components 9003 extend in opposite directions away from the two ribs. FIG. 90C illustrates two internal L-shaped components 9005, wherein arms of the internal components 9005 extend in opposite directions toward an area between the two ribs. FIG. 90D illustrates two external L-shaped components 9007, wherein arms of external components 9007 extend in the same direction along the wall. FIG. 90E illustrates two external L-shaped components 9009, wherein arms of the external components 9009 extend in opposite directions away from the two ribs. FIG. 90F illustrates two external L-shaped components 9011, wherein arms of the external components 9011 extend in opposite directions toward an area between the two ribs. Notably, ribs are operable to have arms that point in the same direction for both right and left embodiments.

FIGS. 91A and 91B illustrate rib components with and without holes. Notably, any of the stems of the rib components illustrated and described herein are operable to be constructed without holes or with any number of holes. For example, FIG. 91A illustrates one embodiment wherein the none of the components include holes. FIG. 91B illustrates another embodiment, wherein the stems of the internal and external components include two holes 9101 each.

Certain modifications and improvements will occur to those skilled in the art upon a reading of the foregoing description. All modifications and improvements have been deleted herein for the sake of conciseness and readability but are properly within the scope of the following claims.

The invention claimed is:

1. A rib for an elevating platform, comprising:

at least two rib components, wherein the at least two rib components include an internal rib component and an external rib component;

wherein the internal rib component and the external rib component are both L-shaped and both include an arm and a stem;

wherein the external rib component is positioned on an external side of a sidewall of the elevating platform;

wherein the arm of the internal rib component contacts an internal surface of the sidewall of the elevating platform, and wherein the arm of the external rib component contacts an external surface of the sidewall of the elevating platform;

wherein the stem of the internal rib component extends through a sidewall cutout to an external side of the sidewall of the elevating platform;

wherein the stem of the internal rib component is in contact with the stem of the external rib component; and wherein the mated stems of the internal rib component and the external rib component are configured to attach to and support at least one load of the elevating platform.

2. The rib of claim 1, wherein the internal rib component includes at least one notch, and wherein a height of the stem of the internal rib component is greater than a height of the sidewall cutout.

3. The rib of claim 1, further comprising a second rib, wherein the second rib includes at least one second internal rib component and at least one second external rib component, wherein the at least one second internal rib component and the at least one second external rib component are constructed bilaterally symmetric to the internal rib component and the external rib component.

4. The rib of claim 1, further comprising a second rib, wherein the second rib includes at least one second internal rib component and at least one second external rib component, wherein the at least one second internal rib component and the at least one second external rib component are identical in structure to the internal rib component and the external rib component, respectively.

5. The rib of claim 1, wherein the stem of the internal rib component and the stem of the external rib component are permanently joined via chemical bonding, physical bonding, and/or mechanical attachment.

6. The rib of claim 1, wherein the stem of the internal rib component and the stem of the external rib component each include at least one mounting hole.

7. The rib of claim 6, wherein the at least one mounting hole includes at least two mounting holes, and wherein the at least two mounting holes are horizontally and/or vertically offset.

8. The rib of claim 1, wherein the stem of the internal rib component and/or the stem of the external rib component includes an angled bottom edge.

9. The rib of claim 1, wherein the arm of the internal rib component is attached to the internal surface of the sidewall, and wherein the arm of the external rib component is attached to the external surface of the sidewall.

10. The rib of claim 1, wherein the rib and the sidewall cutout are configured such that when the rib is positioned on the sidewall, the rib completely closes or seals the sidewall cutout.

11. The rib of claim 1, wherein no conductive components extend through the sidewall with the rib.

12. The rib of claim 1, wherein the rib is constructed from unreinforced thermoplastics, reinforced thermoplastics, and/or filled thermoplastics.

13. The rib of claim 1, wherein the rib is constructed from unreinforced thermosets, reinforced thermosets, and/or filled thermosets.

14. The rib of claim 1, wherein the stem of the internal rib component includes a notch, and wherein the internal rib component is constructed to hook through a sidewall cutout via the notch.

15. The rib of claim 1, wherein the rib does not overlap with any elements attached to the sidewall.

* * * * *